United States Patent
Moriyama et al.

(10) Patent No.: US 7,436,577 B2
(45) Date of Patent: Oct. 14, 2008

(54) DISPLAY MEDIUM, DISPLAY DEVICE AND DISPLAY METHOD USING THE DISPLAY MEDIUM

(75) Inventors: Hiroaki Moriyama, Kanagawa (JP); Yasuo Yamamoto, Kanagawa (JP); Jun Kawahara, Kanagawa (JP); Rie Ishii, Kanagawa (JP); Takayuki Takeuchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 3 days.

(21) Appl. No.: 11/449,160

(22) Filed: Jun. 8, 2006

(65) Prior Publication Data

US 2006/0285195 A1     Dec. 21, 2006

Related U.S. Application Data

(63) Continuation-in-part of application No. 11/355,663, filed on Feb. 15, 2006.

(30) Foreign Application Priority Data

| Jun. 20, 2005 | (JP) | ............................. 2005-179907 |
| Aug. 22, 2005 | (JP) | ............................. 2005-240171 |
| Apr. 18, 2006 | (JP) | ............................. 2006-114745 |

(51) Int. Cl.
- *G02B 26/00* (2006.01)
- *G09G 3/34* (2006.01)
- *G02F 1/133* (2006.01)
- *G03G 17/04* (2006.01)

(52) U.S. Cl. ..................... 359/296; 345/107; 349/33; 430/32

(58) Field of Classification Search ................ 359/245, 359/253–254, 265, 290–291, 296; 345/107; 349/33; 430/31, 32
See application file for complete search history.

(56) References Cited

U.S. PATENT DOCUMENTS

| 4,214,820 | A  | * | 7/1980  | Leibowitz et al. ........... 359/275 |
| 6,017,584 | A  |   | 1/2000  | Albert et al. |
| 6,184,856 | B1 | * | 2/2001  | Gordon et al. .............. 345/107 |
| 6,323,989 | B1 | * | 11/2001 | Jacobson et al. ........... 359/296 |
| 6,657,612 | B2 | * | 12/2003 | Machida et al. ............. 345/107 |
| 6,727,873 | B2 |   | 4/2004  | Gordon, II et al. |
| 2002/0145792 | A1 |  | 10/2002 | Jacobson et al. |
| 2002/0171620 | A1 | * | 11/2002 | Gordon et al. .............. 345/107 |
| 2006/0152474 | A1 | * | 7/2006  | Saito et al. .................. 345/107 |

FOREIGN PATENT DOCUMENTS

| JP | 64-86116   | 3/1989  |
| JP | 4-199085   | 7/1992  |
| JP | 2000-35598 | 2/2000  |
| JP | 2000-322004| 11/2000 |
| JP | 2002-162649| 6/2002  |
| JP | 2002-333643| 11/2002 |
| JP | 2004-20818 | 1/2004  |

* cited by examiner

*Primary Examiner*—Scott J. Sugarman
*Assistant Examiner*—Dawayne A Pinkney
(74) *Attorney, Agent, or Firm*—Fildes & Outland, P.C.

(57) ABSTRACT

The present invention provides a display medium comprising a display layer which selectively displays white or black color, and a light-modulating layer provided on the display layer including mobile fine particles which show coloration in a dispersed state, a display device using the display medium, and a display method using the display medium.

33 Claims, 22 Drawing Sheets

OBSERVER

OBSERVER

DISPLAY MEDIUM, DISPLAY DEVICE AND DISPLAY METHOD USING THE DISPLAY MEDIUM

CROSS-REFERENCE TO RELATED APPLICATION

This application is a continuation-in-part of application Ser. No. 11/355,663, filed on Feb. 15, 2006. This application claims priority under 35 USC 119 from Japanese Paten Application Nos. 2005-179907, 2005-240171 and 2006-114745, the disclosures of which are incorporated by reference herein.

BACKGROUND

1. Technical Field

The present invention relates to a display medium using mobile fine particles that is utilizable as an optical device, such as a light-modulating glass, a light-modulating device, a display device, or the like, and a display device and a display method using the display medium.

2. Related Art

With the progress of the highly information-oriented society, there has been an increased need for electronic paper systems, color display systems, and large-area display systems. In order to meet such needs, display technologies, such as CRT, liquid crystal, EL, LED, plasma, and the like, have been developed. In addition to these self-light emitting systems, development of a reflection-type display system which consumes less power and gives a less sense of incongruity to the human eye has been investigated. Promising reflection-type display systems include those utilizing reflection-type liquid crystal technologies, and the like.

On the other hand, while there is a great need for next-generation electronic paper display systems, no promising technology for meeting the need has yet been established at present. Known candidate methods include an electrophoretic method, a liquid crystal method, an organic EL method, and the like.

Since the liquid crystal method is a filter method, it is difficult to decrease the thickness and weight of the medium, and the organic EL method has presented a problem in that, due to the self-light emitting nature, it has no memorizability, resulting in the scope of application being limited.

On the other hand, for the display device using the electrophoretic method, the following technologies have been disclosed.

For example, a method which disposes microcapsules encapsulating a dispersant and electrophoretic particles between a pair of electrodes has been disclosed (as in Japanese Paten Laid-Open Publication (JP-A) No. 64-86116, for example). In addition, the magnetic electrophoretic method which uses microcapsules containing a magnetic fluid has been reported (as in JP-A No. 4-199085/1992, for example).

Further, a method which disposes a plurality of colored particles in a single microcapsule in a mixed state, and selectively drives these particles has been disclosed (as in U.S. Pat. No. 6,017,584, for example).

However, microcapsules are used any of these methods, making it difficult to have a fine dot display or a full-color display. In JP-A No. 64-86116, the number of colors which can be displayed concurrently is two, which has rendered multicolor display (color display) difficult. In U.S. Pat. No. 6,017,584, it has been fundamentally difficult to drive the particles selectively.

In addition, a configuration in which charged electrophoretic particles are disposed in approximately equal amounts in a plurality of divisions provided along the surface of a pair of substrates disposed with a predetermined spacing being given, the dispersant being blue, and the charged electrophoretic particles being black, has been stated with a report that the display quality can be improved (as in JP-A No. 2000-322004, for example).

However, with this configuration, full colorization is difficult, and the lamination would make it impossible to realize color reproduction using the subtractive mixture method by the combination with the particles in the respective layers. Thus it is inevitable to take parallel disposition, which has presented a problem in that the apparatus becomes intricate.

Further, a method which disposes cells or microcapsules for expressing a plurality of colors to carry out color display has been disclosed (as in JP-A No. 2000-35598, for example. However, there is a problem in that sufficient contrast cannot be obtained.

Additionally, a method which vertically laminates two or more electrophoretic sections including particles/mediums having light permeability has been disclosed (as in JP-A No. 2002-333643, for example). However, dyestuffs are used in order to color the particles, and thus sufficient light-modulating density cannot be obtained.

On the other hand, a method which provides a plurality of accommodation sections for accommodating fine particles which have been electrophoresed has been disclosed (as in JP-A No. 2002-162649, for example). However, to carry out color display, particles different in color must be disposed in parallel, and thus there is no color reproducibility, and high contrast cannot be obtained.

In addition, a method which lamination-disposes or parallel-disposes cells comprising two display electrodes disposed in superposed positions, two collect electrodes, and two types of light permeable colored particle has been disclosed (as in JP-A No. 2004-20818, for example). However, since relatively large particles colored with dyestuffs are used, sufficient light-modulating density cannot be obtained, and stability of the light-modulating agent has been a problem.

As can be seen from the above description, with the electrophoretic method, many problems need to be solved in order to obtain a color display excellent in coloration, and technology for solution thereof has been demanded.

SUMMARY

The present invention has been made in view of the above circumstances and provides a display medium, a display device and a display method using the display medium.

According to an aspect of the present invention, a display medium comprises a display layer which selectively displays white or black color, and a light-modulating layer provided on the display layer including mobile fine particles which show coloration in a dispersed state.

BRIEF DESCRIPTION OF THE DRAWINGS

Preferred embodiments of the present invention will be described in detail based on the following figures, wherein.

DETAILED DESCRIPTION OF THE INVENTION

Figure 1A:
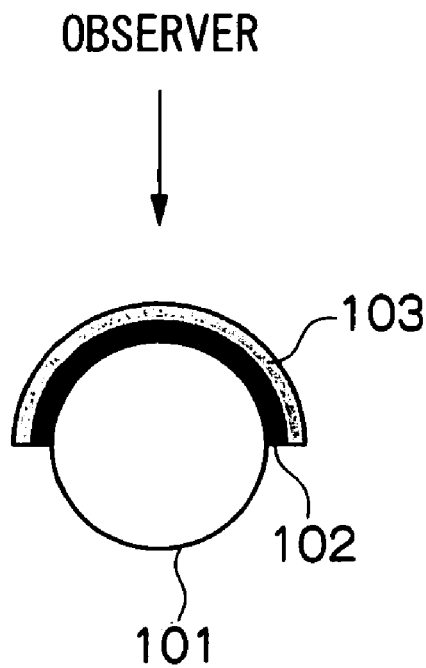
FIG. 1A and FIG. 1B are schematic sectional views illustrating an exemplary mode of the structure of a black-white reversible particle, FIG. 1A showing the state of white color display, and FIG. 1B showing the state of black color display.

Hereinbelow, the present invention will be described in detail.

<Display Medium, and Display Method Using It>

The display medium of the present invention provides a display medium comprising a display layer which selectively displays white or black color, and a light-modulating layer provided on the display layer including mobile fine particles which show coloration in the dispersed state.

In addition, the display method of the present invention provides a display method using the display medium of the present invention, selecting at least one step from:

displaying white color by displaying white color in the displaying layer and non-dispersing mobile fine particles in the light-modulating layer;

displaying black color by displaying black color in the displaying layer and non-dispersing the mobile fine particles in the light-modulating layer; and showing coloration by displaying white color in the display layer and dispersing the mobile fine particles in the light-modulating layer.

Herein, the display medium of the present invention allows black and white display, and color display to be provided in the state in which the light-modulating layer is on the front side with respect to the observer, and the display layer is on the rear side thereof.

Next, the display medium of the present invention and the display method using it will be specifically described. First, when the display layer is in the state in which it displays white color, and the light-modulating layer on that display layer shows a desired color, the color which has been shown by the light-modulating layer is displayed. In other words, any desired color display can be provided. With this display, the light scattering effect given by the white color of the display layer which exists on the rear side with respect to the observer can improve the coloration of the light-modulating layer which is on the front side. As a result of this, with the display medium of the present invention, color display excellent in coloration can be obtained.

On the other hand, the display medium of the present invention is capable of displaying white color by bringing the display layer into the state in which white color is displayed, and the mobile fine particles in the light-modulating layer into the non-dispersed state. In addition, it is capable of displaying black color by bringing the display layer into the state in which black color is displayed, and the mobile fine particles in the light-modulating layer into the non-dispersed state. Therefore, the white color display is not carried out with the light-modulating layer, but by using the display layer, the white color display is carried out, thus the degree of whiteness at the time of white color display can be improved. In addition to this, because the white color display and the black color display are performed with no use of the light-modulating layer, but with the display layer, the black and white contrast of the image obtained can be improved.

The details of the display layer and the light-modulating layer constituting the display medium of the present invention, and further, the details of the display method using the display medium of the present invention will be collectively described when the following display device of the present invention is described.

<Display Device>

The display device of the present invention provides a display device comprising a display layer which selectively displays white or black color; a light-modulating layer provided on the display layer including mobile fine particles which show coloration in a dispersed state; a pair of electrodes which connects to the display layer; and fine particles moving part which is provided close to said light-modulating layer.

Because the display device of the present invention uses the above-mentioned display medium of the present invention, it is capable of providing a black and white display excellent in contrast, and a color display excellent in coloration.

Hereinbelow, embodiments of the display device of the present invention will be described with reference to the drawings.

[Display Layer]

The configuration of the display layer in the present invention is not particularly limited, provided that at least the surface which is visible to the observer, namely, the surface adjacent to the light-modulating layer (which is, hereinbelow, called the "display surface" as appropriate) is a layer which can selectively display white color or black color. Specific examples of the display layer include (1) a display layer wherein white particles and black particles are encapsulated between a pair of substrates, and by moving either one of these two types of particle to the substrate side forming a display surface, the white or black color display is carried out; (2) a display layer wherein particles having a white portion and a black one are contained in the layer, and by reversing those particles, the white or black color display is carried out by means of the display surface; (3) a display layer wherein microcapsules holding white fine particles and black ones are contained in the layer, and by using the electrophoretic method to move either one of these two types of fine particle to the display surface side, the white or black color display is carried out; (4) a display layer wherein the decolored state and the colored state which are based on the electrochromic phenomenon are used to carry out the white and black color displays; and the like.

Hereinbelow, these four modes will be specifically described.

[(1) Display Layer Wherein White Particles and Black Particles are Encapsulated Between a Pair of Substrates, and by Moving Either One of These Two Types of Particle to the Substrate Side Forming a Display Surface, the White or Black Color Display is Carried Out]

The display layer as in (1) preferably comprises a configuration which encapsulates white particles and black particles between a pair of substrates. More specifically, it is preferable to provide a configuration in which, a pair of substrates oppositely disposed, white particles and black particles different in charging characteristic are encapsulated in the movable state. To the display layer having such a configuration, a pair of electrodes is connected, and because the encapsulated white particles and black ones are mutually different in charging characteristic, the white particles and the black particles can be moved between the substrates in accordance with the intensity and the polarity of the electric field applied by that pair of electrodes.

Herein, the wording "the white particles and the black particles can be moved between the substrates" means that either one of the two types of particle existing on one substrate side is moved to the other substrate side by the application of the electric field.

Therefore, with the display layer having such a configuration, one of the substrates provides the display surface as mentioned above, and by selectively moving the white particles to this display surface side (the light-modulating layer side), the white color display is carried out, while, by selectively moving the black particles to the display surface side (the light-modulating layer side), the black color display is carried out.

As such white particles and black particles constituting the display layer, nonconductive particles which are charged by triboelectrification may be used, or electrically conductive particles which are charged by injecting charge into them through the electrodes may be used.

More specifically, as the black particles and the white particles, it is preferable to use electrically conductive particles which are formed, including at least a coloring agent, a charge control agent, and a resin.

Hereinbelow, the respective components constituting the white particle and the black particle will be described.

(Coloring Agent)

For the black particle, as the coloring agent to be used, carbon black, titanium black, magnetic powder, and other organic and inorganic black pigments can be mentioned. In addition, for the white particle, white pigments, such as rutile-type titanium oxide, anatase-type titanium oxide, Chinese white, white lead, zinc sulfide, aluminum oxide, silicon oxide, zirconium oxide, and the like, can be mentioned.

For any of these coloring agents, the amount of addition is preferably 1 to 60% by mass, and is more preferably 5 to 30% by mass for the total mass of the particle constituting components, assuming that the specific weight of the light-modulating agent is 1.

(Charge Control Agent)

To the white particles and the black particles, a charge control agent is added in order to control the chargeability.

As the charge control agent, any well-known one which is used in a toner material for electrophotography can be used, and examples thereof include cetylpyridyl chloride, quaternary ammonium salts, such as P-51 and P-53 (manufactured by Orient Chemical Industries, Ltd.), and the like, salicylic acid metal complexes, phenolic condensates, tetraphenyl compounds, calixarene compounds, and metal oxide fine particles, or metal oxide fine particles which are surface treated by various coupling agent. In addition, as the charge control agent, a colorless one, or one which is low in light-modulating power is preferable. The amount of addition is preferably in the range of 0.1 to 10% by mass, and is more preferably in the range of 0.5 to 5% by mass for the total mass of the particle constituting components.

(Resistance Adjusting Agent)

To the white particles and the black particles, a resistance adjusting agent may be added as required.

As such resistance adjusting agent, an inorganic fine powder having a resistance of $1 \times 10^6$ Ωcm or lower can be used, and examples thereof include fine particles of tin oxide, titanium oxide, zinc oxide, and iron oxide, and those coated with various electrically conductive oxides (such as titanium oxide fine particles coated with tin oxide, and the like), and the like. In addition, as the resistance adjusting agent, a colorless one, or one which is low in coloring power is preferable. The amount of addition is preferably in the range which will not impair the colors of the white particle and the black particle, and specifically, it is preferably in the range of 0.1 to 10% by mass for the total mass of the particle constituting components.

(Resin)

Examples of the resin constituting the white particle and the black particle include polyvinyl resins, such as polyolefin, polystyrene, acrylic resin, methacrylic resin, polyacrylonitrile, polyvinyl acetate, polyvinyl alcohol, vinyl chloride, polyvinyl butyral, and the like; copolymer resins, such as vinyl chloride-vinyl acetate copolymer, styrene-acrylic acid copolymer, styrene-methacrylic acid copolymer, and the like; straight silicon resins comprising organosiloxane bonds, and modified resins thereof; fluororesins, such as polytetrafluoroethylene, polyvinyl fluoride, polyvinylidene fluoride, and the like; polyesters; polyurethanes; polycarbonates; amino resins; epoxy resins, and the like.

In addition, as the resin constituting the white particle and the black particle, any well-known binding resin which is known as the main component of the conventional toner for electrophotography can be used with no problems.

These resins may be used one type alone or two or more types in mixture. In addition, resins obtained as a result of crosslinking these resins may be used. Among these, particularly, a resin containing a crosslinked component is preferably used.

For these resins, the amount of addition is preferably in the range of 1% by mass to 90% by mass for the total mass of the particle constituting components.

(Manufacturing Method for White Particles and Black Particles)

The white particles and the black particles in the present invention may be manufactured by the wet type manufacturing methods, such as the suspension polymerization method, the emulsification polymerization one, the dispersion polymerization one, and the like, or may be manufactured by the conventional pulverizing classification method. The particles obtained by the wet type manufacturing method will be spherical particles, while, those obtained by the pulverizing classification method will be amorphous ones.

In addition, the spherical particles and the amorphous ones which have been obtained by these manufacturing methods may be subjected to a heat treatment in order to render the shapes thereof uniform.

As the technique for controlling the particle size distribution, that which adjusts the particle manufacturing conditions in the above-mentioned wet type manufacturing method, and that which classifies the particles once obtained can be mentioned.

When the particle manufacturing conditions in the wet type manufacturing method are to be adjusted, the stirring speed in dispersing the oil phase in which the materials constituting the display particle are dispersed, into a water phase may be adjusted, or when a surfactant is to be utilized, the concentration thereof may be adjusted, or some other adjustment may be made for controlling the particle size distribution for the particles.

As a general rule, the volumetric average particle diameter of the white particles and the black particles thus manufactured is preferably in the range of 0.1 to 30 μm or so, is more preferably in the range of 2 to 20 μm, and is still more preferably in the range of 2 to 15 μm in order to obtain good images.

In addition, the shape of the display particles, i.e., the white particles and the black particles is preferably that which is close to the true sphere. If the particles are provided with a shape close to the true sphere, the contact between particles will be of point contact, and the contact between a particle and the substrate surface will be substantially of point contact, resulting in the adhesion forces based on the van der Waals between particles and between a particle and the substrate surface being reduced. Therefore, it can be considered that, even if the substrate surface is a dielectric, the particles charged by the electric field can be smoothly moved between the substrates.

(Substrate)

Next, the pair of substrates oppositely disposed which constitute the display layer will be described.

As the substrate in the present invention, when the electric field is used as an external stimulus for controlling the charged state of the white particles and the black particles, a plate-like element having conductivity (an electrically conductive substrate) is used. In addition, the substrate providing the display surface is required to be a transparent electrically conductive substrate, and both substrates may be a transparent electrically conductive substrate.

As the electrically conductive substrate, the substrate itself may be electrically conductive or the surface of the nonconductive base material may be treated to be rendered electrically conductive; in addition, whether it is crystalline or amorphous is not questioned. As the electrically conductive substrate which is, in itself, electrically conductive, those made of metals, such as aluminum, stainless steel, nickel, chromium, and the like, and the alloy crystals thereof; and those made of semiconductors, such as Si, GaAs, GaP, GaN, SiC, ZnO, and the like, can be mentioned.

As the nonconductive base material, macromolecular films, glass, quartz, ceramics, and the like can be mentioned. The treatment for rendering the nonconductive base material electrically conductive can be carried out by forming a film of any of the metals mentioned above as specific examples of the material for the electrically conductive substrate which is, in itself, electrically conductive, or gold, silver, copper, or the like, by the vapor deposition method, the sputtering method, the ion plating method, or the like.

In addition, as the transparent electrically conductive substrate, an electrically conductive substrate with which a transparent electrode is formed on one side of a nonconductive transparent base material, or a transparent base material which has conductivity in itself is used. Examples of the transparent base material which has conductivity in itself include transparent electrically conductive materials, such as ITO (Indium-Tin Oxide), zinc oxide, tin oxide, lead oxide, indium oxide, copper iodide, and the like.

Examples of the nonconductive transparent base material which can be used include films or plate-like elements made of transparent inorganic materials, such as glass, quartz, sapphire, MgO, LiF, $CaF_2$ and the like; and transparent organic resins, such as fluororesin, polyester, polycarbonate, polyethylene, polyethylene terephthalate, epoxy, and the like; further, optical fibers, SELFOC optical plates, and the like.

As the above-mentioned transparent electrode which is provided on one side of a transparent base material, that which is made of a transparent electrically conductive material, such as ITO, zinc oxide, tin oxide, lead oxide, indium oxide, copper iodide, or the like, and is formed by the method, such as the vapor deposition method, the ion plating one, the sputtering one, or the like; or that which is made of a metal, such as Al, Ni, Au, or the like, and is thinly formed to such a degree that it is translucent, by the method, such as the vapor deposition method or the sputtering one is used.

The surfaces of the substrates with which they are opposed to each other (which hereafter may be abbreviated to the "opposed surfaces") may have an effect on the charged polarity of the white particles and the black particles. Therefore, it is also preferable to provide a protection layer having an adequate surface condition for the opposed surfaces.

This protection layer can be selected mainly from the viewpoints of adhesion to the substrate opposed surfaces and chargeability of the particle, transparency of the substrate, and further prevention of contamination of the opposed surfaces. Specific examples of the material of the protection layer include polycarbonate resin, vinyl silicone resin, fluorine-group containing resin, and the like. The resin is selected on the basis of the material constituting the surface of the display particle used and how small the difference in triboelectrification with display particles is.

(Pair of Electrodes)

For the display layer as in (1), a pair of electrodes for generating an electric field to move the white particles and the black particles is provided.

Generally, this pair of electrodes is provided adjacently to the opposed surfaces of the pair of oppositely disposed substrates.

These electrodes are formed by the method, such as the vapor deposition method, the ion plating one, the sputtering one, or the like, using some of the above-mentioned transparent electrically conductive materials and metals to be used as the transparent electrode.

By the electric field generated by the pair of electrodes thus formed, either one of the two types of particle, i.e., the white particles or the black particles, are selectively moved to the display surface to allow the white color display or the black color display.

To the above-mentioned display layer as in (1), the display mechanism in the image display medium as described, for example, in the JP-A No. 2001-312225 is applicable.

[(2) Display Layer Wherein Particles Having a White Portion and a Black One are Contained in the Layer, and by Reversing Those Particles, the White or Black Color Display is Carried Out by Means of the Display Surface]

The display layer as in (2) preferably has a configuration in which, between a pair of oppositely disposed substrates, a support having cavities is provided, and in the cavities, particles having a white portion and a black portion that are reversed by the electric field (which are, hereinbelow, called "black-white reversible particles") are disposed. In the cavities, a nonconductive liquid is filled, and by contact with this liquid, two regions having different charging characteristics are formed on the black-white reversible particles. In addition, to the display layer having such a configuration, a pair of electrodes is connected, and the black-white reversible particles in the cavities can be reversed in accordance with the polarity of the electric field applied by the pair of electrodes.

With the display layer having such a configuration, one of the substrates provides the display surface, and by rendering the white portion of the black-white reversible particles visible on this display surface side, the white color display is carried out, while, by rendering the black portion of the black-white reversible particles visible on the display surface side, the black color display is carried out.

The black-white reversible particles for use in such a display layer will be described.

Figure 1B:
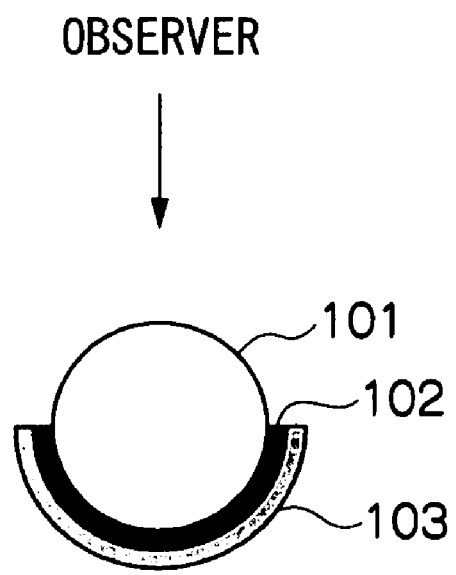

As the black-white reversible particle, the particle as shown in FIG. 1A and FIG. 1B, for example, is used. Herein, FIG. 1A and FIG. 1B are schematic sectional views illustrating an exemplary mode of the structure of a black-white reversible particle, FIG. 1A showing the state of white color display, and FIG. 1B showing the state of black color display.

As shown in FIG. 1A and FIG. 1B, the black-white reversible particle is configured to have a black layer 102 produced by forming a film of a black material on the hemispherical surface of a transparent ball 101, and to have a white layer 103 produced by forming a film of a white material on the black layer 102. Because of such configuration, by orienting the white layer 103 formed as a film to the observer side, as shown in FIG. 1A, the white color display can be carried out. In addition, as shown in FIG. 1B, by orienting the hemispherical surface where the black layer 102 and the white layer 103 are not formed as a film, to the observer side, the black layer 102 is rendered visible through the transparent ball 101, which allows the black color display to be carried out.

Thus, the black-white reversible particle has a region where the black layer 102 and the white layer 103 are formed, and that where they are not formed. These two regions are mutually different in charging characteristic, and as a result of this, can be reversed in accordance with the polarity of the electric field applied from the outside.

As the manufacturing method for such black-white reversible particles, the method as described in, for example, the paragraphs from [0015] to [0016] in JP-A No. 11-85067 is used.

In addition, for the driving principle and the configuration of the display layer using these black-white reversible particles, the method as described in, for example, the paragraphs from [0018] to [0023] in JP-A No. 11-85067 is applicable.

In addition, the black-white reversible particle to be used in the display layer as in (2) is not limited to the particle having the above-mentioned configuration, but the particle which is white in one hemispherical surface, and black in the other one may be used. As such a particle which is white in one hemispherical surface, and black in the other one, the particle as described in "A Twisting Ball Display", Proc. of the SID, Vol. 18, No. 3/4, pp. 289 to 293, 1977; U.S. Pat. Nos. 4,126,854; 4,143,103; 5,389,945; left column top 11th line on page 8 to right column bottom 8th line on the same page in JP-A No. 64-42683; or paragraphs from [0037] to [0038] in JP-A No. 11-85069 can be used.

For the manufacturing method for the black-white reversible particles having such a configuration, and the driving principle and the configuration of the display layer using these black-white reversible particles, the methods as described in the same literatures are applicable.

[(3) Display Layer Wherein Microcapsules Holding White Fine Particles and Black Ones are Contained in the Layer, and by Using the Electrophoretic Method to Move Either One of These Two Types of Fine Particle to the Display Surface Side, the White or Black Color Display is Carried Out]

The display layer as in (3) preferably has a configuration in which, between a pair of oppositely disposed substrates, microcapsules holding white fine particles and black ones which are mutually different in charging characteristic are sandwiched. To the display layer having such a configuration, a pair of electrodes is connected, and because the white fine particles and black ones encapsulated in the microcapsule are mutually different in charging characteristic, the white fine particles and black ones can be moved in the microcapsule in accordance with the intensity and the polarity of the electric field applied by that pair of electrodes.

Therefore, with the display layer having such a configuration, one of the substrates provides the display surface, and by selectively moving the white fine particles in the microcapsule to this display surface side (the light-modulating layer side), the white color display is carried out, while, by selectively moving the black fine particles in the microcapsule to the display surface side (the light-modulating layer side), the black color display is carried out.

To the display layer as described above, the manufacturing methods for microcapsules and the display mechanisms as described in, for example, JP-A No. 2005-70567 and the Published Japanese Translation of PCT International Publication for Patent Application No. 2004-526210 are applicable.

[(4) Display Layer Wherein the Decolored State and the Colored State which are Based on the Electrochromic Phenomenon are Used to Carry Out the White and Black Color Displays]

The display layer as in (4) preferably has a configuration which includes a white substrate and an electrochromic layer provided between the white substrate and the light-modulating layer, or a configuration which includes an electrochromic layer containing a white pigment. Herein, the electrochromic layer in the present invention refers to a layer which is capable of forming the decolored state and the colored state on the electrochromic phenomenon.

More specifically, such display layer preferably has a configuration in which, between a pair of oppositely disposed substrates, an electrolyte layer made up of an electrolyte and metallic ions allowing the electrochromic phenomenon is sandwiched. In addition, from the viewpoint of white color display, it is preferable that one of the pair of substrates is a white substrate, or that a white pigment is contained in the electrolyte layer.

With the display layer having such a configuration, the opposed surfaces of the pair of substrates are provided with an electrode, respectively, and by the voltage applied across this pair of electrodes, an electrochemical oxidation or reduction reaction is caused in the electrolyte layer. As a result of this, the metallic ions are reduced in the electrolyte layer, resulting in the metal being precipitated, and the precipitated metal is oxidized, resulting in the metal being ionized to be dissolved.

Therefore, with the display layer having such a configuration, one of the substrates provides the display surface, and by causing the metal to be precipitated in the vicinity of the electrode on this display surface side, the colored state is formed for displaying black color. In addition, by causing the precipitated metal to be dissolved, the decolored state is formed to render the white pigment or the white substrate visible for displaying white color.

First, the electrolyte layer constituting such a display layer will be described. In the electrolyte layer, metallic ions are contained, and the metallic ions are used to form the colored state. The metallic ion which is used to form the colored state is not particularly limited, but the respective ions of bismuth, copper, silver, lithium, iron, chromium, nickel, and cadmium, or ions made up of a combination of these can be exemplified, and from the viewpoints of ease of the reversible reaction, and the high degree of coloring, bismuth and silver are particularly preferable.

In addition, as the electrolyte constituting the electrolyte layer, it is preferable to use a solid electrolyte. Such solid electrolyte can be obtained by dissolving the electrolyte into a macromolecular compound as the matrix.

Preferable examples of the macromolecular compound as the matrix include polyethylene oxide, polyethyleneimine, polyethylene sulfide, and the like, which skeleton unit is represented by —$(C-C-O)_n$—, —$(C-C-N)_n$—, or —$(C-C-S)_n$—, respectively; polymethylmethacrylate, polyvinylidene fluoride, polyvinylidene fluoride chloride, polycarbonate, polyamide, polyvinyl butyral, and the like.

These macromolecular compounds may be crosslinked. For crosslinking, it is preferable to use the initiator, and the method thereof may be by photo-crosslinking or thermal crosslinking. In addition, by polymerizing the initiator and the monomers using light or heat, a macromolecular compound which is crosslinked can also be obtained.

In addition, examples of the electrolyte constituting the solid electrolyte include lithium salts (such as, LiCl, LiBr, LiI, $LiBF_4$, $LiClO_4$, $LiPF_6$, $LiCF_3SO_3$, and the like), potassium salts (such as, KCl, KI, KBr, and the like), sodium salts (such as, NaCl, NaI, NaBr), tetraalkylammonium salts (such as, tetraethylammonium fluoroborate, tetraethylammonium perchlorate, tetrabutylammonium fluoroborate, tetrabutylammonium perchlorate, tetrabutylammonium halide), and the like. The alkyl chain lengths of the tetraalkylammonium salts may be non-uniform.

When the solid electrolyte layer is to be formed, it is preferable to add a plasticizer into said macromolecular compound by the amount in accordance with the requirement. As the plasticizer to be used herein, when the macromolecular compound is hydrophilic, water, ethyl alcohol, isopropyl alcohol, the mixtures of these, and the like are preferable, and when the macromolecular compound is hydrophobic, propylene carbonate, dimethyl carbonate, ethylene carbonate, γ-butylolactone, acetonitrile, sulfolane, dimethoxyethane, ethyl alcohol, isopropyl alcohol, dimethylformamide, dimethylsulfoxide, dimethylacetamide, n-methylpyrrolidone, nitromethane, pyridine, dipyridyl, and the mixtures of these are preferable.

The solid electrolyte as mentioned above preferably in the gelated state from the viewpoint of holdability of the precipitated metal. As the means for gelating the solid electrolyte, the method which cures the macromolecular compound by UV or heat, the method which physically lowers the fluidity, or any other technique which is popularly used may be used.

Herein, with the display layer in (4), the decolored state is formed on the electrochromic phenomenon, and white color is displayed by the method which includes a white pigment in the electrolyte layer, or by using a white substrate.

As the white pigment which is contained in the electrolyte layer for displaying white color, titanium dioxide, zinc oxide, or the like can be used. Among these, from the viewpoint of degree of whiteness, titanium dioxide and zinc oxide are particularly preferably used, and using these two in mixture also provides a preferable mode.

The crystal type of the titanium dioxide may be either rutile type or anatase type.

In the present invention, the titanium dioxide which is suitable as the white pigment is preferably subjected to surface treatment with an inorganic substance, especially, Si (silica), Zr (zirconia), Zn (zinc), Al (alumina), or the like, in order to obtain a light resistance. The inorganic substance to be used for the surface treatment may be of one type, or the plural types may be used.

In addition, the titanium dioxide which has been subjected to surface treatment with an inorganic substance as described above may be further subjected to surface treatment with an organic substance, from the viewpoint of dispersion stability in the electrolyte layer. In addition, for dispersion stabilization of the titanium dioxide, a dispersion agent may also be included in the electrolyte layer.

In addition, in order to obtain a desired whiteness, and to mask the other members, the average particle diameter of the titanium dioxide is preferably in the range of 0.03 μm to 0.5 μm as the primary particle diameter, is more preferably in the range of 0.1 μm to 0.5 μm, and is most preferably in the range of 0.2 μm to 0.4 μm.

The titanium dioxide may be of two or more types having different average particle diameters, being used in mixture.

In order to obtain a sufficient whiteness, the type and the amount of use of the white pigment may be determined as appropriate. For example, by using a white pigment which differs from the solid electrolyte in index of refraction by 0.45 or more, or by including the white pigment in the volume of the solid electrolyte by 10% or higher, a sufficient whiteness can be obtained.

As the amount of use of the white pigment, it is generally preferable to include 10% to 70% per weight in the electrolyte layer, is more preferable to include 15% to 60% per weight, and is most preferable to include 20% to 60% per weight.

In addition, as the method for dispersing the white pigment into the electrolyte layer, the homogenizer, the bead mill, the ball mill, or any other well-known method can be used.

On the other hand, when, in the display layer in (4), white color is to be displayed by using a white substrate, only the substrate which does not form the display surface, among the pair of substrates sandwiching the electrolyte layer, is used as the white substrate.

As the white substrate, a PET substrate which is whitened by mixing titanium oxide fine particles, and the like, can be mentioned.

Between the white substrate and the electrolyte layer, an electrode is provided, but it is necessary that this electrode be a white electrode or a transparent electrode so as not to mask the white color.

In addition, as the white substrate, a white electrically conductive substrate may be used.

On the other hand, when the pair of substrates is to be transparent substrates, the same as the pair of oppositely disposed substrates constituting the display layer in said (1) is used.

In addition, also as the electrodes provided for the transparent substrates, the same as said pair of oppositely disposed electrodes constituting the display layer in (1) is used.

To the display layer as described above as in (4), the electrochemical display device and electrochemical display apparatus which utilize the electrochemical oxidation and reduction for color changing the material as principle, as described in paragraphs from [0046] to [0074] in JP-A No. 2003-302658; the electrodeposition type image display apparatus as described in paragraphs from [0015] to [0062] in JP-A No. 11-101994; the electrochromic display device which, as the display material, uses a material which changes its color by the electrochemical oxidation and reduction, as described in paragraphs from [0017] to [0078] in JP-A No. 2002-287173; and the display mechanism in the display device on the electrochemical oxidation and reduction, as described in paragraphs from [0019] to [0126] in JP-A No. 2003-241227, and in paragraphs from [0019] to [0039] in JP-A No. 2005-92183; for example, are applicable.

Hereinabove, the four modes of the display layer have been described, however, the display layer in the present invention is not limited to these modes.

The size of the display layer in the present invention is determined to suit to the size of the display device to be manufactured, and one display device may be formed with a single display layer, or one display device may be formed with a plurality of display layers.

[Light-Modulating Layer]

The light-modulating layer in the present invention includes mobile fine particles (hereinafter, sometimes referred to as "specific mobile fine particles") which show coloration in the dispersed state. In addition to these, mobile fine particles other than specific mobile fine particles, a non-conductive liquid, a macromolecular resin, a high-molecular weight pigment dispersant, and the like can also be added as required.

The wording "mobile fine particles which show coloration in the dispersed state" refers to that the specific mobile fine particles show a hue which can be visually observed in the state in which they are dispersed in the medium.

The hue can be rendered multicolored by changing the metal, shape, particle diameter (volumetric average particle diameter), and the like, of the specific mobile fine particles, particularly the metallic colloidal particles.

The color formation by the metallic colloid, such as a gold colloid, or the like, comes from the plasma oscillation of the electrons, being based on the color formation mechanism called the plasmon absorption. It is said that the color formation based on this plasmon absorption is caused by the free electrons in the metal being quivered by the photoelectric field, which results in electric charges being developed on the particle surface, with a non-linear polarization being generated. This color formation by the metallic colloid provides a high saturation and light ray transmissivity, being excellent in durability, and the like. Such a color formation by the metallic colloid can be seen with so-called nano-particles, which have a particle diameter ranging from a few nm to a few tens nm or so, and as the light-modulating material, it is advantageously a colloid having a narrow particle diameter distribution.

(Specific Mobile Fine Particles)

The specific mobile fine particles in the present invention are not particularly limited, provided that they are fine particles which show coloration in the dispersed state, and have mobility on the stimulus which is applied from the outside. As such specific mobile fine particles, charged mobile fine particles which show mobility with the electric field (voltage) being applied, magnetic mobile fine particles which show mobility with the magnetism being applied, and the like, can be mentioned.

In the present invention, from the viewpoints of dispersibility and mobility, the charged mobile fine particles and the magnetic mobile fine particles are preferable.

The specific mobile fine particles may be used singly, or a combination of two or more kinds thereof may be used if desired.

—Charged Mobile Fine Particles as One of the Specific Mobile Fine Particles—

The charged mobile fine particles as one of the specific mobile fine particles to be used are not limited, provided that they are those which are used with the electrophoretic method. Among the charged mobile fine particles, the metallic colloidal particles having the color strength due to the surface plasmon resonance are preferably used from the viewpoints of colorability and stability.

Hereinbelow, the description will be given using the metallic colloidal particles as an example, but the specification is not limited to this.

As the metal of said metallic colloidal particles, a noble metal, copper, and the like, (hereinbelow to be collectively called "metal") can be mentioned, and said noble metal is not particularly limited, and for example, gold, silver, ruthenium, rhodium, palladium, osmium, iridium, platinum, and the like can be mentioned. Among the metals, gold, silver, platinum are preferable.

For the metallic colloidal particles, a chemical method which reduces the metallic ions to produce metallic atoms, and then prepare nano-particles through a metallic cluster; a physical method which evaporates a bulk metal in an inert gas, and catches the metal changed into fine particles, using a cold trap, or the like, or vacuum-deposits it on a polymer thin film to form a metallic thin film, and then heats the metallic thin film for destructing it to disperse the metallic fine particles into the polymer in the solid phase state; are known. The chemical method eliminates the need for using a special apparatus, and is advantageous for preparation of the metallic colloidal particles of the present invention, thus, general examples will be described later, but the specification is not limited to these.

Said metallic colloidal particles are formed from the compounds of said metals. The compounds of the metals are not particularly limited, provided that they contain said metals, and examples thereof include chloroauric acid, silver nitrate, silver acetate, silver perchlorate, platinic chloride, potassium chloroplatinate, copper(II) chloride, copper(II) acetate, copper(II) sulfate, and the like.

Said metallic colloidal particles can be obtained as a dispersion of metallic colloidal particles protected by a dispersant by dissolving the compound of said metal into a solvent, and then reducing it to the metal, but can also be obtained in the form of a solid sol by removing the solvent of the dispersion. In addition, they may be obtained in any form other than these.

In dissolving the compound of said metal, the high-molecular weight pigment dispersant later described can also be used. By using the macromolecular pigment dispersant, the metallic colloidal particles can be obtained as stable metallic colloidal particles protected by said dispersant.

When the metallic colloidal particles in the present invention is to be used, they can be used as the dispersion of metallic colloidal particles obtained as described above, or the solid sol obtained by removing said solvent can be redispersed into the solvent for use, and there is no particular limitation in the present invention.

When they are to be used as the dispersion of metallic colloidal particles, said solvent at the time of preparation is preferably the nonconductive liquid later described. In addition, when said solid sol is to be redispersed for use, the solvent at the time of preparation of the solid sol is not particularly limited, and any solvent may be used. The solvent to be used in redispersion is preferably the nonconductive liquid later described.

The volumetric average particle diameter of said charged mobile fine particles is preferably 1 to 100 nm, is more preferably 2 to 50 nm, and is particularly preferably 5 to 50 nm, from the viewpoint of coloration.

In addition, the metallic colloidal particles can develop various colors, depending upon the type of the metal, the shape, and the volumetric average particle diameter. Therefore, by using said metallic colloidal particles which have been prepared under the control of the type of the metal, the shape, and the volumetric average particle diameter, various hues including the RGB color formation, or the YMC color formation, for example, can be obtained. Thereby, the display medium of the present invention is capable of giving full color display.

The volumetric average particle diameter of the metallic colloidal particles for showing the respective colors of R, G, and B in the RGB system vary depending upon the metal used, the conditions for preparing the particles, the shape, and the like, thus it cannot be particularly limited, however, the gold colloidal particles, for example, tend to provide R color formation, G color formation, and B color formation in this order as the volumetric average particle diameter is increased.

As the measuring method for volumetric average particle diameter in the present invention, the laser diffraction scattering method which irradiates the particles with laser light, and determines the average particle diameter from the intensity distribution pattern for the diffracted and scattered light issued therefrom.

The content (% by mass) of the charged mobile fine particles as one of the specific mobile fine particles for the total mass in the light-modulating layer is not particularly limited, provided that a desired hue can be obtained at the concentration, and the content can be adjusted in accordance with the thickness of the light-modulating layer. Namely, in order to obtain a desired hue, the content can be decreased when the light-modulating layer is thicker, or it can be increased when the light-modulating layer is thinner. Generally, the content is 0.01 to 50% by mass.

Said metallic colloidal particles can be prepared by, for example, the general preparation method as described in the literature "Synthesis/Preparation of Metallic Nano-particles—Control Techniques and Application Development" (by TECHNICAL INFORMATION INSTITUTE CO., LTD., 2004). Hereinbelow, an example thereof will be described, but the method is not limited thereto.

—Solid Sol—

Hereinbelow, an example of the solid sol of a metal in preparation of said metallic colloidal particles will be described.

In the solid sol of a metal in the present invention, the colloidal particles of the above-mentioned metal are preferably contained by 50 mmol or more per 1 kg of the high-molecular weight pigment dispersant later described, from the viewpoint of colorability. If the content of the colloidal particles of the above-mentioned metal is under 50 mmol, the colorability will be insufficient. The content is more preferably 100 mmol or higher.

In the solid sol of a metal in the present invention, the colloidal particles of the metal preferably have a volumetric average particle diameter of 1 to 100 nm. If it is under 1 nm, the light-modulating power is low, and if it exceeds 100 nm, the saturation is low. In addition, the solid sol of a metal in the present invention preferably shows a narrow particle size distribution. If it shows a wide particle size distribution, the saturation is low, which is not preferable.

The solid sol of a metal in the present invention has a high saturation, and contains the metallic colloidal particles at a high concentration, thus having a good colorability. In addition, the solid sol of a metal in the present invention has a good compatibility with a macromolecular resin (binder), such as the resin, or the like, thus if such a macromolecular resin (binder) is added, the solid sol of a metal in the present invention is stable, and will not aggregate, having a sufficient colorability. Any other additives can be added as required. Further, by dissolving it into an appropriate solvent, it can also be used in the form of a hydrosol or an organosol.

—Manufacturing Method for Solid Sol—

An example of the manufacturing method for said solid sol of a metal will be described hereinbelow, but the method is not limited thereto. Namely, the compound of the metal is dissolved into the solvent, and after the high-molecular weight pigment dispersant being added, is reduced to the metal to form the colloidal particles of the metal protected by the above-mentioned high-molecular weight pigment dispersant, which is then followed by removing the above-mentioned solvent to obtain the solid sol.

In said manufacturing method, the above-mentioned compound of the metal is dissolved into the solvent for use. The above-mentioned solvent is not particularly limited, provided that it can dissolve the above-mentioned compound of the metal, and examples thereof include water, water-soluble organic solvents, such as acetone, methanol, ethyleneglycol, and the like, and the like. These may be used one type alone or two or more types in combination. In the present invention, it is preferable to use water and a water-soluble organic solvent in combination.

When the above-mentioned solvent is a mixture solvent made up of water and a water-soluble organic solvent, it is preferable that the above-mentioned compound of the metal is first dissolved into water, and then the water-soluble organic solvent is added to provide a solution. At this time, the above-mentioned compound of the metal is preferably into water so as to be 50 mM or higher. If it is under 50 mM, a solid sol containing the colloidal particles of the metal at a high rate cannot be obtained. More preferably, it is 100 mM or higher.

When silver is used as the metal, the above-mentioned aqueous solution preferably has a pH value of 7 or lower. For example, when silver nitrate is used as the above-mentioned compound of silver, the pH exceeding 7 will generate a by-product, such as silver oxide, or the like, in reducing the silver ions, resulting in the solution becoming cloudy, which is not preferable. If the pH of the above-mentioned aqueous solution exceeds 7, it is preferable to add approx. 0.1 N nitric acid, or the like, for example, for adjusting the pH to 7 or lower.

The above-mentioned water-soluble organic solvent is preferably added into the water dissolving the above-mentioned compound of the metal such that the volume ratio is 1.0 or higher. If it is under 1.0, the water-insoluble high-molecular weight pigment dispersant will not be dissolved. More preferably, it is 5.0 or higher.

In preparation of the metallic colloidal particles in the present invention, it is also effective to add the high-molecular weight pigment dispersant into the solution of the above-mentioned compound of the metal. When the above-mentioned solvent is a mixture solvent made up of water and a water-soluble organic solvent, the above-mentioned high-molecular weight pigment dispersant is preferably water-insoluble. If it is water-soluble, precipitation of the colloidal particles will be difficult in removing the water-soluble organic solvent to obtain the solid sol. Examples of the above-mentioned water-insoluble high-molecular weight pigment dispersant include Disperbyk 161, Disperbyk 166 (manufactured by BYK-Chemie GmbH), Solsperse 24000, Solsperse 28000 (manufactured by Zeneca Inc.), and the like.

The amount of addition of the above-mentioned high-molecular weight pigment dispersant is preferably 20 to 1,000 parts by mass for 100 parts by mass of the above-mentioned metal. If it is under 20 parts by mass, the dispersibility of the above-mentioned colloidal particles of the metal is insufficient, and if it exceeds 1,000 parts by mass, the amount of inclusion of the high-molecular weight pigment dispersant for the binder resin will be too high when the high-molecular weight pigment dispersant is compounded into the paint or the resin molding, which tends to produce an unsatisfactoriness in physical properties, and the like. More preferably, it is 50 to 650 parts by mass.

In preparation of the metallic colloidal particles in the present invention, the above-mentioned high-molecular weight pigment dispersant is added into the solution of the above-mentioned compound of the metal, and then the ions of the metal are reduced. The above-mentioned reduction method is not particularly limited, and examples thereof include the method which adds a compound to chemically reduce the metallic ions, the method which irradiates light using a high-pressure mercury lamp for reduction, and the like.

The above-mentioned compound is not particularly limited, and for example, alkali metal borohydrides, such as sodium borohydride, and the like; hydrazine compounds; citric acid and its salt, succinic acid and its salt, and the like can be used. In addition, in the present invention, an amine can be used besides the above-mentioned reducing agents.

By adding the above-mentioned amine into the solution of the above-mentioned compound of the metal, and stirring and mixing the solution, the metallic ions, and the like, are reduced at a temperature close to room temperature. By using the above-mentioned amine, the need for using a reducing agent which is highly hazardous and noxious is eliminated, and with no need for applying heat and using a special light irradiation apparatus, the compound of the metal can be reduced at a reaction temperature of 5 to 100 deg C. or so, and preferably of 20 to 80 deg C. or so.

The above-mentioned amine is not particularly limited, and examples thereof include aliphatic amines, such as propylamine, butylamine, hexylamine, diethylamine, dipropylamine, dimethylethylamine, diethylmethylamine, triethylamine, ethylenediamine, N,N,N',N'-tetramethylethylenediamine, 1,3-diaminopropane, N,N,N',N'-tetramethyl-1,3-diaminopropane, triethylenetetramine, tetraethylenepentamine, and the like; alicyclic amines, such as piperidine, N-methylpiperidine, piperazine, N,N'-dimethylpiperazine, pyrrolidine, N-methylpyrrolidine, morpholine, and the like; aromatic amines, such as aniline, N-methylaniline, N,N-dimethylaniline, toluidine, anisidine, phenetidine, and the like; aralkylamines, such as benzylamine, N-methylbenzylamine, N,N-dimethylbenzylamine, phenethylamine, xylylenediamine, N,N,N',N'-tetramethylxylylenediamine, and the like, and the like. In addition, examples of the above-mentioned amine also include alkanolamines, such as methylaminoethanol, dimethylaminoethanol, triethanolamine, ethanolamine, diethanolamine, methyldiethanolamine, propanolamine, 2-(3-aminopropylamino) ethanol, butanolamine, hexanolamine, dimethylaminopropanol, and the like. Among these, alkanolamines are preferable.

The amount of addition of the above-mentioned amine is preferably 1 to 50 mol for 1 mol of the above-mentioned compound of the metal. If it is under 1 mol, the reduction will not be sufficiently carried out, and if it exceeds 50 mol, the stability against aggregation of the colloidal particles generated is lowered. More preferably, it is 2 to 8 mol.

In addition, when the above-mentioned sodium borohydride is used as the above-mentioned reducing agent, the reduction can be performed at room temperature, thus there is no need for applying heat and using a special light irradiation apparatus.

The amount of addition of the above-mentioned sodium borohydride is preferably 1 to 50 mol for 1 mol of the above-mentioned compound of the metal. If it is under 1 mol, the reduction will not be sufficiently carried out, and if it exceeds 50 mol, the stability against aggregation of the colloidal particles generated is lowered. More preferably, it is 1.5 to 10 mol.

When citric acid or its salt is used as the above-mentioned reducing agent, the metallic ions, and the like, can be reduced by heating and refluxing in the presence of alcohol. As the above-mentioned citric acid or its salt, sodium citrate is preferably used.

The amount of addition of the above-mentioned citric acid or its salt is preferably 1 to 50 mol for 1 mol of the above-mentioned compound of the metal. If it is under 1 mol, the reduction will not be sufficiently carried out, and if it exceeds 50 mol, the stability against aggregation of the colloidal particles generated is lowered. More preferably, it is 1.5 to 10 mol.

In preparation of the metallic colloidal particles in the present invention, the above-mentioned ions of the metal are reduced, and then the metallic colloidal particles protected by the above-mentioned high-molecular weight pigment dispersant are precipitated before removing the above-mentioned solvent. When water and the water-soluble organic solvent are used as the above-mentioned solvent, they can be removed by using an appropriate one of the following methods according to the nature of the high-molecular weight pigment dispersant used.

When the above-mentioned high-molecular weight pigment dispersant is water-insoluble, the above-mentioned water-soluble organic solvent is first removed by evaporation, or the like, the colloidal particles of the metal protected by the above-mentioned high-molecular weight pigment dispersant are preferably precipitated before removing the water. The above-mentioned high-molecular weight pigment dispersant is water-insoluble, thus, by removing the above-mentioned water-soluble organic solvent, the colloidal particles of the metal protected by the above-mentioned high-molecular weight pigment dispersant are precipitated.

In this case, the above-mentioned water-soluble organic solvent preferably has a higher evaporation speed than that for the water. If it has an evaporation speed lower than that for the water, when the above-mentioned high-molecular weight pigment dispersant used is water-insoluble, the above-mentioned water-soluble organic solvent cannot be first removed in removing the solvent to obtain the solid sol, which makes it impossible to precipitate the colloidal particles of the metal.

When the above-mentioned high-molecular weight pigment dispersant is of solvent type, a non-polarity organic solvent which will not dissolve the high-molecular weight pigment dispersant is added by an excess amount to precipitate the colloidal particles of the metal protected by the above-mentioned high-molecular weight pigment dispersant, and then the solvent can be removed by decantation, or the like.

After removing the above-mentioned solvent, the colloidal particles of the metal protected by the above-mentioned high-molecular weight pigment dispersant may be cleaned using deionized water. When the colloidal particles of the metal protected by the above-mentioned high-molecular weight pigment dispersant are precipitated by an excess amount of the above-mentioned non-polarity solvent, it can be cleaned with the use of the above-mentioned non-polarity organic solvent.

In the manufacturing method for the solid sol of a metal in the present invention, the solid sol of the metal obtained has a colloidal average particle diameter of 1 to 100 nm, and a narrow particle size distribution, resulting in a dense color and a high saturation being provided.

The manufacturing method for the solid sol of a metal in the present invention can be implemented by a fewer processes, i.e., the processes of dissolving the above-mentioned compound of the metal into the solvent to provide a solution; adding the above-mentioned high-molecular weight pigment dispersant and then reducing it to the metal; and thereafter removing the solvent, and yet can manufacture the solid sol of the metal that has a high saturation, and contains the colloidal particles of the metal at a high concentration, compared to the conventional solid sol of the metal. Particularly, by using an alkanolamine, the solid sol of the metal can be conveniently manufactured under a moderate temperature condition of 20 to 80 deg C. or so.

By the above-described method, the metallic colloidal particles can be prepared. However, as the metallic colloidal particles in the present invention, commercially available metallic colloidal particles can be used, provided that they show coloration in the dispersed state.

Further, specifically, the dispersion of said metallic colloidal particles can be prepared by using the following methods (1) to (4), however, the method is not limited to these.

—Preparation Method for Dispersion of Metallic Colloidal Particles—

The preparation method for the dispersion of said metallic colloidal particles in the present invention allows either form of the aqueous system or the non-polarity solvent system to be used for preparation. For example, the dispersion of metallic colloidal particles using gold or silver can be prepared by employing the following preparation methods, however, the method is not limited to these.

(1) After dissolving a metallic compound (for example, hydrogen tetrachloroaurate(III) tetrahydrate) into a nonconductive liquid (for example, water), an aqueous solution containing 1.5 times the weight of a high-molecular weight pigment dispersant (for example, Solsperse 20000) for the metal (for example, gold) is mixed, and the solution is stirred.

Into this mixture solution, an aliphatic amine (for example, dimethylaminoethanol) is added to initiate the reduction reaction of the gold ions, then, filtration and condensation are performed to obtain a solution of gold colloidal particles.

(2) After dissolving a metallic compound (for example, hydrogen tetrachloroaurate(III) tetrahydrate) into water, a solution prepared by dissolving 1.5 times the weight of a high-molecular weight pigment dispersant (for example, Solsperse 24000) for the metal (for example, gold) in a non-polarity organic solvent (for example, acetone) is mixed, and the solution is stirred.

Into this mixture solution, an aliphatic amine (for example, dimethylaminoethanol) is added to initiate the reduction reaction of the gold ions, then said non-polarity solvent is evaporated to obtain a solid sol made up of gold colloidal particles and the high-molecular weight pigment dispersant. Thereafter, by decantation, the solid sol is cleaned with water, and a non-polarity organic solvent (for example, ethanol) is added to obtain a solution of gold colloidal particles.

(3) After dissolving a metallic compound (for example, silver(I) nitrate) into water, an aqueous solution containing 1.5 times the weight of a high-molecular weight pigment dispersant (for example, Solsperse 20000) for the metal (for example, silver) is mixed, and the solution is stirred.

Into this mixture solution, an aliphatic amine (for example, dimethylaminoethanol) is added to initiate the reduction reaction of the silver ions, then, filtration and condensation are performed to obtain a solution of silver colloidal particles in the aqueous system.

(4) After dissolving a metallic compound (for example, silver(I) nitrate) into water, a solution prepared by dissolving 1.5 times the weight of a high-molecular weight pigment dispersant (for example, Solsperse 24000) for the metal (for example, silver) in a non-polarity organic solvent (for example, acetone) is mixed, and the solution is stirred. Into this mixture solution, an aliphatic amine (for example, dimethylaminoethanol) is added to initiate the reduction reaction of the silver ions, then, the non-polarity solvent is evaporated to obtain a solid sol made up of silver colloidal particles and the high-molecular weight pigment dispersant. Thereafter, by decantation, the solid sol is cleaned with water, and a non-polarity organic solvent (for example, toluene) is added to obtain a solution of silver colloidal particles in the solvent system.

For said metallic colloidal particles and the solution thereof, and the like, those as described in JP-A No. 11-76800 can be exemplarily used.

—Magnetic Mobile Fine Particles as One of the Specific Mobile Fine Particles—

The magnetic mobile fine particles as one of the specific mobile fine particles to be used are not limited, provided that they are those which are used with the electrophoretic method. From the viewpoint of color display, it is preferable to use the magnetic mobile fine particles with which the magnetic particles are colored to a desired color. As the magnetic mobile fine particles which are colored to a desired color, specifically, the magnetic particles (the magnetic particles having the respective colors) as described from right column bottom 29th line on page 2 to left column bottom 5th line on page 3 in JP-A No. 4-175196 can be used.

The volumetric average particle diameter of the magnetic mobile fine particles to be used in the present invention is preferably 1 to 50 µm, and is particularly preferably 5 to 20 µm from the viewpoint of coloration.

In addition, the content (% by mass) of the magnetic mobile fine particles as one of the specific mobile fine particles for the total mass in the light-modulating layer is not particularly limited, provided that a desired hue can be obtained at the concentration, and the content can be adjusted in accordance with the thickness of the light-modulating layer. Namely, in order to obtain a desired hue, the content can be decreased when the light-modulating layer is thicker, or it can be increased when the light-modulating layer is thinner. Generally, the content is 1 to 50% by mass.

(Mobile Fine Particles Other Than Specific Mobile Fine Particles)

The light-modulating layer may include mobile fine particles other than the specific mobile fine particles without damaging the effects of the present invention.

As the mobile fine particles other than the specific mobile fine particles, for example, the following mobile fine particles can be used:

nano-particles formed by using conductive materials such platinum, palladium, ruthenium, rhodium, iridium, and alloys thereof;

commercially available electrophoretic particles such as Micropearl (manufactured by Sekiui Chemical), Epocolor (manufactured by Nippon Shokubai), Chemisnow (manufactured by Soken Chemical & Engineering), and Techpolymer (manufactured by Sekiui Plastics);

colored electrophoretic particles including an organic pigment such as an azo type pigment, polycondensed azo type pigment, metal-complex azo type pigment, phthalocyanine type pigment, quinacridone type pigment, dioxazine type pigment, and perylene type pigment;

colored electrophoretic particles including an inorganic pigment such as a titanium oxide, zinc oxide, carbon black, iron black, and alumina white;

colored electrophoretic particles including a dye such as a phthalocyanine type dye, azo type dye, and anthraquinone type dye;

capsulated fine particles composed of a mixture of an additive such as a dispersant and an above-described organic pigment, inorganic pigment or dye, or a mixture of a resin and an above-described organic pigment, inorganic pigment or dye;

inorganic pigment particles such as titanium oxide, silica, yellow iron oxide, titan yellow, brown iron oxide, cobalt green, cobalt-chrome green, titan-cobalt green, Prussian blue, cobalt blue, ultramarine blue, cerulean blue, cobalt-aluminum-chrome blue, cobalt violet, carbon black, iron black, manganese-ferrite black, titan black, cobalt-ferrite black, aluminum powder, black low-oxidized titanium oxide, copper powder, tin powder, and zinc powder;

organic pigment particles such as disazo yellow, condensed azo yellow, rhodamine 6G lake, anthraqinonyl red, perylene red, perylene maroon, quinacrydone maroon, quinacrydone scarlet, quinacrydone red, phthalocyanine green, phthalocyanine blue, rhodamine B lake, dioxadine violet, naphthol violet; and polymer particles such as styrene type, styrene-acrylate type, acrylate type, methacrylate type, methyl methacrylate type, methl acrylate type, ethyl methacrylate type, n-butyl methacrylate type, ester type, acrylic acid type, acrylic rubber-mathacrylate type, nylon type, silicone type, urethane type, melamine type, vinylidene chloride type, quarternary pyridinium salt type, and cellulose.

In the present invention, when the mobile fine particles other than the specific mobile fine particles are used with the specific mobile fine particles together, the content of the mobile fine particles other than the specific mobile fine particles for the content of the total mobile fine particles in the light-moculating layer is preferably not more than 70% by mass, and more preferably not more than 35% by mass.

—Nonconductive Liquid—

The dispersant of the mobile fine particles (including the specific mobile fine particles and the other mobile fine particles) in the present invention is preferably a nonconductive liquid.

Specific examples of said nonconductive liquid which can be exemplarily used include hexane, cyclohexane, toluene, xylene, decane, hexadecane, kerosene, paraffin, isoparaffin, silicone oil, dichloroethylene, trichloroethylene, perchloroethylene, high-purity petroleum, ethylene glycol, alcohols, ethers, esters, dimethylformamide, dimethylacetamide, dimethyl sulfoxide, N-methylpyrrolidone, 2-pyrrolidone, N-methylformamide, acetonitrile, tetrahydrofuran, propylene carbonate, ethylene carbonate, benzine, diisopropylnaphthalene, olive oil, isopropanol, trichlorotrifluoroethane, tetrachloroethane, dibromotetrafluoroethane, and the like, and the mixtures thereof.

In addition, water (so called pure water), which has the following value of volume resistivity as a result of removing the impurities, can be exemplarily used. The value of volume resistivity is preferably $10^3$ Ωcm or higher, is more preferably $10^7$ Ωcm to $10^{19}$ Ωcm, and still more preferably $10^{10}$ to $10^{19}$ Ωcm. By providing such a value of volume resistivity, the occurrence of bubbles by the electrolysis of the liquid resulting from the electrode reaction is more effectively suppressed; the possibility that the electrophoretic characteristic of the particle is impaired every time the system is energized is eliminated; and an excellent repetitive stability can be provided.

Into the nonconductive liquid, an acid, an alkali, a salt, a dispersion stabilizer, a stabilizer for the purpose of oxidation prevention, UV absorption, or the like, an antibacterial agent, a preservative, and the like can be added as required, however, the addition is preferably performed such that the value of volume resistivity is in the specific range as given above.

—Macromolecular Resin—

The charged mobile fine particles (metallic colloidal particles) in the present invention are preferably dispersed in a macromolecular resin. It is also preferable that the macromolecular resin is a macromolecular gel, a network polymer, or the like.

Examples of the macromolecular resin include macromolecular gels derived from natural macromolecules, such as agarose, agaropectin, amylose, sodium alginate, propylene glycol alginate, isolichenan, insulin, ethyl cellulose, ethyl hydroxyethyl cellulose, curdlan, casein, carrageenan, carboxymethylcellulose, carboxymethyl starch, callose, agar, chitin, chitosan, silk fibroin, guar gum, Quince seed, crown gall polysaccharide, glycogen, glucomannan, keratan sulfate, keratin protein, collagen, cellulose acetate, Gellan gum, sizofuran, gelatin, ivory nut mannan, tunicin, dextran, dermatan sulfate, starch, Tragacanth gum, nigeran, hyaluronic acid, hydroxyethylcellulose, hydroxypropylcellulose, pustulan, funoran, degraded xyloglucan, pectin, porphyran, methylcellulose, methyl starch, laminaran, lichenan, lentinan, Locust bean gum, and the like, and besides these, include macromolecular gels of almost all synthetic macromolecules.

Further, macromolecules which contain an alcohol, ketone, ether, ester, or amide functional group in the repeating unit, and the like, can be mentioned, and examples thereof include polyvinyl alcohol, poly(meth)acrylamide and derivatives thereof, polyvinyl pyrrolidone, polyethylene oxide, and copolymers including these macromolecules.

Among these, from the viewpoint of manufacturing stability, electrophoretic characteristic, and the like, gelatin, polyvinyl alcohol, poly(meth)acrylamide, and the like, are preferably used.

These macromolecular resins are preferably used together with said nonconductive liquid.

—High-Molecular Weight Pigment Dispersant—

In the present invention, when the metallic colloidal particles are used as the specific mobile fine particles, a highmolucular weight pigment dispersant is preferably used together.

The above-mentioned high-molecular weight pigment dispersant is not particularly limited, but those which are described hereinbelow can be exemplarily used. They are:

(1) Comb structure macromolecule having a pigment affinity group in the main chain and/or a plurality of side chains, and having a plurality of side chains constituting the solvation part (2) Macromolecule having a plurality of pigment affinity parts made up of a pigment affinity group in the main chain (3) Linear macromolecule having a pigment affinity part made up of a pigment affinity group at one end of the main chain Herein, the above-mentioned pigment affinity group refers to a functional group having a high adsorption power to the surface of a pigment; examples thereof in organozol include tertiary amino group, quaternary ammonium group, heterocyclic group having a basic nitrogen atom, hydroxyl group, carboxyl group; and examples thereof in hydrosol include phenyl group, lauryl group, stearyl group, dodecyl group, oleyl group, and the like. In the present invention, the above-mentioned pigment affinity group shows a high affinity to the metal. By having the above-mentioned pigment affinity group, the above-mentioned high-molecular weight pigment dispersant can provide a sufficient performance as a protection colloid for the metal.

The above-mentioned comb structure macromolecule (1) is a macromolecule having a structure which connects a plurality of side chains constituting the solvation part to the main chain together with a plurality of side chains having the above-mentioned pigment affinity group, these side chains being connected to the main chain as if they were the teeth of a comb. In the present specification, the above-mentioned structure is called the comb structure. In the above-mentioned comb structure macromolecule (1), the above-mentioned pigment affinity group may exist not only at the side chain end, but also at a plurality of sites in the middle of the side chain or in the main chain. The above-mentioned solvation part refers to a part having an affinity to the solvent, being provided with a hydrophilic or hydrophobic structure. The above-mentioned solvation part is composed of, for example, a water-soluble polymeric chain, a lipophilic polymeric chain, and the like.

The above-mentioned comb structure macromolecule (1) is not particularly limited, and examples thereof include that which is made up of poly(ethyleneimine) having a structure wherein one or more poly(carbonyl-C3-C6-alkyleneoxy) chains are provided, and these respective chains have 3 to 80 carbonyl-C3-C6-alkyleneoxy groups and are connected to the poly(ethyleneimine) by an amide or salt-crosslinking group, or an acid salt thereof, as disclosed in JP-A No. 5-177123; that which is made up of a reaction product of poly(lower alkylene)imine and a polyester having a free carboxylic acid group, wherein at least two polyester chains are connected to each poly(lower alkylene)imine chain, as disclosed in JP-A No. 54-37082; the pigment dispersing agent which is obtained by reacting an amine compound and a carboxyl group-containing prepolymer having a number-average molecular weight of 300 to 7,000 with a high-molecular weight epoxy compound having an epoxy group at end simultaneously or in an optional order, as disclosed in Japanese Patent Publication (Kokoku) No. 7-24746; and the like.

The above-mentioned comb structure macromolecule (1) preferably has 2 to 3,000 pigment affinity groups in a single molecule. If it has less than 2, the dispersion stability is insufficient, and it has more than 3,000, the viscosity becomes too high, which renders it difficult to be handled, and the particle size distribution of the colloidal particles is widened, resulting in the saturation being lowered. More preferably, it has 25 to 1,500 pigment affinity groups.

The above-mentioned comb structure macromolecule (1) preferably has 2 to 1,000 side chains constituting the solvation part in a single molecule. If it has less than 2, the dispersion stability is insufficient, and it has more than 1,000, the viscosity becomes too high, which renders it difficult to be handled, and the particle size distribution of the colloidal particles is widened, resulting in the saturation being lowered. More preferably, it has 5 to 500 side chains constituting the solvation part.

The above-mentioned comb structure macromolecule (1) preferably has a number-average molecular weight of 2,000 to 1,000,000. If it has less than 2,000, the dispersion stability is insufficient, and it has more than 1,000,000, the viscosity becomes too high, which renders it difficult to be handled, and the particle size distribution of the colloidal particles is widened, resulting in the saturation being lowered. More preferably, it has a number-average molecular weight of 4,000 to 500,000.

The above-mentioned copolymer having a plurality of pigment affinity parts made up of a pigment affinity group in the main chain (2) is that in which a plurality of pigment affinity groups are disposed along the main chain, and the above-mentioned pigment affinity group is pendant to, for example, the main chain. In the present specification, the above-mentioned pigment affinity part refers to the part wherein the above-mentioned pigment affinity group exists by one or a plurality, functioning as the anchor to be adsorbed onto the pigment surface.

Examples of the above-mentioned copolymer (2) include the reaction products of polyisocyanate with a mixture of a monohydroxy compound and monohydroxy monocarboxylic acid or a monoamino monocarboxylic acid compound, as well as a compound having at least one basic cyclic nitrogen and an isocyanate reactive group, as disclosed in JP-A No. 4-210220; the macromolecule wherein a group having a plurality of tertiary amino groups or basic cyclic nitrogen atoms is pendant to the main chain made up of polyurethane/polyurea, as disclosed in JP-A No. 60-16631, JP-A Publication No. 2-612, and JP-A No. 63-241018; the copolymer made up of a steric stabilization unit having a water-soluble poly(oxyalkylene) chain, a structural unit, and an amino group-containing unit, whererin the amine group-containing monomeric unit contains a tertiary amino group or a group of an acid addition salt thereof or a quaternary ammonium group, containing 0.025 to 0.5 mili equivalent of amino group per 1 g of the copolymer, as disclosed in JP-A No. 1-279919; the amphiphilic copolymer made up of a main chain made up of an addition polymer and at least one stabilizing agent unit made up of C1-C4-alkoxypolyethylene or polyethylene-co-propylene glycol(meth)acrylate, and having a weight-average molecular weight of 2,500 to 20,000, wherein the main chain contains up to 30% by weight of a nonfunctional structural unit, and up to 70% by weight in total of the stabilizing agent unit and functional units; the above-mentioned functional units are a substituted or unsubstituted styrene-containing unit, a hydroxyl group-containing unit, and a carboxyl group-containing unit; and the ratio of the hydroxyl group to the carboxyl group, that of the hydroxyl group and the styrene group, and that of the hydroxyl group and the propyleneoxy group or ethyleneoxy group are 1:0.10 to 26.1; 1:0.28 to 25.0; and 1:0.80 to 66.1, respectively, as disclosed in JP-A No. 6-1006424; and the like.

The above-mentioned copolymer (2) preferably has 2 to 3,000 pigment affinity groups in a single molecule. If it has less than 2, the dispersion stability is insufficient, and it has more than 3,000, the viscosity becomes too high, which renders it difficult to be handled, and the particle size distribution of the colloidal particles is widened, resulting in the saturation being lowered. More preferably, it has 25 to 1,500 pigment affinity groups.

The above-mentioned copolymer (2) preferably has a number-average molecular weight of 2,000 to 1,000,000. If it has less than 2,000, the dispersion stability is insufficient, and it has more than 1,000,000, the viscosity becomes too high, which renders it difficult to be handled, and the particle size distribution of the colloidal particles is widened, resulting in the saturation being lowered. More preferably, it has a number-average molecular weight of 4,000 to 500,000.

The linear macromolecule having a pigment affinity part made up of a pigment affinity group at one end of the main chain (3) has a pigment affinity part made up of one or a plurality of pigment affinity groups only at one end of the main chain, but, has a sufficient affinity to the pigment surface.

The above-mentioned linear macromolecule (3) is not particularly limited and examples thereof include the A-B block type macromolecule wherein one block is basic, as disclosed in JP-A No. 46-7294; the A-B block type macromolecule wherein an aromatic carboxylic acid is introduced in the A block, as disclosed in U.S. Pat. No. 4,656,226; the A-B block type macromolecule wherein one end is a basic functional group, as disclosed in U.S. Pat. No. 4,032,698; the A-B block type macromolecule wherein one end is an acidic functional group, as disclosed in U.S. Pat. No. 4,070,388; the A-B block type macromolecule wherein the weather and yellowing resistance of the A-B block type macromolecule has been improved by introducing an aromatic carboxylic acid into the A block which is described in the specification of U.S. Pat. No. 4,656,226, as disclosed in JP-A No. 1-204914; and the like.

The above-mentioned linear macromolecular (3) preferably has 2 to 3,000 pigment affinity groups in a single molecule. If it has less than 2, the dispersion stability is insufficient, and it has more than 3,000, the viscosity becomes too high, which renders it difficult to be handled, and the particle size distribution of the colloidal particles is widened, resulting in the saturation being lowered. More preferably, it has 5 to 1,500 pigment affinity groups.

The above-mentioned linear macromolecular (3) preferably has a number-average molecular weight of 1,000 to 1,000,000. If it has less than 1,000, the dispersion stability is insufficient, and it has more than 1,000,000, the viscosity becomes too high, which renders it difficult to be handled, and the particle size distribution of the colloidal particles is widened, resulting in the saturation being lowered. More preferably, it has a number-average molecular weight of 2,000 to 500,000.

As the above-mentioned high-molecular weight pigment dispersant, a commercially available one can also be used. Examples of the above-mentioned commercially available item include Solsperse 20000, Solsperse 24000, Solsperse 26000, Solsperse 27000, Solsperse 28000 (manufactured by Zeneca Inc.); Disperbyk 160, Disperbyk 161, Disperbyk 162, Disperbyk 163, Disperbyk 166, Disperbyk 170, Disperbyk 180, Disperbyk 182, Disperbyk 184, Disperbyk 190 (manufactured by BYK-Chemie GmbH); EFKA-46, EFKA-47, EFKA-48, EFKA-49 (manufactured by EFKA Additives Inc.); Polymer 100, Polymer 120, Polymer 150, Polymer 400, Polymer 401, Polymer 402, Polymer 403, Polymer 450, Polymer 451, Polymer 452, Polymer 453 (manufactured by EFKA Additives Inc.); AJISPER PB711, AJISPER PA111, AJISPER PB811, AJISPER PW911 (manufactured by AJINOMOTO Co., Inc.); Flowlen DOPA-158, Flowlen DOPA-22, Flowlen DOPA-17, Flowlen TG-730W, Flowlen G-700, Flowlen TG-720W (manufactured by KYOEISHA CHEMICAL Co., LTD.), and the like.

The above-mentioned high-molecular weight pigment dispersants are that with which the pigment affinity group exists in the side chains, and which is of graft structure, having side chains constituting the solvation part [the above-mentioned comb structure macromolecule (1)]; and that which has a pigment affinity group in the main chain [the above-mentioned copolymer (2) and the above-mentioned linear macromolecule (3)], thus the colloidal particles have a good dispersibility, and are exemplary as the protection colloid for the colloidal particles of a metal. By using the above-mentioned high-molecular weight pigment dispersant, a dispersion containing the colloidal particles of a metal at a high concentration can be obtained.

In the present invention, the above-mentioned high-molecular weight pigment dispersant preferably has a softening temperature of 30 deg C. or higher. If the softening temperature is below 30 deg C., the solid sol of the metal obtained will cause blocking during storage. More preferably, the softening temperature is 40 deg C. or higher.

The content of the above-mentioned high-molecular weight pigment dispersant is preferably 20 to 1,000 parts by mass for 100 parts by mass for the above-mentioned metal. If it is under 20 parts by mass, the dispersibility of the above-mentioned colloidal particles of the metal is insufficient, and if it exceeds 1,000 parts by mass, the amount of inclusion of the high-molecular weight pigment dispersant for the binder resin will be too high when the high-molecular weight pigment dispersant is compounded into the paint or the resin molding, which tends to produce an unsatisfactoriness in physical properties, and the like. More preferably, it is 50 to 650 parts by mass.

(Fine Particles Moving Part)

When the charged mobile fine particles are to be used in the light-modulating layer in the present invention, it is preferable to provide a configuration which movably holds the above-mentioned charged mobile fine particles between a pair of transparent substrates which are oppositely disposed. In other words, in this case, the fine particles moving part provided close to the light-modulating layer is a pair of electrodes.

As the pair of transparent substrates, films and plate-like substrates made of macromolecules, such as polyester (for example, polyethylene terephthalate), polyimide, polymethylmethacrylate, polystyrene, polypropylene, polyethylene, polyamide, nylon, polyvinyl chloride, polyvinylidenechloride, polycarbonate, polyethersulfone, silicone resin, polyacetal resin, fluororesin, cellulose derivative, polyolefin, and the like; inorganic substrates, such as glass substrates, metallic substrates, ceramic substrates, and the like; and the like are preferably used. Preferably, the transparent substrate has a light transmittance (visible light) of at least 50% or higher.

In addition, the distance between the transparent substrates (the thickness of the light-modulating layer) is determined as appropriate, depending upon the size, the weight, the coloration, and the like, of the light-modulating device to be manufactured. Generally, it is 2 to 1,000 μm or so.

To the light-modulating layer in the present invention, a pair of electrodes is connected, and by the electric field generated by this pair of electrodes, charged mobile fine particles are electrophoresed. At least one of this pair of electrodes is particularly preferably provided at a part of the peripheral end of the light-modulating layer. By the charged mobile fine particles, which is the specific mobile fine particles, being moved toward the electrode provided at a part of the peripheral end of the light-modulating layer, the dispersion state, namely, the color formation state of the charged mobile fine particles is cancelled.

As such an electrode, a transparent electrode having a light transmittance (visible light) of at least 50% or higher is used. Specifically, the metal oxide layer represented by tin oxide-indium oxide (ITO), tin oxide, zinc oxide, and the like is preferably used. In addition, the electrode may be formed by using some of these materials alone, or by laminating a plurality of types of these materials.

The thickness and size of the electrode used may vary depending upon the display device, and are not particularly limited.

When the magnetic mobile fine particles are to be used in the light-modulating layer in the present invention, it is preferable to provide a configuration which movably holds the above-mentioned magnetic mobile fine particles between a pair of transparent substrates which are oppositely disposed, and as the fine particles moving part provided close to this light-modulating layer, a magnetic power generation apparatus, such as a magnet, or the like, is preferably used.

The magnetic power generation apparatus to be used as these fine particles moving part is determined as appropriate, depending upon the quantity, mobility, and the like, of the mobile fine particles in the light-modulating layer.

(Light-Modulating Unit Cell)

The light-modulating layer in the present invention is preferably composed of the plural light-modulating unit cells. Specifically, for example, the mode wherein the plural light-modulating unit cells include a light-modulating unit cell which shows any one of the red, green, and blue colors is preferable, and in order to allow full color display, the preferable mode is that wherein the plural light-modulating unit cells include at least three types of light-modulating unit cell, i.e., the light-modulating unit cell showing red color (R), the light-modulating unit cell showing green color (G), and the light-modulating unit cell showing blue color (B).

Such the plural light-modulating unit cells may be layered on said display layer to constitute the light-modulating layer (the light-modulating layer in FIG. 5A later described), or may be disposed in parallel on said display layer to constitute the light-modulating layer (the light-modulating layer in FIG. 6A later described).

In addition, the size of the light-modulating unit cell is closely related to the resolution of the display device, and the smaller the cell, the higher the resolution of the display device manufactured will be. Therefore, from the viewpoint of better resolution, the plurality of light-modulating unit cells are preferably layered on said display layer. The size of the light-modulating unit cell is generally 10 μm to 1 mm or so.

Hereinbelow, with reference to the drawings, configuration examples of the light-modulating layer in the display device of the present invention will be described.

The members having the same function will be provided with the same sign throughout all the drawings, and the description thereof will be omitted. In addition, in the following configuration examples of the light-modulating layer, it is assumed that the second transparent substrate 8 forms an observing surface.

In the configuration examples of the light-modulating layer and the exemplary embodiments of the display device of the present invention described below, explanation is made on the embodiments in which all the charged mobile fine particles or the magnetic mobile fine particles are the mobile fine particles which show coloration in a dispersed state. However, the present invention is not limited thereto, as described above, the light-modulation layer may contain the mobile fine particles other than the specific mobile fine particles.

Figure 2A:
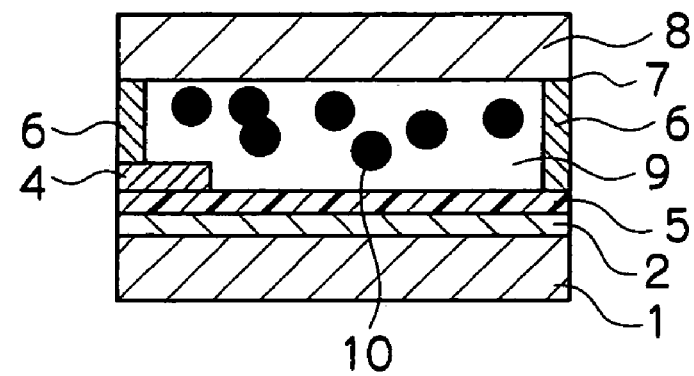
FIG. 2A and FIG. 2B are schematic sectional views illustrating a first example of the light-modulating layer in the present invention.

FIG. 2A is a schematic sectional view illustrating a first example of the light-modulating layer in the present invention.

The light-modulating layer as shown in FIG. 2A has a first electrode 2 on the entire surface of a first transparent substrate 1, and in the upper layer thereof, an isolation layer 5, and further at one end of the isolation layer 5, comprises a second electrode 4 in the form of a line continuing from the front to the rear of the drawing. In addition, on the second electrode 4, and on the isolation layer 5 at the end on the side opposite to the second electrode 4, two partition walls 6 opposed are provided, and further, through the two partition walls 6, a second transparent substrate 8 which is opposed to the first transparent substrate 1 is provided. In other words, in the present mode, the second electrode 4 is provided at a part of the peripheral end of the light-modulating layer. In the internal space formed being surrounded by the above-mentioned respective members, a dispersion including charged mobile fine particles 10 and a nonconductive liquid 9 is encapsulated. In addition, the junction surfaces of the partition wall 6 and the second transparent substrate 8 are bonded by a thermally fusible bonding layer 7.

By the configuration as mentioned above, the first example of the light-modulating layer in the present invention forms one cell.

Figure 2B:
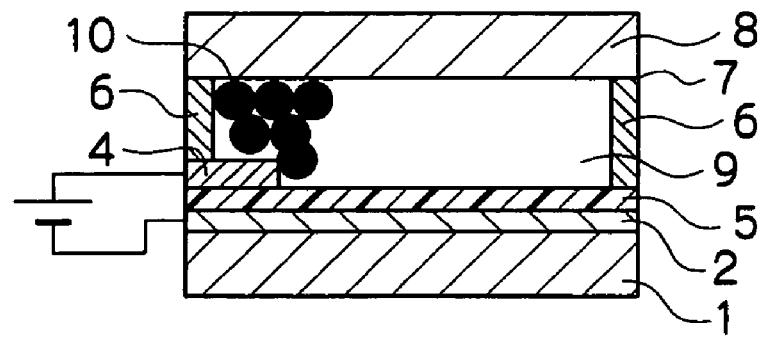

In addition, on the front side and the rear side of the sheet surface in FIG. 2A and FIG. 2B, a partition wall (not shown) to another cell is provided.

The first transparent substrate 1 as shown in FIG. 2A may be shared with a substrate constituting a display layer (not shown), or may be substituted by an isolation layer having a shape holdability.

In addition, the material for the isolation layer 5 is not particularly limited, and a well-known insulating material can be used; for example, an acrylic resin, a polyimide resin, an amorphous fluorocarbon resin, and the like, can be used.

Further, the material for the partition wall 6 is not particularly limited, and a well-known resin material can be used, but from the viewpoint of manufacture, it is preferable to use a photosensitive resin. As shown in FIG. 4 later described, when the partition wall and the electrode are constituted by the same member, the partition wall 6 is made of the same material of which the electrode is made.

The height of the partition wall 6 is not particularly limited, and it is generally 2 μm to 1 mm or so.

The width of said partition wall 6 is not particularly limited, but generally, the smaller the width, the more effective, from the viewpoint of the resolution of the display device, and it is generally 1 μm to 1 mm or so.

The material for the bonding layer 7 is not particularly limited, and a thermosetting resin, a UV setting resin, and the like, can be used, but a material which will have no effect on the material for the partition wall 6, and on the materials constituting the device, such as the nonconductive liquid 9, and the like, is selected.

The operation of the first example of the light-modulating layer in the present invention will be described hereinbelow, using FIG. 2A and FIG. 2B. FIG. 2B is a schematic configuration drawing for the light-modulating layer in the state in which a voltage is applied in FIG. 2A.

With no voltage being applied, as shown in FIG. 2A, the charged mobile fine particles 10 are uniformly dispersed in the inside of the cell, and the color of the charged mobile fine particles 10 is observed as the color of the light-modulating layer (for example, red). On the other hand, when the voltage is applied, with the charged mobile fine particles 10 being, for example, negatively charged, they are moved to the positive electrode (herein, the second electrode 4) side, thus a display layer (not shown) is developed to be looked through the first transparent substrate 1, the second transparent substrate 8, and the first electrode 2, the display device being observed as a white color display or a black color display.

Herein, the movement of the charged mobile fine particles 10 when the voltage is applied is in parallel with respect to the surface of both transparent substrates 1, 8.

Next, a second example of the light-modulating layer in the present invention will be described with reference to FIG. 3A and FIG. 3B.

Figure 3A:
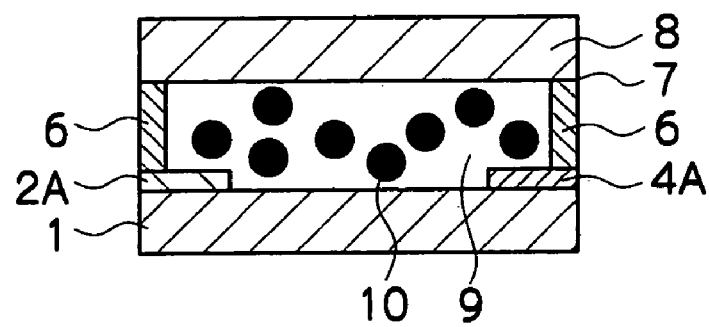
FIG. 3A and FIG. 3B are schematic sectional views illustrating a second example of the light-modulating layer in the present invention.

The light-modulating layer as shown in FIG. 3A comprises a first electrode 2A and a second electrode 4A on both sides of a first transparent substrate 1 in the form of a line continuing from the front to the rear of the drawing. In addition, on both electrodes 2A, 4A, a partition wall 6 is provided, respectively, and further, through the two partition walls 6, a second transparent substrate 8 which is opposed to the first transparent substrate 1 is provided. In the internal space formed being surrounded by the above-mentioned respective members, a dispersion including charged mobile fine particles 10 and a nonconductive liquid 9 is encapsulated.

By the configuration as mentioned above, the second example of the light-modulating layer in the present invention forms one cell.

Figure 3B:
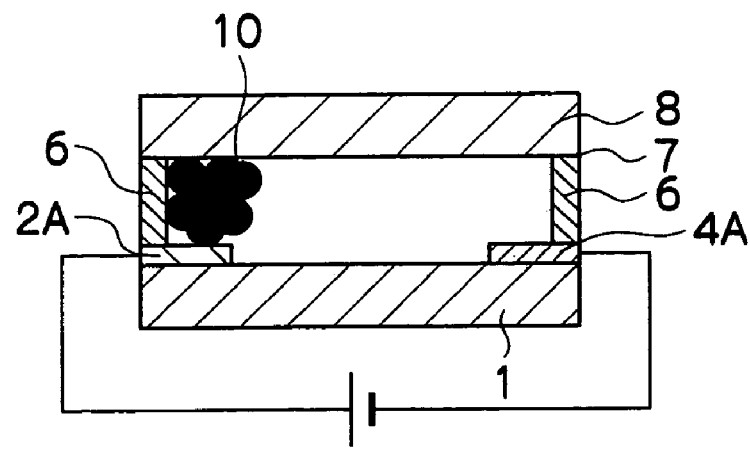

In addition, on the front side and the rear side of the sheet surface in FIG. 3A and FIG. 3B, a partition wall (not shown) to another cell is provided.

The line width of both of the electrodes 2A, 4A as shown in FIG. 3A and FIG. 3B is not particularly limited, but it is generally 2 μm to 1 mm or so.

In addition, the thickness of both of the electrodes 2A, 4A as shown in FIG. 3A and FIG. 3B is not particularly limited, but it is generally 10 nm to 1 μm or so.

The operation of the light-modulating layer as shown in FIG. 3A and FIG. 3B is the same as that of the light-modulating layer as shown in FIG. 2A and FIG. 2B. Herein, FIG. 3B is a schematic configuration drawing for the light-modulating layer in the state in which a voltage is applied in FIG. 3A.

In other words, as shown in FIG. 3A, with no voltage being applied, the charged mobile fine particles 10 are uniformly dispersed in the space of the cell, and the color of the charged mobile fine particles 10 is observed as the color of the cell. On the other hand, as shown in FIG. 3B, when the voltage is applied, with the charged mobile fine particles 10 being, for example, negatively charged, they are moved to the positive electrode (herein, the first electrode 2A) side, thus a display layer (not shown) is developed to be looked through the first transparent substrate 1 and the second transparent substrate 8, the display device being observed as a white color display or a black color display.

Herein, the movement of the charged mobile fine particles 10 when the voltage is applied is in parallel with respect to the surface of both transparent substrates 1, 8.

A third example of the light-modulating layer in the present invention will be described with reference to FIG. 4A and FIG. 4B.

Figure 4A:
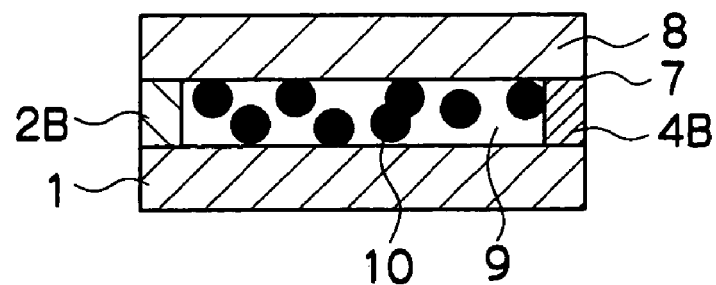
FIG. 4A and FIG. 4B are schematic sectional views illustrating a third example of the light-modulating layer in the present invention.

The light-modulating layer as shown in FIG. 4A provides a first electrode 2B and a second electrode 4B on both sides of a first transparent substrate 1 in the form of a line continuing from the front to the rear of the drawing, and further, through both electrodes 2B, 4B, provides a second transparent substrate 8 which is opposed to the first transparent substrate 1. Herein, both electrodes 2B, 4B have both the function as the electrode and that as the partition wall. In the internal space formed being surrounded by the above-mentioned respective members, a dispersion including charged mobile fine particles 10 and a nonconductive liquid 9 is encapsulated. In addition, the junction surfaces of both of the electrodes 2B, 4B and the second transparent substrate 8 are bonded by a thermally fusible bonding layer 7.

By the configuration as mentioned above, the third example of the light-modulating layer in the present invention forms one cell.

Figure 4B:
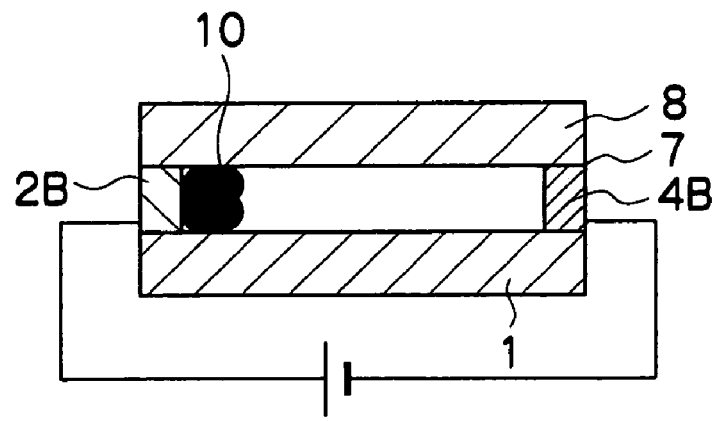

In addition, on the front side and the rear side of the sheet surface in FIG. 4A and FIG. 4B, a partition wall (not shown) to another cell is provided.

The line width of both of the electrodes 2B, 4B as shown in FIG. 4A and FIG. 4B is not particularly limited, but it is generally 1 μm to 1 mm or so.

In addition, the height of both electrodes 2B, 4B is not particularly limited, but it is 2 μm to 1 mm or so.

The operation of the light-modulating layer as shown in FIG. 4A and FIG. 4B is the same as that of the light-modulating layer as shown in FIG. 3A and FIG. 3B. Herein, FIG. 4B is a schematic configuration drawing for the light-modulating layer in the state in which a voltage is applied in FIG. 4A.

In other words, as shown in FIG. 4A, with no voltage being applied, the charged mobile fine particles 10 are uniformly dispersed in the inside of the cell, and the color of the charged mobile fine particles 10 is observed as the color of the cell. On the other hand, as shown in FIG. 4B, when the voltage is applied, with the charged mobile fine particles 10 being, for example, negatively charged, they are moved to the positive electrode (also having the function of the partition wall) (herein, the first electrode 2B) side, thus a display layer (not shown) is developed to be looked through the first transparent substrate 1 and the second transparent substrate 8, the display device being observed as a white color display or a black color display.

Herein, the movement of the charged mobile fine particles 10 when the voltage is applied is in parallel with respect to the surface of both transparent substrates 1, 8.

A fourth example of the light-modulating layer in the present invention will be described with reference to FIG. 5A and FIG. 51B.

Figure 5A:
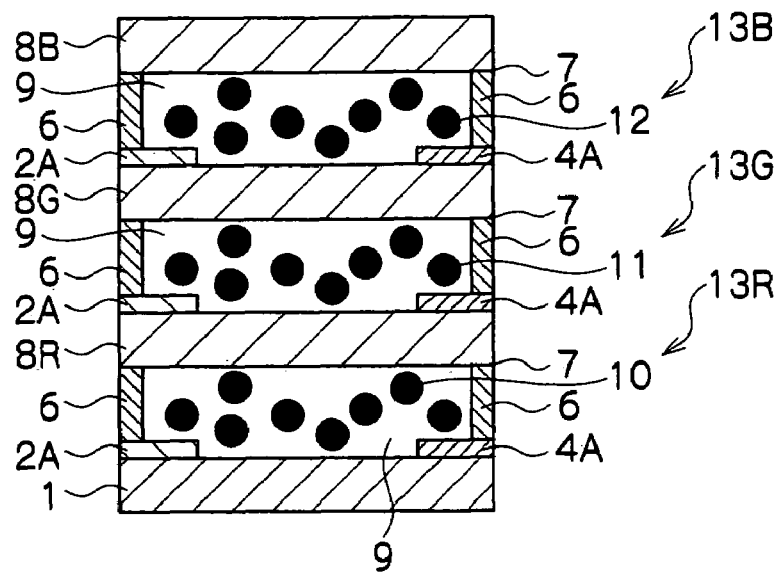
FIG. 5A and FIG. 5B are schematic sectional views illustrating a fourth example of the light-modulating layer in the present invention.

The light-modulating layer as shown in FIG. 5A represents the mode in which three types of light-modulating unit cell, 13R, 13G; and 13B are layered. Namely, said one cell as shown in FIG. 3A is adapted to be a light-modulating unit cell, and by vertically layering such three light-modulating unit cells, a three-layer structure is provided. Namely, a structure which layers the plural light-modulating unit cells is provided.

The light-modulating layer of such configuration can be obtained by manufacturing a red color (R) light-modulating unit cell 13R in the lowermost layer in the same manner as in FIG. 3A; then, with the second transparent substrate 8R of the red color (R) light-modulating unit cell in the lowermost layer being regarded as the first substrate, manufacturing a green color (G) light-modulating unit cell 13G in the medium layer; and further, with the second transparent substrate 8G of the green color (G) light-modulating unit cell in the medium layer being regarded as the first substrate, finally manufacturing a blue color (B) light-modulating unit cell 13B in the uppermost layer. With the light-modulating layer obtained, the light-modulating unit cells are layered to allow full color display.

In addition, the light-modulating layer configured as above can also be obtained by separately manufacturing RGB light-modulating unit cells, and connecting them.

The light-modulating layer as shown in FIG. 5A is the same as that in FIG. 3A in the material, the size, and the like, of both transparent substrates 1, 8, both electrodes 2A, 4A, the partition wall 6, and the like, but is different from that in FIG. 3A in that, in the light-modulating unit cell 13R which is the closest to the first transparent substrate 1, red color (R) charged mobile fine particles 10 are encapsulated; in the light-modulating unit cell 13G on the upper side thereof, green color (G) charged mobile fine particles 11 are encapsulated; and further in the light-modulating unit cell 13B on the upper side thereof, blue color (B) charged mobile fine particles 12 are encapsulated.

Figure 5B:
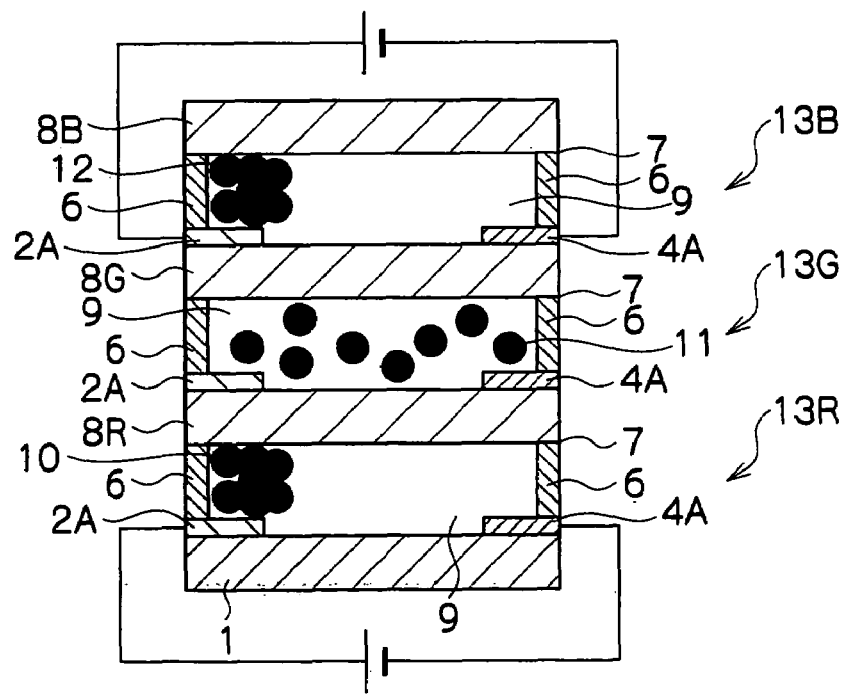

The operation of the light-modulating layer provided by thus laminating the light-modulating unit cells will be described. For example, when a voltage of 40 V is applied across the electrodes 2A, 4A of the light-modulating unit cell 13R and the light-modulating unit cell 13B, the light-modulating layer will be operated as shown in FIG. 5B.

For example, when the dispersed red color (R) charged mobile fine particles 10, and the blue color (B) charged mobile fine particles 12 are both negatively charged, it is observed that application of a DC voltage causes them to be moved to the positive side electrode. Thereby, the red charged mobile fine particles 10 in the light-modulating unit cell 13R, and the blue charged mobile fine particles 12 in the light-modulating unit cell 13B are both moved to the positive electrode side (herein, the first electrode 2A), and only the green color charged mobile fine particles 11 in the light-modulating unit cell 13G maintain the dispersed state. As a result of this, when the light-modulating layer is observed from the second transparent substrate 8B side of the light-modulating unit cell 13B, the color of the light-modulating unit cell on the color (green) of the green color charged mobile fine particles 11 in the light-modulating unit cell 13G is observed.

Similarly, when, for example, a voltage is applied across the light-modulating unit cell 13R and across the light-modulating unit cell 13G, the color (blue) of the particles in the light-modulating unit cell 13B is observed, and when a voltage is applied across the light-modulating unit cell 13G and across the light-modulating unit cell 13B, the color (red) of the particles in the light-modulating unit cell 13R is observed. As a result of this, by controlling the voltage application states of these three light-modulating unit cells, a full color display is observed.

A fifth example of the light-modulating layer in the present invention will be described with reference to FIG. 6A and FIG. 6B.

Figure 6A:
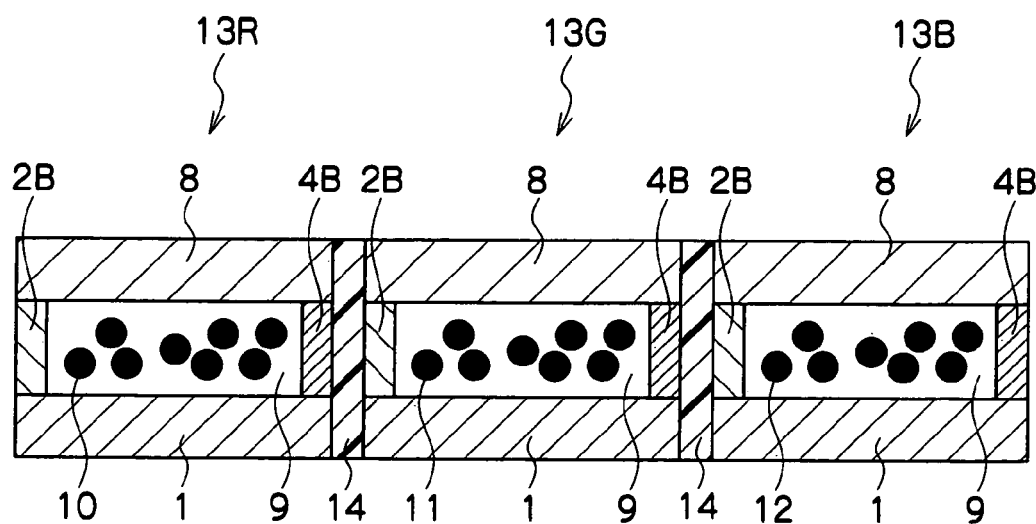
FIG. 6A and FIG. 6B are schematic sectional views illustrating a fifth example of the light-modulating layer in the present invention.
Figure 6B:
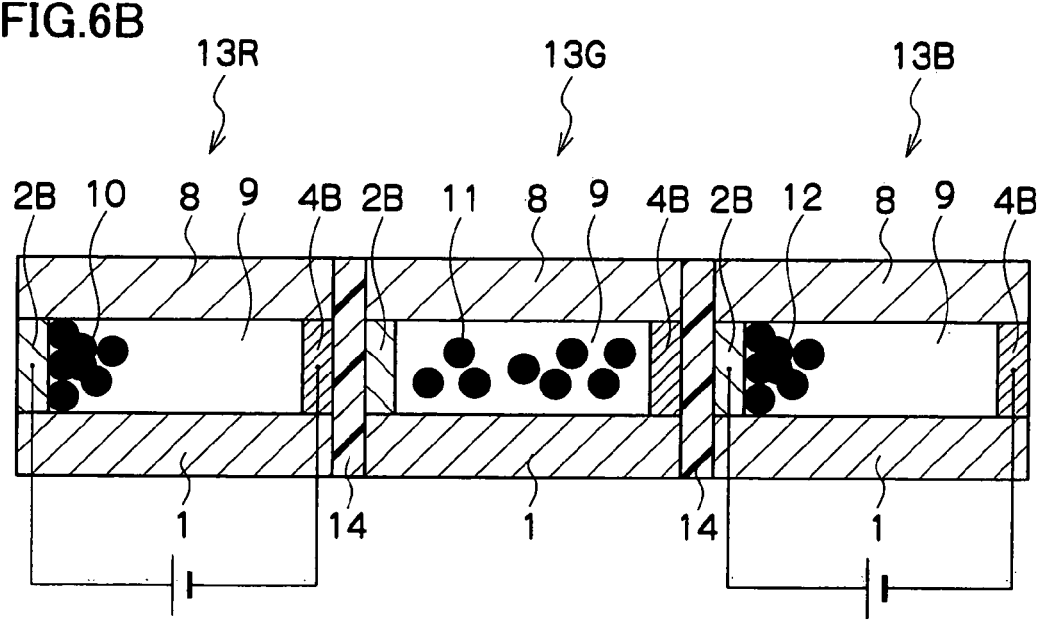

The light-modulating layer as shown in FIG. 6A represents the mode in which it is composed of light-modulating unit cells. Namely, it has a structure wherein three said light-modulating unit cells as shown in FIG. 4A are horizontally disposed in parallel.

The light-modulating layer as shown in FIG. 6A represents the mode in which three types of light-modulating layer, 13R, 13G; and 13B are disposed in parallel. Namely, said one cell as shown in FIG. 4A is adapted to be a light-modulating unit cell, and such light-modulating unit cells are disposed in parallel with respect to the substrates.

The light-modulating layer having such configuration can be obtained by separately manufacturing the red color (R) light-modulating unit cell 13R, the green color (G) light-modulating unit cell 13G, and the blue color (B) light-modulating unit cell 13B, as shown in FIG. 4A, and connecting them with the use of isolation walls 14. In the light-modulating layer obtained, the light-modulating unit cells of red color (R), green color (G), and blue color (B) are provided to allow full color display.

The light-modulating layer as shown in FIG. 6A is the same as that in FIG. 4A in the material, the size, and the like, of both transparent substrates 1, 8, both electrodes 2A, 4A, the partition wall 6, and the like, but is different from that in FIG. 4A in that, in the light-modulating unit cell 13R, red color (R) charged mobile fine particles 10 are encapsulated; in the light-modulating unit cell 13G, green color (G) charged mobile fine particles 11 are encapsulated; and further in the light-modulating unit cell 13B, blue color (B) charged mobile fine particles 12 are encapsulated.

The isolation wall 14 is a member which is used to insulate between the light-modulating unit cell 13R and the light-modulating unit cell 13G, and between the light-modulating unit cell 13G and the light-modulating unit cell 13B, and as the material, the same one as that of the isolation layer 5 as shown in FIG. 2A can be used.

The height of this isolation wall 14 is preferably 2 μm to 1 mm.

In addition, the width of the isolation wall 14 is preferably 1 μm to 1 mm.

The operation of the light-modulating layer provided by thus disposing the light-modulating unit cells in parallel will be described. For example, when a voltage of 40 V is applied across the electrodes 2B, 4B of the light-modulating unit cell 13R and the light-modulating unit cell 13B, the light-modulating layer will be operated as shown in FIG. 6B.

For example, when the dispersed red color (R) charged mobile fine particles 10, and the blue color (B) charged mobile fine particles 12 are both negatively charged, it is observed that application of a DC voltage causes them to be moved to the positive side electrode. Thereby, the red charged mobile fine particles 10 in the light-modulating unit cell 13R, and the blue charged mobile fine particles 12 in the light-modulating unit cell 13B are both moved to the positive electrode side (herein, the first electrode 2B), and only the green color charged mobile fine particles 11 in the light-modulating unit cell 13G maintain the dispersed state. As a result of this, when the light-modulating layer is observed from the second transparent substrate 8 side, the color of the light-modulating unit cell on the color (green) of the green color charged mobile fine particles 11 in the light-modulating unit cell 13G is observed.

Similarly, when, for example, a voltage is applied across the light-modulating unit cell 13R and across the light-modulating unit cell 13G, the color (blue) of the particles in the light-modulating unit cell 13B is observed, and when a voltage is applied across the light-modulating unit cell 13G and across the light-modulating unit cell 13B, the color (red) of the particles in the light-modulating unit cell 13R is observed. As a result of this, by controlling the voltage application states of these three light-modulating unit cells, a full color display is observed.

Hereinabove, the configurations of the display layer and the light-modulating layer which constitute the display device of the present invention have been described, respectively, however, the display device of the present invention can be manufactured by optionally combining these display layers and light-modulating layers.

Hereinbelow, embodiments of the display device of the present invention will be described with reference to the drawings.

Using FIG. 7, a first embodiment of the display device of the present invention will be described.

Figure 7:
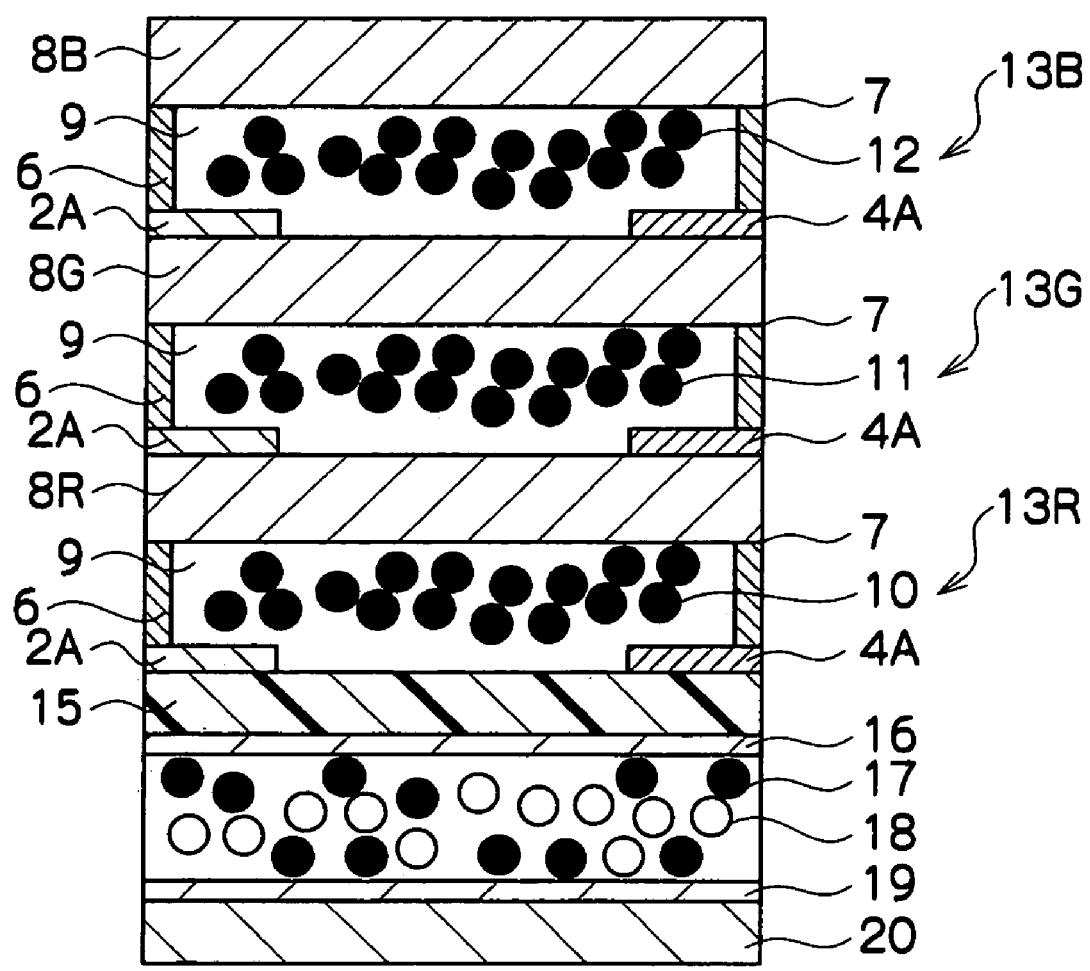
FIG. 7 is a schematic sectional view for explaining a first embodiment of the display device of the present invention.

The display device as shown in FIG. 7 has a configuration which combines the above-mentioned (1) display layer wherein white particles and black particles are encapsulated between a pair of substrates, and by moving either one of these two types of particles to the substrate side forming a display surface, the white or black color display is carried out, with the light-modulating layer which is the above-mentioned fourth example.

The light-modulating layer in the display device having such a configuration has been described above as the mode (the fourth example) in which three types of light-modulating unit cell, 13R, 13G and 13B are layered, thus the description herein is omitted.

Hereinbelow, the display layer as shown in FIG. 7 will be described. With this display layer, formed between a substrate 20 and an isolation layer 15 which functions as the opposed substrate for the substrate 20, black particles 17 and white particles 18 are encapsulated in the movable state. In addition, on the surface of the substrate 20 that is opposed to the isolation layer 15, a first electrode 19 for the display layer is provided, while, on the surface of the isolation layer 15 that is opposed to the substrate 20, a second electrode 16 for the display layer is provided. With an electric field applied across this first electrode 19 and second electrode 16, the black particles 17 and white particles 18 which are encapsulated can be moved between the substrate 20 and the isolation layer 15.

Next, using FIG. 8A, FIG. 8B, and FIG. 8C, the operation of the display device as shown in FIG. 7 will be described.

Figure 8A:
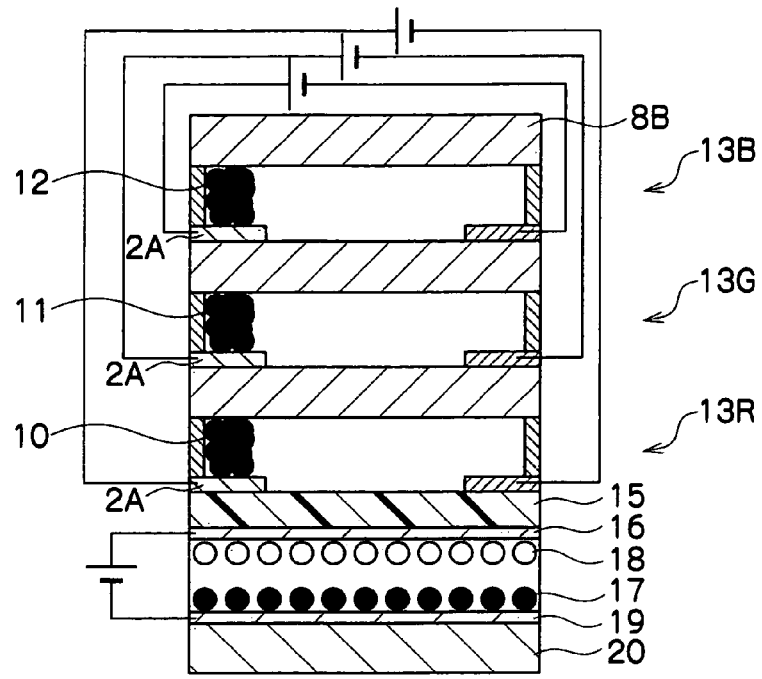
FIG. 8A, FIG. 8B, and FIG. 8C are schematic sectional views for explaining the operation of the display device as shown in FIG. 7.

FIG. 8A is a schematic sectional view illustrating the white color display by the display device as shown in FIG. 7.

As shown in FIG. 8A, across any of the light-modulating unit cells 13R, 13G, and 13B, a voltage is applied, the red color (R) charged mobile fine particles 10, the green color (G) charged mobile fine particles 11, and the blue color (B) charged mobile fine particles 12 having been all moved to the positive electrode side (herein, the first electrode 2A).

On the other hand, in the display layer, a voltage is applied with the electrode 16 being used as the positive side, and the electrode 19 being used as the negative side, resulting in an electric field being generated, which has moved the white particles 18 to the electrode 16 side for the display layer (the isolation layer 15 side), and the black particles 17 to the electrode 19 side for the display layer (the substrate 20 side).

As a result of these, this display device displays only the color of the white particles 18 in the display layer, when observed from the second transparent substrate 8B side.

Figure 8B:
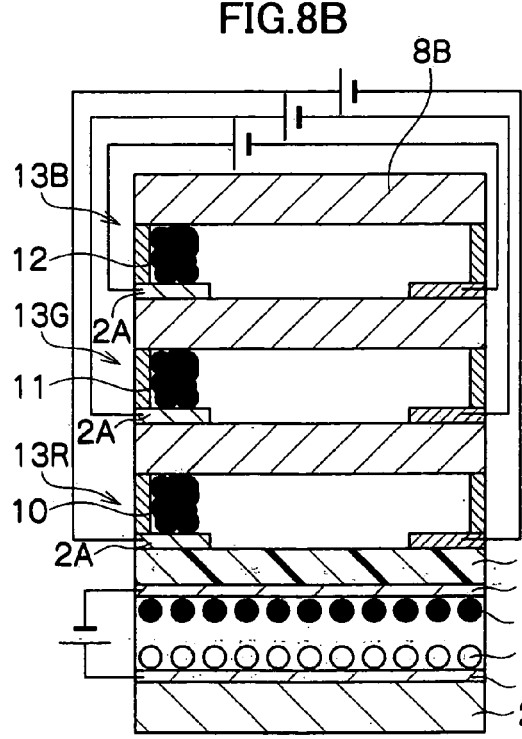

FIG. 8B is a schematic sectional view illustrating the black color display by the display device as shown in FIG. 7.

Also in FIG. 8B, across any of the light-modulating unit cells 13R, 13G, and 13B, a voltage is applied, the red color (R) charged mobile fine particles 10, the green color (G) charged mobile fine particles 11, and the blue color (B) charged mobile fine particles 12 having been all moved to the positive electrode side (herein, the first electrode 2A).

On the other hand, in the display layer, a voltage is applied with the electrode 16 being used as the negative side, and the electrode 19 being used as the positive side, resulting in an electric field being generated, which has moved the black particles 17 to the electrode 16 side for the display layer (the isolation layer 15 side), and the white particles 18 to the electrode 19 side for the display layer (the substrate 20 side).

As a result of these, this display device displays only the color of the black particles 17 in the display layer, when observed from the second transparent substrate 8B side.

Figure 8C:
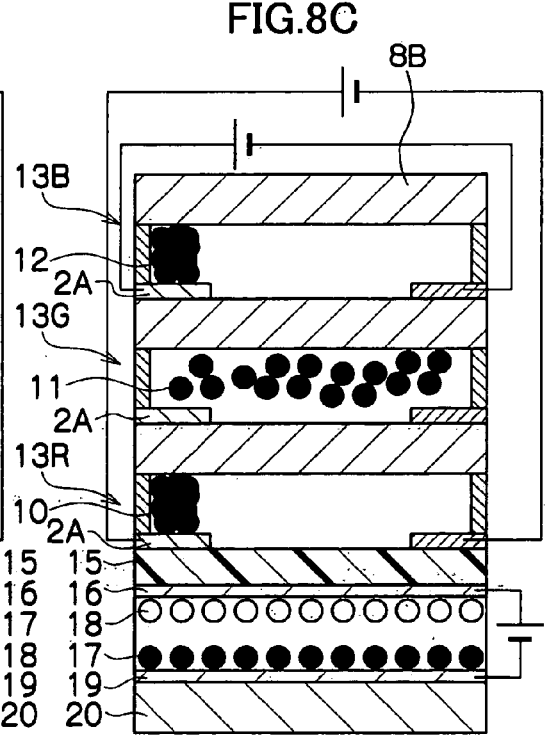

FIG. 8C is a schematic sectional view illustrating the green color (G) display by the display device as shown in FIG. 7.

In FIG. 8C, across either of the light-modulating unit cells 13R and 13B, a voltage is applied, the red color (R) charged mobile fine particles 10, and the blue color (B) charged mobile fine particles 12 having been both moved to the positive electrode side (herein, the first electrode 2A). In addition, across the light-modulating unit cell 13G, no voltage is applied, the green color charged mobile fine particles 11 being dispersed in the inside of the cell.

On the other hand, in the display layer, a voltage is applied with the electrode 16 being used as the positive side, and the electrode 19 being used as the negative side, resulting in an electric field being generated, which has moved the white particles 18 to the electrode 16 side for the display layer (the isolation layer 15 side), and the black particles 17 to the electrode 19 side for the display layer (the substrate 20 side).

As a result of these, this display device displays the green color (G) of the light-modulating unit cell 13G, when observed from the second transparent substrate 8B side. Herein, the display layer provided at the back of the light-modulating layer is in the white color display state, thus, the light scattering effect given by that white color display renders the green color (G) of the light-modulating unit cell 13G excellent in coloration.

Using FIG. 9, a second embodiment of the display device of the present invention will be described.

Figure 9:
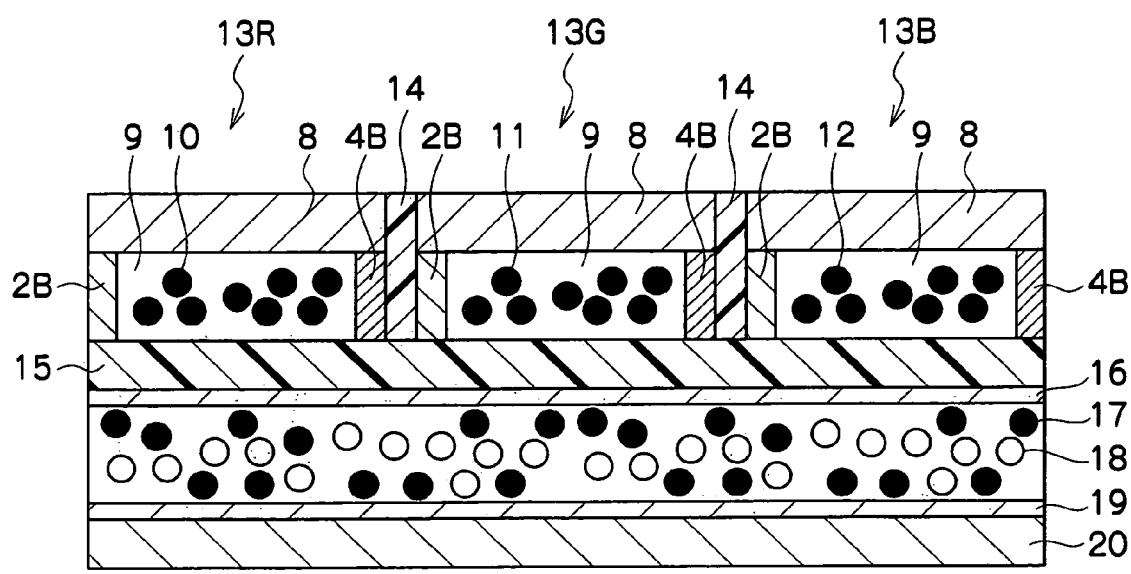
FIG. 9 is a schematic sectional view for explaining a second embodiment of the display device of the present invention.

The display device as shown in FIG. 9 has a configuration which combines the above-mentioned (1) display layer wherein white particles and black particles are encapsulated between a pair of substrates, and by moving either one of these two types of particles to the substrate side forming a display surface, the white or black color display is carried out, with the light-modulating layer which is the above-mentioned fifth example.

The light-modulating layer in the display device having such a configuration has been described above as the mode (the fifth example) in which three types of light-modulating unit cell, 13R, 13G, and 13B are disposed in parallel, thus the description herein is omitted.

Also the configuration of the display layer is the same as that in the above-mentioned first embodiment of the display device, thus the description herein is omitted.

Next, using FIG. 10A, FIG. 10B, and FIG. 10C, the operation of the display device as shown in FIG. 9 will be described.

Figure 10A:
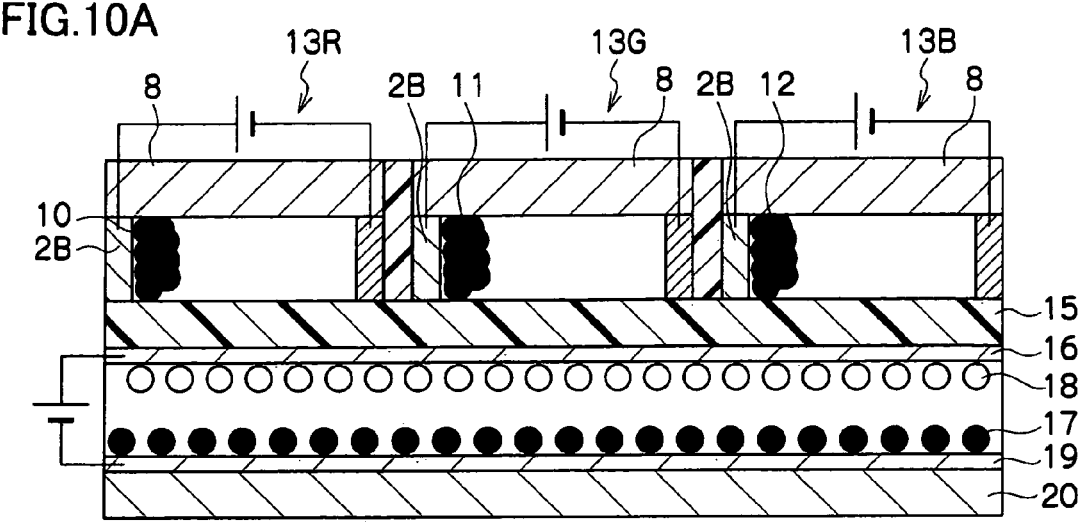
FIG. 10A, FIG. 10B, and FIG. 10C are schematic sectional views for explaining the operation of the display device as shown in FIG. 9.

FIG. 10A is a schematic sectional view illustrating the white color display by the display device as shown in FIG. 9.

As shown in FIG. 10A, across any of the light-modulating unit cells 13R, 13G; and 13B, a voltage is applied, the red color (R) charged mobile fine particles 10, the green color (G) charged mobile fine particles 11, and the blue color (B) charged mobile fine particles 12 having been all moved to the positive electrode side (herein, the first electrode 2B).

On the other hand, in the display layer, a voltage is applied with the electrode 16 being used as the positive side, and the electrode 19 being used as the negative side, resulting in an electric field being generated, which has moved the white particles 18 to the electrode 16 side for the display layer (the isolation layer 15 side), and the black particles 17 to the electrode 19 side for the display layer (the substrate 20 side).

As a result of these, this display device displays only the color of the white particles 18 in the display layer, when observed from the second transparent substrate 8B side.

Figure 10B:
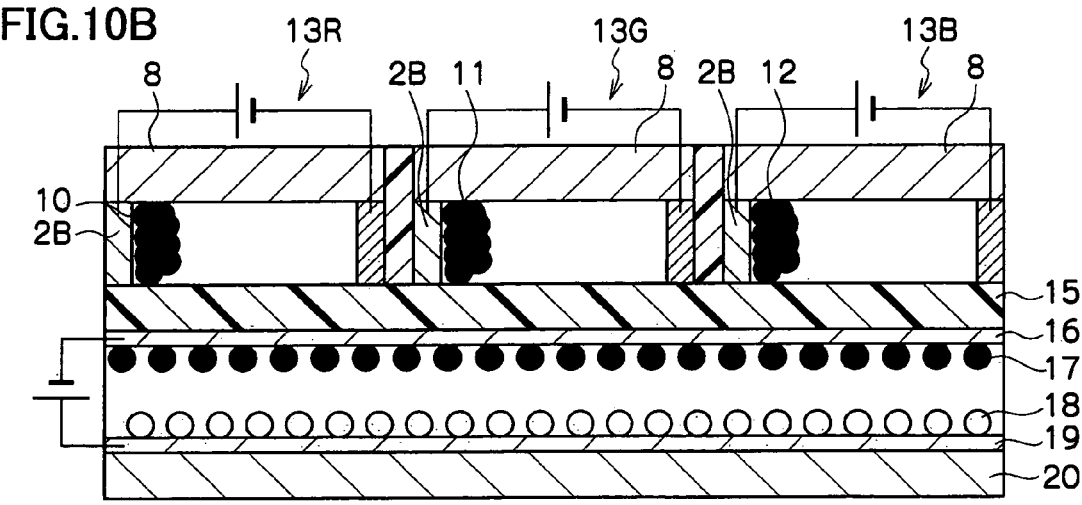

FIG. 10B is a schematic sectional view illustrating the black color display by the display device as shown in FIG. 9.

Also in FIG. 10B, across any of the light-modulating unit cells 13R, 13G, and 13B, a voltage is applied, the red color (R) charged mobile fine particles 10, the green color (G) charged mobile fine particles 11, and the blue color (B) charged mobile fine particles 12 having been all moved to the positive electrode side (herein, the first electrode 2B).

On the other hand, in the display layer, a voltage is applied with the electrode 16 being used as the negative side, and the electrode 19 being used as the positive side, resulting in an electric field being generated, which has moved the black particles 17 to the electrode 16 side for the display layer (the isolation layer 15 side), and the white particles 18 to the electrode 19 side for the display layer (the substrate 20 side).

As a result of these, this display device displays only the color of the black particles 17 in the display layer, when observed from the second transparent substrate 8 side.

Figure 10C:
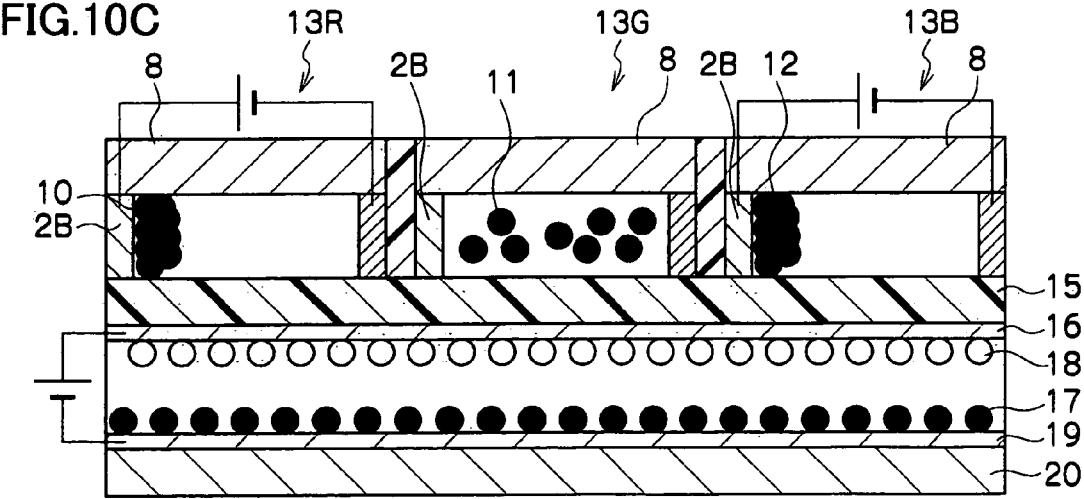

FIG. 10C is a schematic sectional view illustrating the green color (G) display by the display device as shown in FIG. 9.

In FIG. 10C, across either of the light-modulating unit cells 13R and 13B, a voltage is applied, the red color (R) charged mobile fine particles 10, and the blue color (B) charged mobile fine particles 12 having been both moved to the positive electrode side (herein, the first electrode 2B). In addition, across the light-modulating unit cell 13G, no voltage is applied, the green color (G) charged mobile fine particles 11 being dispersed in the inside of the cell.

On the other hand, in the display layer, a voltage is applied with the electrode 16 being used as the positive side, and the electrode 19 being used as the negative side, resulting in an electric field being generated, which has moved the white particles 18 to the electrode 16 side for the display layer (the isolation layer 15 side), and the black particles 17 to the electrode 19 side for the display layer (the substrate 20 side).

As a result of these, this display device displays the green color (G) of the light-modulating unit cell 13G, when observed from the second transparent substrate 8 side. Herein, the display layer provided at the back of the light-modulating layer is in the white color display state, thus, the light scattering effect given by that white color display renders the green color (G) of the light-modulating unit cell 13G excellent in coloration.

Using FIG. 11, a third embodiment of the display device of the present invention will be described.

Figure 11:
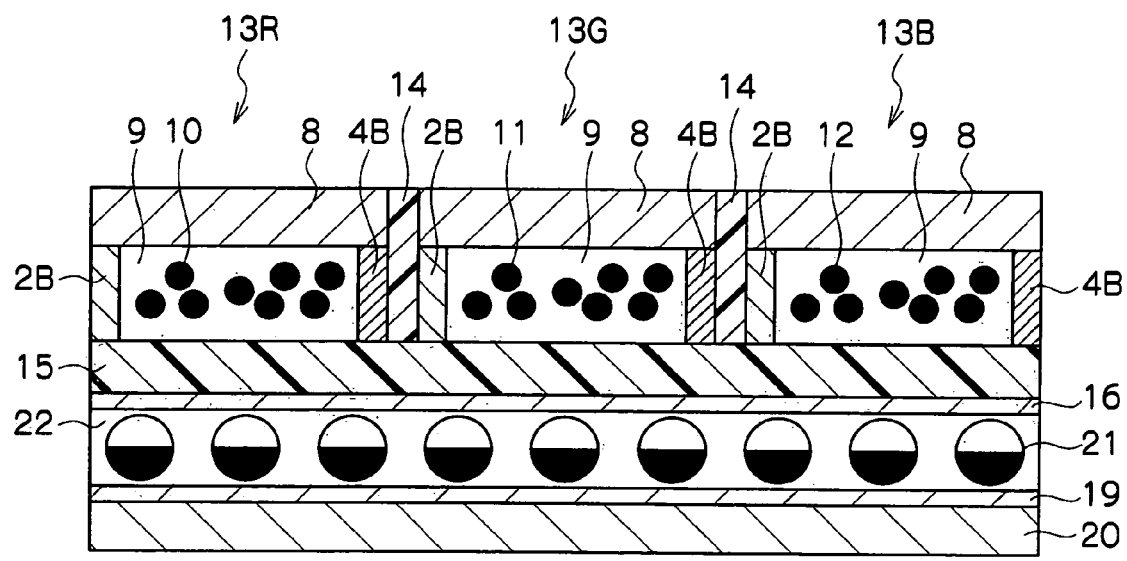
FIG. 11 is a schematic sectional view for explaining a third embodiment of the display device of the present invention.

The display device as shown in FIG. 11 has a configuration which combines the above-mentioned (2) display layer wherein particles having a white portion and a black one are contained in the layer, and by reversing those particles, the white or black color display is carried out by means of the display surface, with the light-modulating layer which is the above-mentioned fifth example.

The light-modulating layer in the display device having such a configuration has been described above as the mode (the fifth example) in which three types of light-modulating unit cell, 13R, 13G, and 13B are disposed in parallel, thus the description herein is omitted.

Hereinbelow, the display layer as shown in FIG. 11 will be described. With this display layer, between a substrate 20 and an isolation layer 15 which functions as the opposed substrate for the substrate 20, black-white reversible particles 21 are disposed such that they are rotatable with a support 22 having cavities. In addition, on the surface of the substrate 20 that is opposed to the isolation layer 15, a first electrode 19 for the display layer is provided, while, on the surface of the isolation layer 15 that is opposed to the substrate 20, a second electrode 16 for the display layer is provided. With an electric field applied across this first electrode 19 and second electrode 16, the black-white reversible particles 21 are reversed, the white portions or the black portions being oriented toward the direction of being observed (in FIG. 11, the second transparent substrate 8 side).

Next, using FIG. 12A, FIG. 12B, and FIG. 12C, the operation of the display device as shown in FIG. 11 will be described.

Figure 12A:
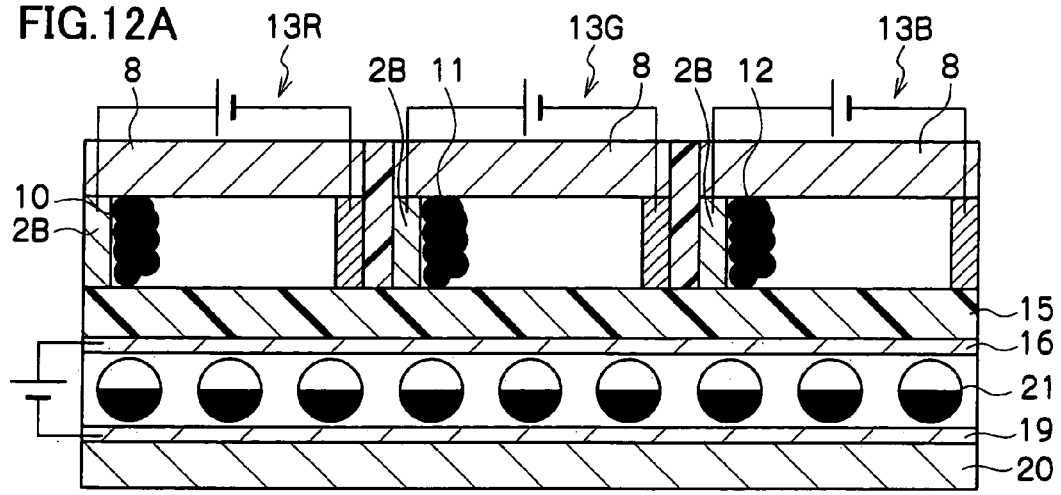
FIG. 12A, FIG. 12B, and FIG. 12C are schematic sectional views for explaining the operation of the display device as shown in FIG. 11.

FIG. 12A is a schematic sectional view illustrating the white color display by the display device as shown in FIG. 11.

As shown in FIG. 12A, across any of the light-modulating unit cells 13R, 13G, and 13B, a voltage is applied, the red color (R) charged mobile fine particles 10, the green color (G) charged mobile fine particles 11, and the blue color (B) charged mobile fine particles 12 having been all moved to the positive electrode side (herein, the first electrode 2B).

On the other hand, in the display layer, a voltage is applied with the electrode 16 being used as the positive side, and the electrode 19 being used as the negative side, resulting in an electric field being generated, which has oriented the white portions of the black-white reversible particles 21 toward the electrode 16 side for the display layer (the isolation layer 15 side).

As a result of these, this display device displays only the color of the white portions of the black-white reversible particles 21, when observed from the second transparent substrate 8 side.

Figure 12B:
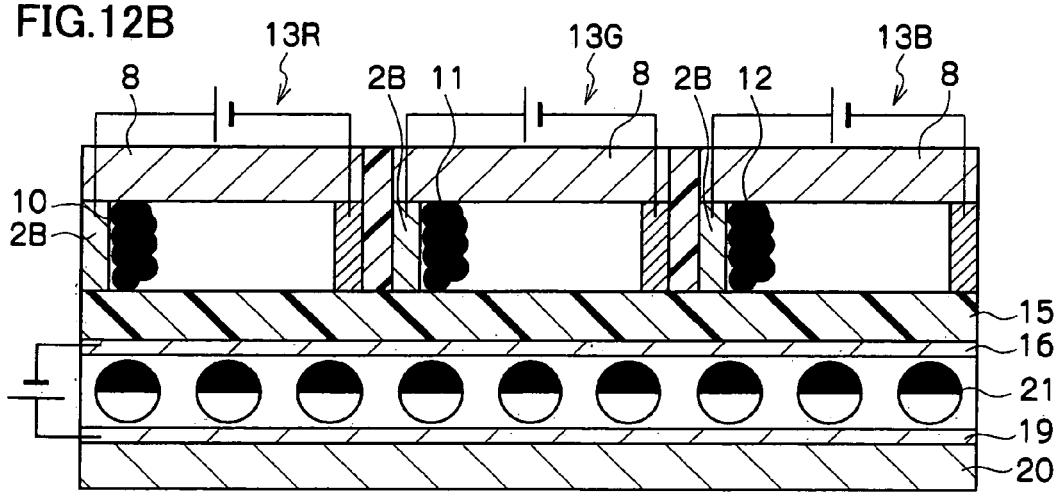

FIG. 12B is a schematic sectional view illustrating the black color display by the display device as shown in FIG. 11.

Also in FIG. 12B, across any of the light-modulating unit cells 13R, 13G, and 13B, a voltage is applied, the red color (R) charged mobile fine particles 10, the green color (G) charged mobile fine particles 11, and the blue color (B) charged mobile fine particles 12 having been all moved to the positive electrode side (herein, the first electrode 2B).

On the other hand, in the display layer, a voltage is applied with the electrode 16 being used as the negative side, and the electrode 19 being used as the positive side, resulting in an electric field being generated, which has oriented the black portions of the black-white reversible particles 21 toward the electrode 16 side for the display layer (the isolation layer 15 side).

As a result of these, this display device displays only the color of the black portions of the black-white reversible particles 21, when observed from the second transparent substrate 8 side.

Figure 12C:
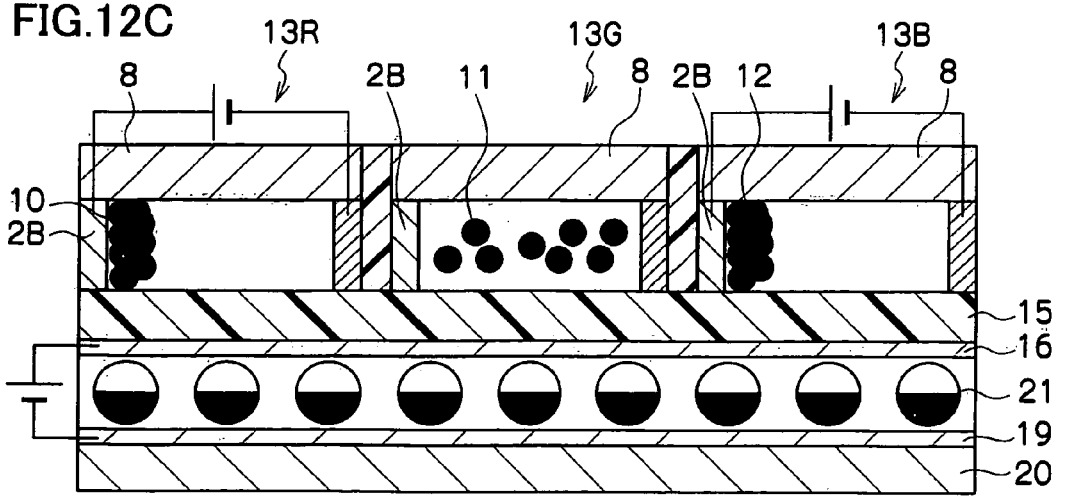

FIG. 12C is a schematic sectional view illustrating the green color (G) display by the display device as shown in FIG. 11.

In FIG. 12C, across either of the light-modulating unit cells 13R and 13B, a voltage is applied, the red color (R) charged mobile fine particles 10, and the blue color (B) charged mobile fine particles 12 having been both moved to the positive electrode side (herein, the first electrode 2B). In addition, across the light-modulating unit cell 13G no voltage is applied, the green color (G) charged mobile fine particles 11 being dispersed in the inside of the cell.

On the other hand, in the display layer, a voltage is applied with the electrode 16 being used as the positive side, and the electrode 19 being used as the negative side, resulting in an electric field being generated, which has oriented the white portions of the black-white reversible particles 21 toward the electrode 16 side for the display layer (the isolation layer 15 side).

As a result of these, this display device displays the green color (G) of the light-modulating unit cell 13G, when observed from the second transparent substrate 8 side. Herein, the display layer provided at the back of the light-modulating layer is in the white color display state, thus, the light scattering effect given by that white color display renders the green color (G) of the light-modulating unit cell 13G excellent in coloration.

Using FIG. 13, a fourth embodiment of the display device of the present invention will be described.

Figure 13:
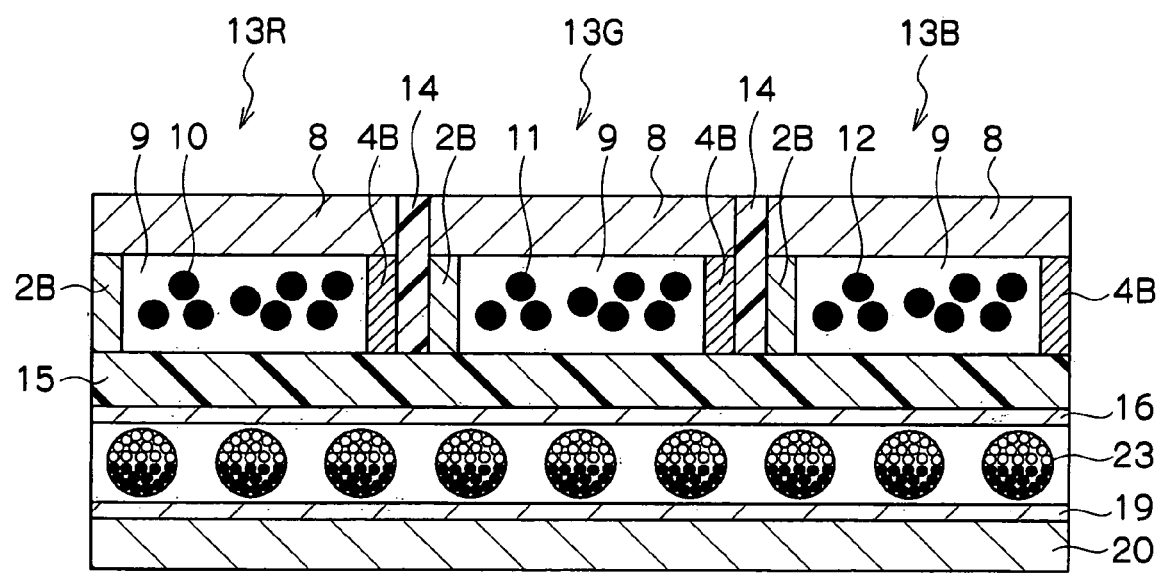
FIG. 13 is a schematic sectional view for explaining a fourth embodiment of the display device of the present invention.

The display device as shown in FIG. 13 has a configuration which combines the above-mentioned (3) display layer wherein microcapsules holding white fine particles and black ones are contained in the layer, and by using the electrophoretic method to move either one of these two types of fine particles to the display surface side, the white or black color display is carried out, with the light-modulating layer which is the above-mentioned fifth example.

The light-modulating layer in the display device having such a configuration has been described above as the mode (the fifth example) in which three types of light-modulating unit cell, 13R, 13G, and 13B are disposed in parallel, thus the description herein is omitted.

Hereinbelow, the display layer as shown in FIG. 13 will be described. With this display layer, between a substrate 20 and an isolation layer 15 which functions as the opposed substrate for the substrate 20, microcapsules 23 holding white fine particles and black ones are sandwiched. In addition, on the surface of the substrate 20 that is opposed to the isolation layer 15, a first electrode 19 for the display layer is provided, while, on the surface of the isolation layer 15 that is opposed to the substrate 20, a second electrode 16 for the display layer is provided. With an electric field applied across these first electrode 19 and second electrode 16, the white fine particles and the black ones are moved toward the direction of being observed (in FIG. 13, the second transparent substrate 8 side).

Next, using FIG. 14A, FIG. 14B, and FIG. 14C, the operation of the display device as shown in FIG. 13 will be described.

Figure 14A:
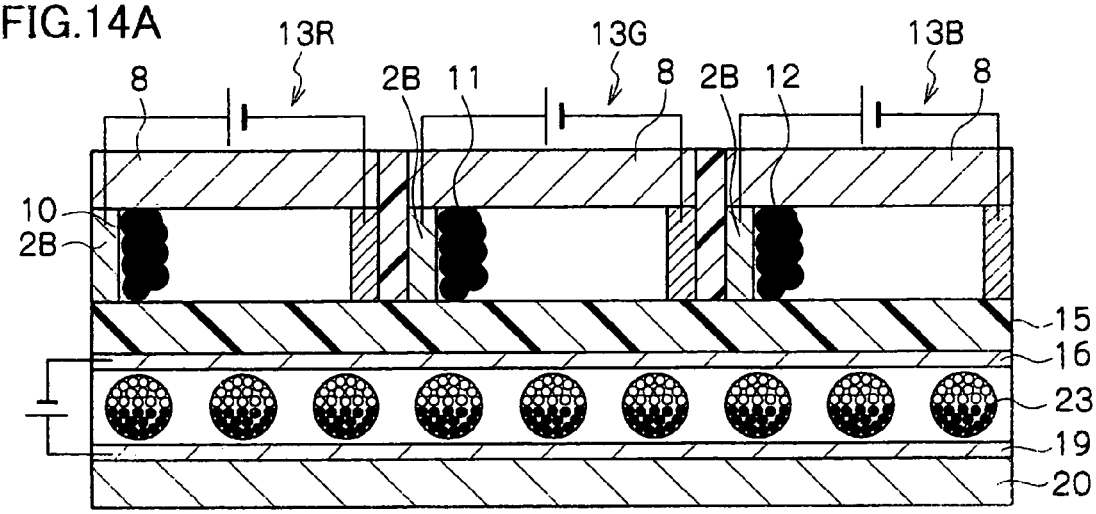
FIG. 14A, FIG. 14B, and FIG. 14C are schematic sectional views for explaining the operation of the display device as shown in FIG. 13.

FIG. 14A is a schematic sectional view illustrating the white color display by the display device as shown in FIG. 13.

As shown in FIG. 14A, across any of the light-modulating unit cells 13R, 13G and 13B, a voltage is applied, the red color (R) charged mobile fine particles 10, the green color (G) charged mobile fine particles 11, and the blue color (B) charged mobile fine particles 12 having been all moved to the positive electrode side (herein, the first electrode 2B).

On the other hand, in the display layer, a voltage is applied with the electrode 16 being used as the negative side, and the electrode 19 being used as the positive side, resulting in an electric field being generated, which has moved the white fine portions to the electrode 16 side for the display layer (the isolation layer 15 side).

As a result of these, this display device displays only the color on the white fine particles in the microcapsules 23 in the display layer, when observed from the second transparent substrate 8 side.

Figure 14B:
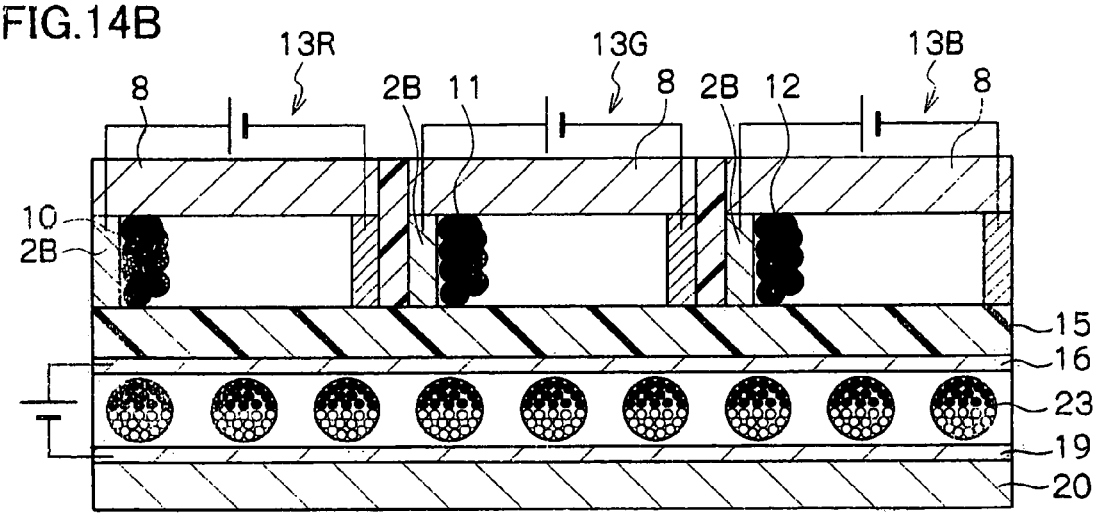

FIG. 14B is a schematic sectional view illustrating the black color display by the display device as shown in FIG. 13.

Also in FIG. 14B, across any of the light-modulating unit cells 13R, 13G, and 13B, a voltage is applied, the red color (R) charged mobile fine particles 10, the green color (G) charged mobile fine particles 11, and the blue color (B) charged mobile fine particles 12 having been all moved to the positive electrode side (herein, the first electrode 2B).

On the other hand, in the display layer, a voltage is applied with the electrode 16 being used as the positive side, and the electrode 19 being used as the negative side, resulting in an electric field being generated, which has moved the black fine particles in the microcapsules 23 to the electrode 16 side for the display layer (the isolation layer 15 side).

As a result of these, this display device displays only the color on the black fine particles in the microcapsules 23, when observed from the second transparent substrate 8 side.

Figure 14C:
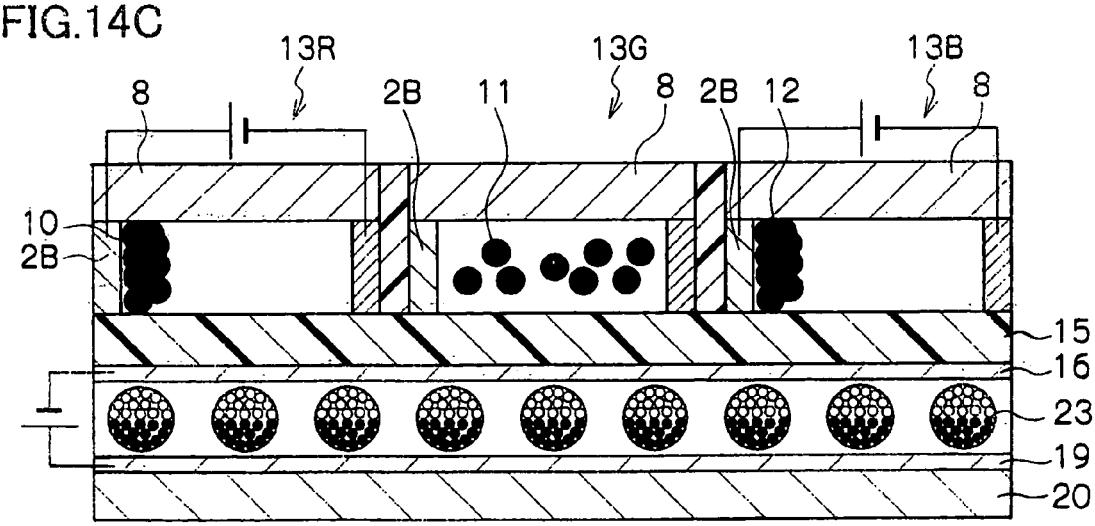

FIG. 14C is a schematic sectional view illustrating the green color (G) display by the display device as shown in FIG. 13.

In FIG. 14C, across either of the light-modulating unit cells 13R and 13B, a voltage is applied, the red color (R) charged mobile fine particles 10, and the blue color (B) charged mobile fine particles 12 having been both moved to the positive electrode side (herein, the first electrode 2B). In addition, across the light-modulating unit cell 13G, no voltage is applied, the green color (G) charged mobile fine particles 11 being dispersed in the inside of the cell.

On the other hand, in the display layer, a voltage is applied with the electrode 16 being used as the negative side, and the electrode 19 being used as the positive side, resulting in an electric field being generated, which has moved the white fine particles in the microcapsules 23 to the electrode 16 side for the display layer (the isolation layer 15 side).

As a result of these, this display device displays the green color (G) of the light-modulating unit cell 13G, when observed from the second transparent substrate 8 side. Herein, the display layer provided at the back of the light-modulating layer is in the white color display state, thus, the light scattering effect given by that white color display renders the green color (G) of the light-modulating unit cell 13G excellent in coloration.

Using FIG. 15, a fifth embodiment of the display device of the present invention will be described.

Figure 15:
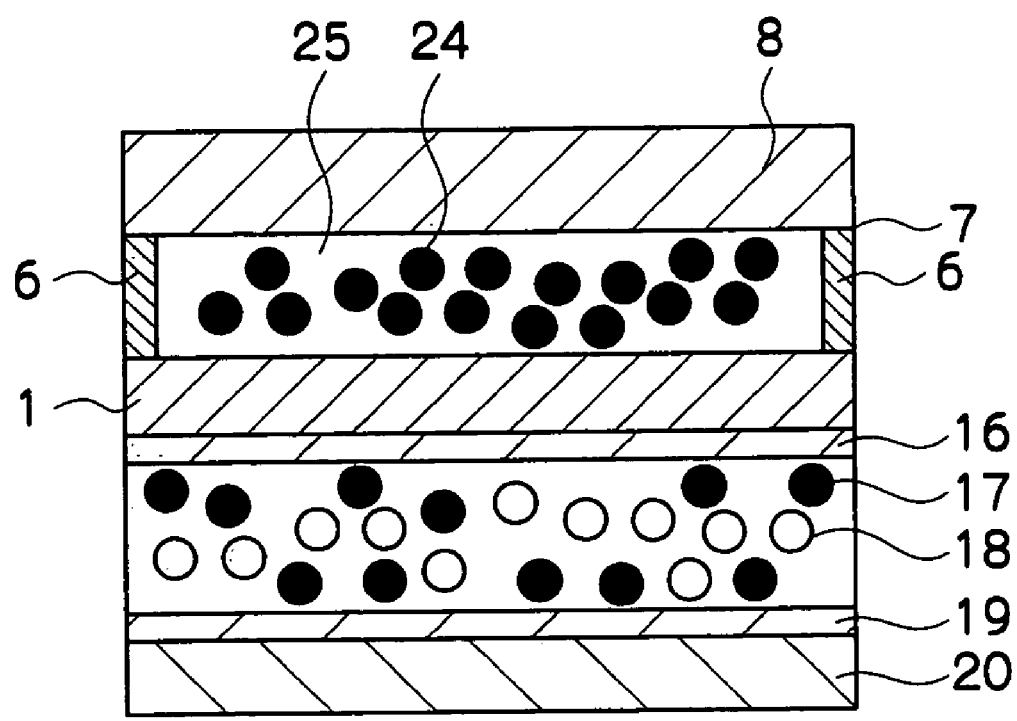
FIG. 15 is a schematic sectional view for explaining a fifth embodiment of the display device of the present invention.

The display device as shown in FIG. 15 has a configuration which combines the above-mentioned (1) display layer wherein white particles and black particles are encapsulated between a pair of substrates, and by moving either one of these two types of particles to the substrate side forming a display surface, the white or black color display is carried out, with a light-modulating layer including magnetic mobile fine particles.

The configuration of the display layer in the display device having such a configuration is the same as that in the above-mentioned first embodiment of the display device, thus the description herein is omitted.

Hereinbelow, a light-modulating layer as shown in FIG. 15 will be described.

This light-modulating layer encapsulates magnetic mobile fine particles 24 and its dispersing agent 25 between a first transparent substrate 1 and a second transparent substrate 8, and the ends thereof are sealed by partition walls 6. The magnetic mobile fine particles 24 in this light-modulating layer can be easily moved between both substrates 1, 8 by means of a magnetic power generation apparatus, such as a magnet, or the like.

Using FIG. 16, the operation of the display device as shown in FIG. 15 will be described.

Figure 16:
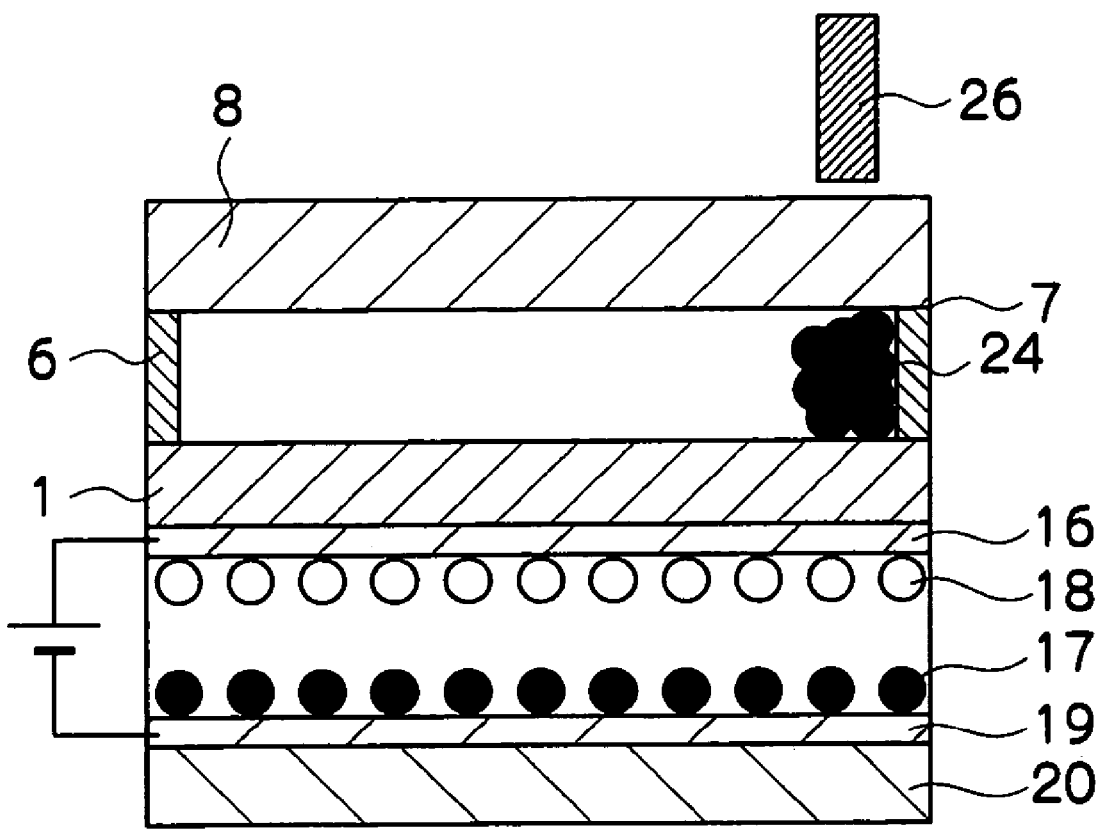
FIG. 16 is a schematic sectional view for explaining the operation of the display device as shown in FIG. 15.

FIG. 16 illustrates the state in which, with a magnet 26 being brought close to one end of the light-modulating layer from the outside, the magnetic mobile fine particles 24 have been influenced by the magnetic field from the magnet 26 to be moved toward the magnet 26.

On the other hand, in the display layer, a voltage is applied with the electrode 16 being used as the positive side, and the electrode 19 being used as the negative side, resulting in an electric field being generated, which has moved the white particles 18 to the electrode 16 side for the display layer (the isolation layer 15 side), and the black particles 17 to the electrode 19 side for the display layer (the substrate 20 side).

As a result of these, this display device displays only the color of the white particles 18 in the display layer, when observed from the second transparent substrate 8 side.

In addition, by bringing the magnet 26 away from the display device in the state as shown in FIG. 16 to eliminate the influence of the magnetic field, the magnetic mobile fine particles 24 in the light-modulating layer again forms a dispersion state. In this case, the color, for example, blue color on the magnetic mobile fine particles 24 is displayed. In addition, the display layer provided at the back of the light-modulating layer is in the white color display state, thus, the light scattering effect given by that white color display renders the light-modulating layer excellent in coloration.

Using FIG. 17, a sixth embodiment of the display device of the present invention will be described.

Figure 17:
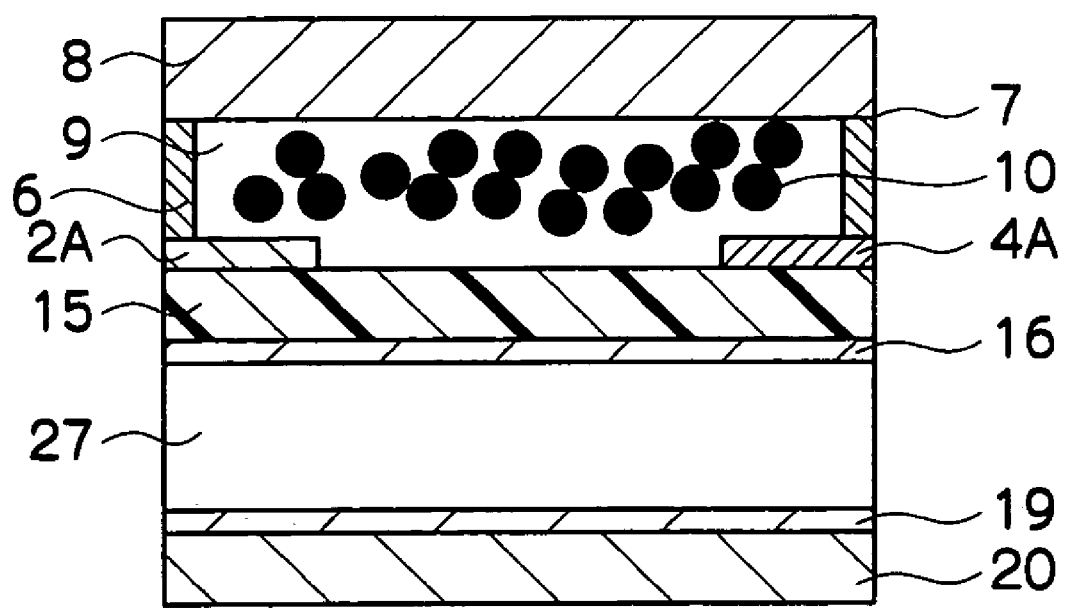
FIG. 17 is a schematic sectional view for explaining a sixth embodiment of the display device of the present invention.

The display device as shown in FIG. 17 has a configuration which combines the above-mentioned (4) display layer wherein the decolored state and the colored state which are based on the electrochromic phenomenon are used to carry out the white and black color displays, with the light-modulating layer which is the above-mentioned second example.

The light-modulating layer in the display device having such a configuration has been described as the second example, thus the description herein is omitted.

Hereinbelow, the display layer as shown in FIG. 17 will be described.

With this display layer, between a substrate 20 and an isolation layer 15 which functions as the opposed substrate for the substrate 20, an electrolyte layer 27 allowing an electrochromic phenomenon, containing silver ions (metallic ions), are sandwiched. In the electrolyte layer 27, a white pigment (not shown) used for white color display is contained. In addition, on the surface of the substrate 20 that is opposed to the isolation layer 15, a first electrode 19 for the display layer is provided, while, on the surface of the isolation layer 15 that is opposed to the substrate 20, a second electrode 16 for the display layer is provided. By the voltage applied across this first electrode 19 and the second electrode 16, silver is precipitated in the electrolyte layer 27 to form a colored state. In addition, in the state in which no voltage is applied, the electrolyte layer 27 is in the decolored state, the white pigment existing in the electrolyte layer 27 giving white color display.

With the display device as shown in FIG. 17, no voltage is applied across the light-modulating layer, the charged mobile fine particles 10 being in the dispersed state, thus the color, for example, red color on this charged mobile fine particles 10 is displayed.

On the other hand, with the display layer, no voltage is applied, and the decolored state on the electrochromic phenomenon is formed, only the color of the white pigment being shown up.

Thereby, when this display device is observed from the second transparent substrate 8 side, the display layer provided at the back of the light-modulating layer is in the white color display state on the color of the white pigment, thus, the light scattering effect given by that white color display renders the light-modulating layer excellent in coloration.

Next, using FIG. 18A and FIG. 18B, the operation of the display device as shown in FIG. 17 will be described.

Figure 18A:
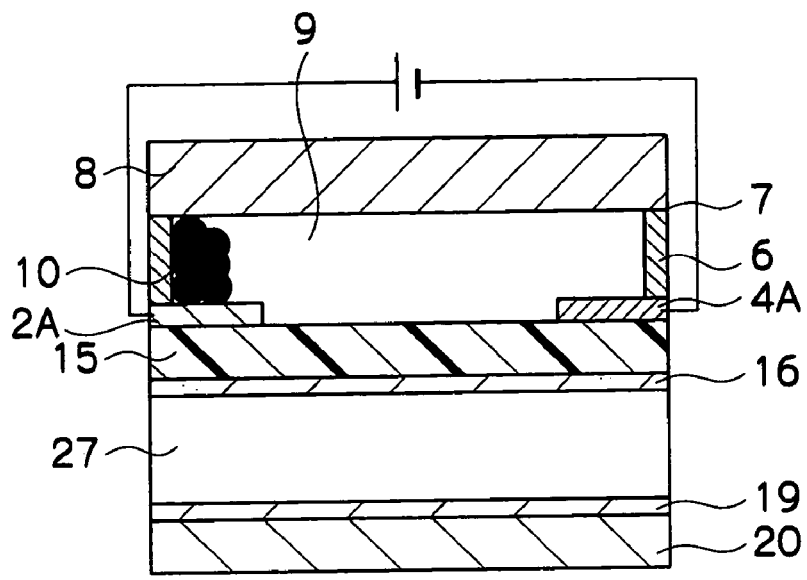
FIG. 18A and FIG. 18B are schematic sectional views for explaining the operation of the display device as shown in FIG. 17.

FIG. 18A is a schematic sectional view illustrating the white color display by the display device as shown in FIG. 17.

As shown in FIG. 18A, across the light-modulating layer, a voltage is applied, the charged mobile fine particles 10 have been moved to the positive electrode side (herein, the first electrode 2A).

On the other hand, with the display layer, no voltage is applied, and the decolored state on the electrochromic phenomenon is formed, only the color of the white pigment being shown up.

Therefore, when this display device is observed from the second transparent substrate 8 side, only the color of the white pigment in the display layer is displayed.

Figure 18B:
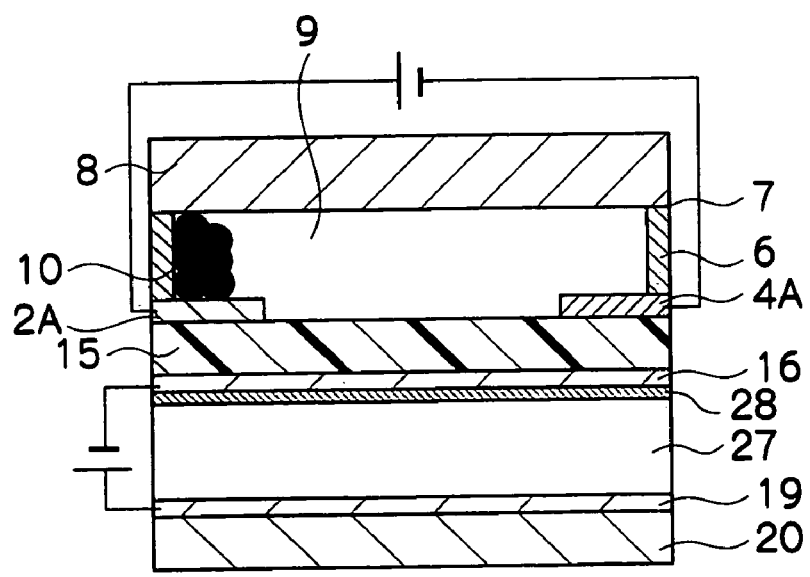

FIG. 18B is a schematic sectional view illustrating the black color display by the display device as shown in FIG. 17.

Also in FIG. 18B, across the light-modulating layer, a voltage is applied, the charged mobile fine particles 10 have been moved to the positive electrode side (herein, the first electrode 2A).

On the other hand, in the display layer, a voltage is applied with the electrode 16 being used as the negative side, and the electrode 19 being used as the positive side, which results in the colored state on the electrochromic phenomenon being formed. Namely, on the surface of the electrode 16 on the negative side, silver (metal) 28 is precipitated.

As a result of these, this display device displays the color of the silver 28 in the display layer, i.e., black color when observed from the second transparent substrate 8 side.

Using FIG. 19, a seventh embodiment of the display device of the present invention will be described.

Figure 19:
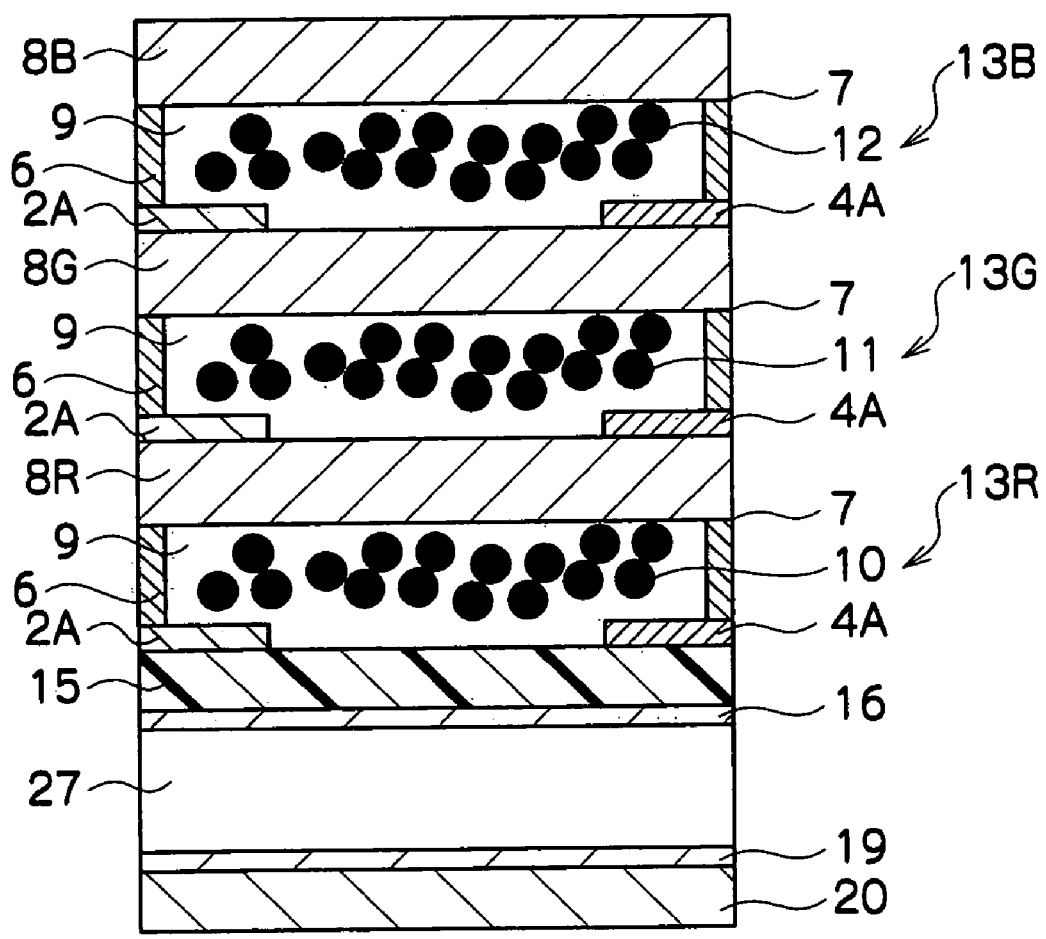
FIG. 19 is a schematic sectional view for explaining a seventh embodiment of the display device of the present invention.

The display device as shown in FIG. 19 has a configuration which combines the above-mentioned (4) display layer wherein the decolored state and the colored state which are based on the electrochromic phenomenon are used to carry out the white and black color displays, with the light-modulating layer which is the above-mentioned fourth example.

The light-modulating layer in the display device having such a configuration has been described above as the mode (the fourth example) in which three types of light-modulating unit cell, 13R, 13G, and 13B are layered, thus the description herein is omitted.

Also the configuration of the display layer is the same as that in the above-mentioned sixth embodiment of the display device, thus the description herein is omitted.

Next, using FIG. 20A, FIG. 20B, and FIG. 20C, the operation of the display device as shown in FIG. 19 will be described.

Figure 20A:
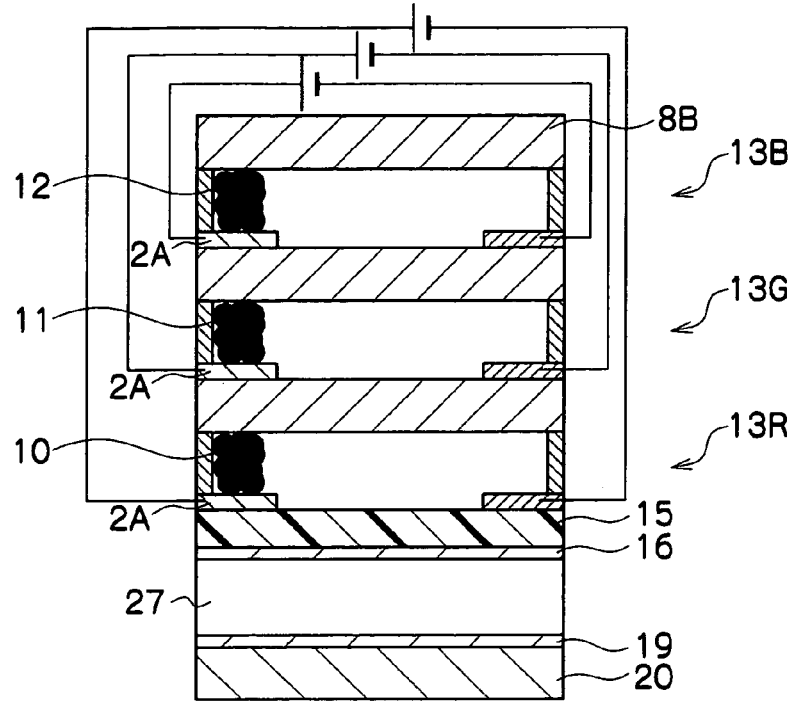
FIG. 20A, FIG. 20B, and FIG. 20C are schematic sectional views for explaining the operation of the display device as shown in FIG. 19.

FIG. 20A is a schematic sectional view illustrating the white color display by the display device as shown in FIG. 19.

As shown in FIG. 20A, across any of the light-modulating unit cells 13R, 13G, and 13B, a voltage is applied, the red color (R) charged mobile fine particles 10, the green color (G) charged mobile fine particles 11, and the blue color (B) charged mobile fine particles 12 having been all moved to the positive electrode side (herein, the first electrode 2A).

On the other hand, with the display layer, no voltage is applied, the decolored state on the electrochromic phenomenon is formed, only the color of the white pigment being shown up.

As a result of these, when this display device is observed from the second transparent substrate 8B side, only the color of the white pigment in the display layer is displayed.

Figure 20B:
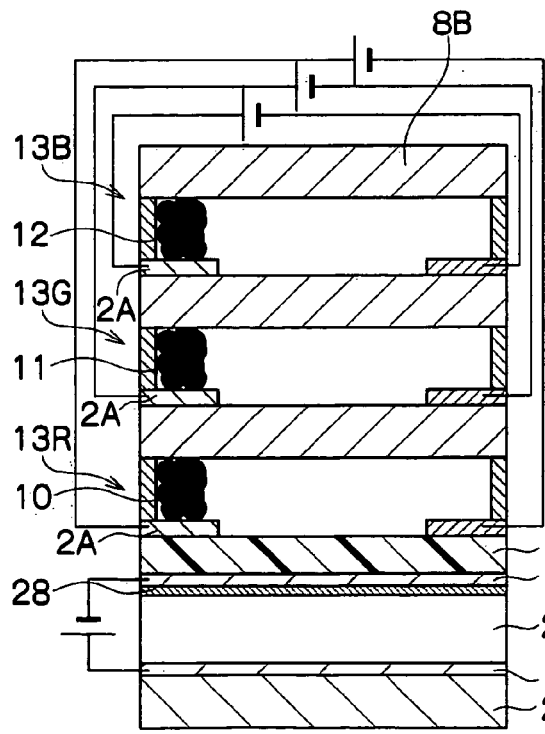

FIG. 20B is a schematic sectional view illustrating the black color display by the display device as shown in FIG. 19.

Also in FIG. 20B, across any of the light-modulating unit cells 13R, 13G, and 13B, a voltage is applied, the red color (R) charged mobile fine particles 10, the green color (G) charged mobile fine particles 11, and the blue color (B) charged mobile fine particles 12 having been all moved to the positive electrode side (herein, the first electrode 2A).

On the other hand, in the display layer, a voltage is applied with the electrode 16 being used as the negative side, and the electrode 19 being used as the positive side, which results in the colored state on the electrochromic phenomenon being formed. Namely, on the surface of the electrode 16 on the negative side, silver (metal) 28 is precipitated.

As a result of these, this display device displays the color of the silver 28 in the display layer, i.e., black color when observed from the second transparent substrate 8 side.

Figure 20C:
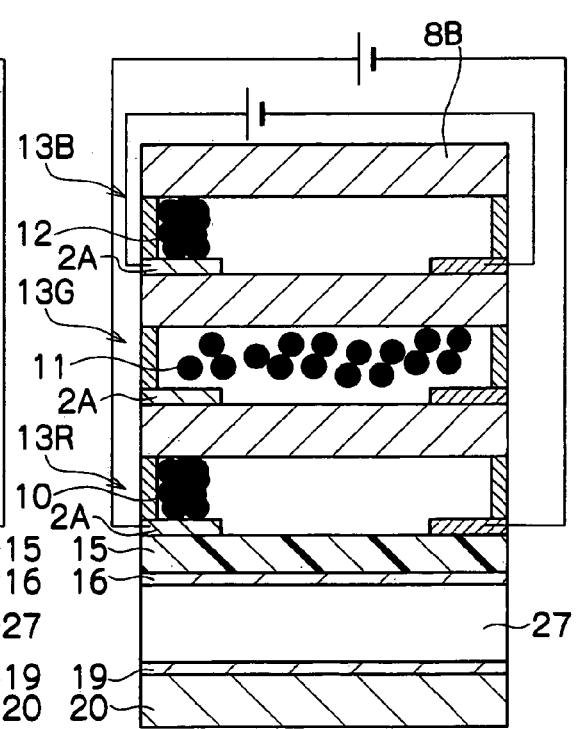

FIG. 20C is a schematic sectional view illustrating the green color (G) display by the display device as shown in FIG. 19.

In FIG. 20C, across either of the light-modulating unit cells 13R and 13B, a voltage is applied, the red color (R) charged mobile fine particles 10, and the blue color (B) charged mobile fine particles 12 having been both moved to the positive electrode side (herein, the first electrode 2A). In addition, across the light-modulating unit cell 13G, no voltage is applied, the green color (G) charged mobile fine particles 11 being dispersed in the inside of the cell.

On the other hand, with the display layer, no voltage is applied, the decolored state on the electrochromic phenomenon is formed, only the color of the white pigment being shown up.

As a result of these, this display device displays the green color (G) of the light-modulating unit cell 13G, when observed from the second transparent substrate 8B side. Herein, the display layer provided at the back of the light-modulating layer is in the white color display state, thus, the light scattering effect given by that white color display renders the green color (G) of the light-modulating unit cell 13G excellent in coloration.

Using FIG. 21, an eighth embodiment of the display device of the present invention will be described.

Figure 21:
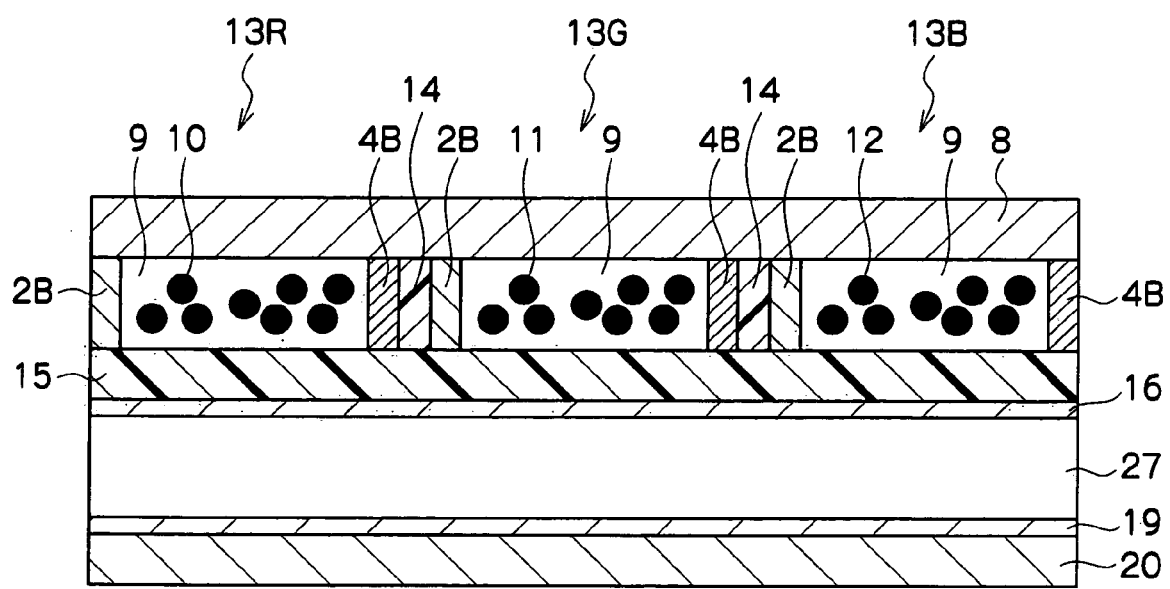
FIG. 21 is a schematic sectional view for explaining an eighth embodiment of the display device of the present invention.

The display device as shown in FIG. 21 has a configuration which combines the above-mentioned (4) display layer wherein the decolored state and the colored state which are based on the electrochromic phenomenon are used to carry out the white and black color displays, with the light-modulating layer which is the above-mentioned fifth example.

The light-modulating layer in the display device having such a configuration has been described above as the mode (the fifth example) in which three types of light-modulating unit cell, 13R, 13G, and 13B are disposed in parallel, thus the description herein is omitted.

Also the configuration of the display layer is the same as that in the above-mentioned sixth embodiment of the display device, thus the description herein is omitted.

Next, using FIG. 22A, FIG. 22B, and FIG. 22C, the operation of the display device as shown in FIG. 21 will be described.

Figure 22A:
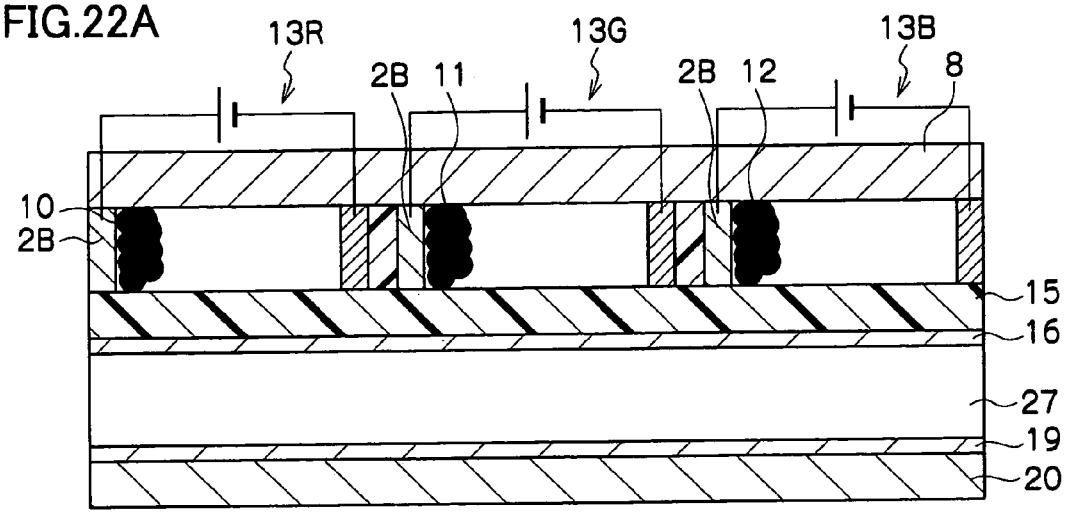
FIG. 22A, FIG. 22B, and FIG. 22C are schematic sectional views for explaining the operation of the display device as shown in FIG. 21.

FIG. 22A is a schematic sectional view illustrating the white color display by the display device as shown in FIG. 21.

As shown in FIG. 22A, across any of the light-modulating unit cells 13R, 13G; and 13B, a voltage is applied, the red color (R) charged mobile fine particles 10, the green color (G) charged mobile fine particles 11, and the blue color (B) charged mobile fine particles 12 having been all moved to the positive electrode side (herein, the first electrode 2B).

On the other hand, with the display layer, no voltage is applied, the decolored state on the electrochromic phenomenon is formed, only the color of the white pigment being shown up.

As a result of these, when this display device is observed from the second transparent substrate 8 side, only the color of the white pigment in the display layer is displayed.

Figure 22B:
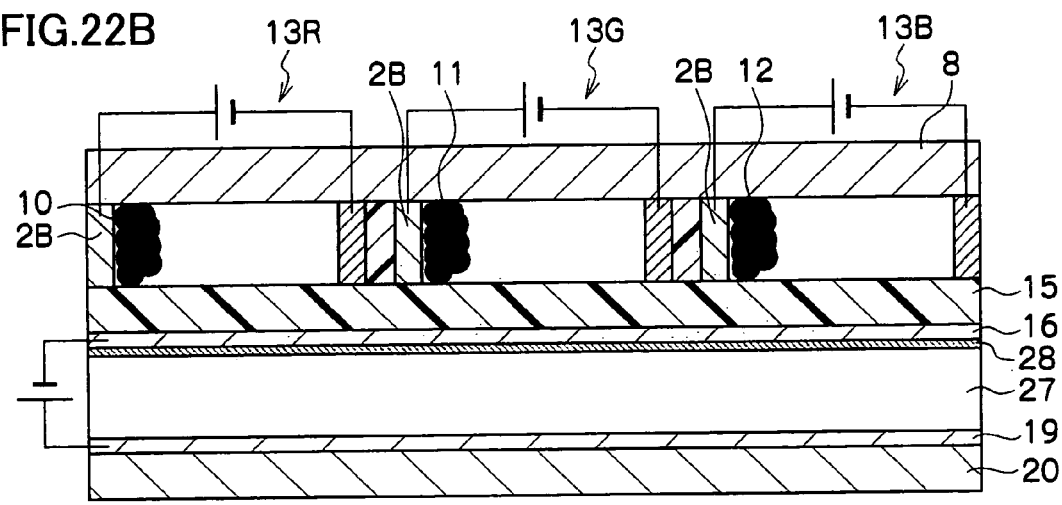

FIG. 22B is a schematic sectional view illustrating the black color display by the display device as shown in FIG. 21.

Also in FIG. 22B, across any of the light-modulating unit cells 13R, 13G and 13B, a voltage is applied, the red color (R) charged mobile fine particles 10, the green color (G) charged mobile fine particles 11, and the blue color (B) charged mobile fine particles 12 having been all moved to the positive electrode side (herein, the first electrode 2B).

On the other hand, in the display layer, a voltage is applied with the electrode 16 being used as the negative side, and the electrode 19 being used as the positive side, which results in the colored state on the electrochromic phenomenon being formed. Namely, on the surface of the electrode 16 on the negative side, silver (metal) 28 is precipitated.

As a result of these, this display device displays the color of the silver 28 in the display layer, i.e., black color when observed from the second transparent substrate 8 side.

Figure 22C:
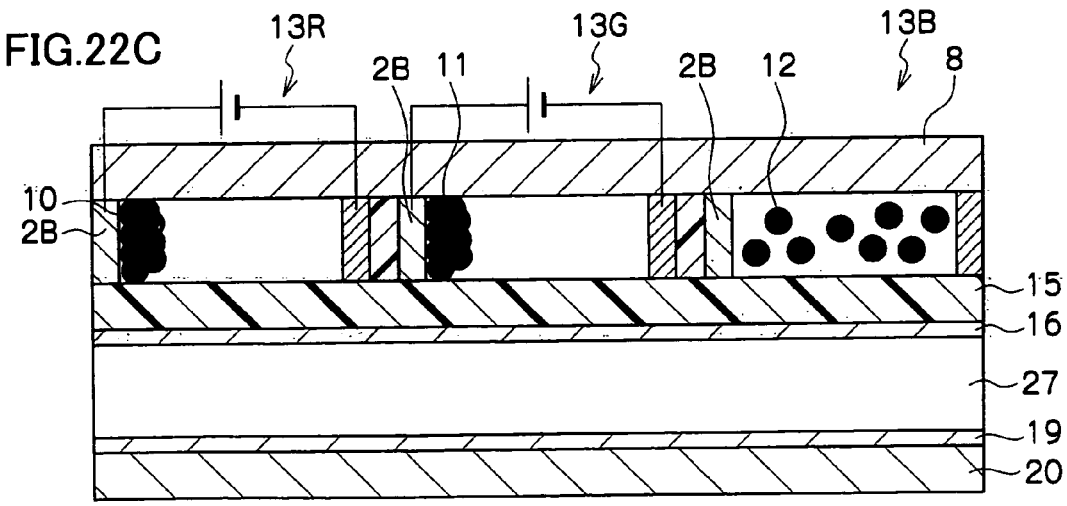

FIG. 22C is a schematic sectional view illustrating the blue color (B) display by the display device as shown in FIG. 21.

In FIG. 22C, across either of the light-modulating unit cells 13R and 13G, a voltage is applied, the red color (R) charged mobile fine particles 10, and the green color (G) charged mobile fine particles 11 having been both moved to the positive electrode side (herein, the first electrode 2B). In addition, across the light-modulating unit cell 13B for blue color (B), no voltage is applied, the blue color (B) charged mobile fine particles 12 being dispersed in the inside of the cell.

On the other hand, with the display layer, no voltage is applied, the decolored state on the electrochromic phenomenon is formed, only the color of the white pigment being shown up.

As a result of these, this display device displays the blue color (B) of the light-modulating unit cell 13B, when observed from the second transparent substrate 8 side. Herein, the display layer provided at the back of the light-modulating layer is in the white color display state, thus, the light scattering effect given by that white color display renders the blue color (B) of the light-modulating unit cell 13B excellent in coloration.

Hereinabove, a variety of embodiments of the display device of the present invention have been described, but the present invention is not limited to these configurations.

In addition, in the substrate of the display device of the present invention, a wiring, a thin film transistor, a diode having a metal-isolation layer-metal construction, a variable capacitor, a driving switching device, such as a ferroelectric substance, or the like, may be formed in accordance with the application.

EXAMPLES

Hereinbelow, the present invention will be further specifically described by giving EXAMPLES. However, the present invention is not limited by these respective EXAMPLES.

Example 1

First Embodiment

The display device of the first embodiment as shown in FIG. 7 is manufactured as follows.

First, the glass substrate 20 (0.7 mm thick) equipped with an ITO transparent electrode (19) is coated with a polycarbonate resin (PC-Z) such that the thickness is 5 μm (not shown). Thereafter, using a photosensitive polyimide varnish, a layer for partition wall is coated, and then by exposure and wet etching, partition walls (not shown) having a height of 300 μm and a width of 300 μm are formed. After a thermally fusible adhesive being applied to the surface of said partition walls, spherical fine particles having a volumetric average particle diameter of 20 μm of titanium oxide containing crosslinked polymethylmethacrylate (obtained by classification of Technopolymer MBX-20-white manufactured by SEKISUI PLASTICS CO., LTD.) which is mixed with isopropyl methoxy silane treated titania fine powder in a weight ratio of 100 to 0.4, and spherical fine particles having a volumetric average particle diameter of 20 μm of carbon containing crosslinked polymethylmethacrylate (obtained by classification of Technopolymer MBX-20-black manufactured by SEKISUI PLASTICS CO., LTD.) are mixed in a weight ratio of 2 to 1, and these mixed particles are filled in the inside of said partition walls.

On the other hand, on the glass surface side of the glass substrate 15 (0.7 mm thick) equipped with an ITO transparent electrode (16), an ITO film is formed to a thickness of 50 nm by the sputtering method, and line-patterned to form an electrode 2A, 4A. The distance between the electrodes is 1 mm, and the ITO line width is 100 μm. Thereafter, using a photosensitive polyimide varnish, a layer for partition wall is coated, and then by exposure and wet etching, the partition walls 6 having a height of 50 μm and a width of 20 μm are formed. The thermally fusible adhesive 7 is applied to the junction surfaces of said partition walls 6 and the second substrate 8R, and then, in the cell surrounded by the partition walls 6, the water 9 including the gold colloidal particles (red) 10 (Fine Sphere Gold manufactured by NIPPON PAINT Co., Ltd., with a volumetric average particle diameter of 20 nm) is filled, which is then followed by applying heat to the glass substrate (the second substrate) 8R on one side of which an ITO film with a thickness of 50 nm is formed, for cementing to manufacture a red light-modulating unit cell in which the gold colloidal particles (red) are dispersed.

Next, on said second substrate 8R, a green color and blue color light-modulating unit cells are manufactured as follows.

Namely, by carrying out the same operation as that for manufacture of said red color light-modulating unit cell except that, in "the processes from the ITO patterning to the second substrate cementing" in manufacture of said red color light-modulating unit cell, the gold colloidal particles (green, with a volumetric average particle diameter of 30 nm) are used instead of using the gold colloidal particles (red), a green color light-modulating unit cell is manufactured on the second substrate 8R of said red color light-modulating unit cell.

Further, by carrying out the same operation as that for manufacture of said red color light-modulating unit cell except that, in "the processes from the partition wall forming to the second substrate cementing" in manufacture of said red color light-modulating unit cell, the second substrate 8B on which no ITO film is formed is used instead of using the second substrate 8R which has a formed ITO film, and further, the gold colloidal particles (blue, with a volumetric average particle diameter of 50 nm) are used instead of using the gold colloidal particles (red), a blue color light-modulating unit cell is manufactured.

The light-modulating device thus manufactured which has a laminated structure made up of three colors, RGB, is cemented, while heated, onto the substrate in which said mixed particles are filled inside of the partition walls, while applying heat, for manufacture of a display device in which a display layer and a light-modulating layer are layered.

Using the display device thus manufactured, as shown in FIG. 8A, a voltage of 400 V is applied with the electrode 16 for the display layer being used as the positive side, and the electrode 19 being used as the negative side, and further a voltage of 50 V is applied with the electrodes 2A for the light-modulating unit cells 13R, 13G, and 13B being used as the positive side, and the electrodes 4A being used as the negative side, for observing the display device from the second substrate 8B side to confirm that the red color (R) charged mobile fine particles 10, the green color (G) charged mobile fine particles 11, and the blue color (B) charged mobile fine particles 12 are all moved to the positive electrode side (the electrode 2A), and the display layer has white color.

Next, in this state, as shown in FIG. 8B, a voltage of 400 V is applied with the electrode 16 for the display layer being used as the negative side, and the electrode 19 being used as the positive side, which then results in the white particles and the black particles being moved, and by observing the display device from the second substrate 8B side, the black color of the display layer is confirmed.

Further, as shown in FIG. 8C, a voltage of 400 V is applied with the electrode 16 for the display layer being used as the positive side, and the electrode 19 being used as the negative side; an AC voltage of plus or minus 50V is applied only across the electrodes 2A, 4A for the green color light-modulating unit cell 13G; and thereafter the voltage to the green light-modulating unit cell 13G is turned OFF, which then results in only the green color light-modulating unit cell 13G being brought into the state in which the green particles are dispersed, and by observing this display device from the second substrate 8B side, the green color is confirmed.

According to an aspect of the invention, a display medium which allows color display excellent in coloration to be obtained in addition to the black and white display in contrast, and a display device and a display method using the display medium can be provided.

Example 2

Second Embodiment

The display device of the second embodiment as shown in FIG. 9 is manufactured as follows.

First, the white particles for the display layer, the black particles, and the display layer are manufactured in the same manner as that in EXAMPLE 1 to the process in which the mixed particles are filled inside of the partition walls (not shown).

On the other hand, on the glass surface side of the glass substrate (the isolation layer) 15 (0.7 mm thick) equipped with an ITO transparent electrode (the electrode 16), a layer for partition wall is coated, using a photosensitive polyimide varnish, and then by exposure and wet etching, the isolation walls 14 having a height of 50 μm, a width of 20 μm, and a partition spacing of 1 mm are formed. Thereafter, by using the photolithography process and the sputtering process to form an ITO film on the sides of the isolation walls 14, the ITO electrodes 2B, 4B are created. Thereafter, the thermally fusible adhesive (not shown) is applied to the junction surfaces of said isolation walls 14 and the second substrate 8, and then, in the cell surrounded by the isolation walls 14, the water including the gold colloidal particles (red) 10 (Fine Sphere Gold manufactured by NIPPON PAINT Co., Ltd., with a volumetric average particle diameter of 20 nm), the gold colloidal particles 11 (green, with a volumetric average particle diameter of 30 nm), the gold colloidal particles 12 (blue, with a volumetric average particle diameter of 50 nm) is filled as shown in FIG. 9, which is then followed by applying heat to the glass substrate (the second substrate) 8 for cementing to manufacture a light-modulating layer in which three colors, RGB, are arranged in parallel.

The light-modulating device thus manufactured which is made up of three colors, RGB, is cemented onto the substrate in which said mixed particles are filled inside of the partition walls, while applying heat, for manufacture of a display device in which a display layer and a light-modulating layer are laminated.

Using the display device thus manufactured, as shown in FIG. 10C, a voltage of 400 V is applied with the electrode 16 for the display layer being used as the positive side, and the electrode 19 being used as the negative side, and further a voltage of 50 V is applied across the electrodes for the red color light-modulating unit cell 13R and across the blue color light-modulating unit cell 13B with the electrode 2B being used as the positive side, and the electrode 4B being used as the negative side, which then results in the red particles and the blue particles being moved to the positive electrode (2B) side, respectively, and by observing this display device from the second substrate 8 side, the green color is confirmed.

Further, as shown in FIG. 10A, across the electrodes for the green color light-modulating unit cell 13G, a voltage of 50 V is applied with the electrode 2B being used as the positive side, and the electrode 4B being used as the negative side, for observing this display device from the second substrate 8 side to confirm that the green particles are moved, and the display layer has white color.

Next, as shown in FIG. 10B, in this state, a voltage of 400 V is applied with the electrode 16 for the display layer being used as the negative side, and the electrode 19 being used as the positive side, which then results in the white particles and the black particles being moved, and by observing this display device from the second substrate 8 side, the black color is confirmed.

Example 3

Third Embodiment

The display device of the third embodiment as shown in FIG. 11 is manufactured as follows.

By using the bar coat method for coating a cyclized rubber resin (Photoresist OMR83 manufactured by TOKYO OHKA KOGYO CO., LTD.) on a substrate made up of a silicone wafer such that the thickness is 25 μm, thereafter scattering transparent glass balls having a diameter of 50 μm, and applying a heat treatment to the photoresist for curing, the glass balls are caused to be embedded into the photoresist. Next, on this surface, a film of TiC is formed to a thickness of 100 nm by the sputtering method. Then, an Indium film of 1 μm in thickness is formed by the resistance heating deposition method. Thereafter, by using the OMR release agent (manufactured by TOKYO OHKA KOGYO CO., LTD.) to dissolve and remove the photoresist, black-white reversible particles which have one hemispherical surface where a black layer and a white layer are layered, and the other hemispherical surface which is transparent are formed.

These black-white reversible particles are dispersed into a two-part liquid silicone rubber (Silpot 184 manufactured by Dow Corning); then the silicone rubber is spread on a glass substrate to a film with a thickness of 100 μm, and heated to be cured under the conditions of 100 deg C. for 1 hr. Next, the silicone rubber in which the black-white reversible particles are dispersed is peeled off from the glass substrate; immersed in the silicone oil (manufactured by Toshiba Silicones) having a viscosity of 1 cps for 24 hr to form a cavity around the respective black-white reversible particles; and then cemented to the ITO film (19) provided on the glass substrate 20.

On the other hand, in the same manner as in EXAMPLE 2, on the glass surface side of the glass substrate (the isolation layer) 15 (0.7 mm thick) equipped with an ITO transparent electrode (16), a light-modulating layer in which three colors, RGB, are arranged in parallel is manufactured, and by cementing it onto the silicone rubber in which the black-white reversible particles are dispersed, a display device is manufactured.

Using the display device thus manufactured, as shown in FIG. 12C, a voltage of 100 V is applied with the electrode 16 for the display layer being used as the positive side, and the electrode 19 being used as the negative side, and further a voltage of 50 V is applied across the electrodes for the red color light-modulating unit cell 13R and the blue color light-modulating unit cell 13B with the electrode 2B being used as the positive side, and the electrode 4B being used as the negative side, which then results in the red particles and the blue particles being moved to the positive electrode (2B) side, respectively, and by observing this display device from the second substrate 8 side, the green color is confirmed.

Further, as shown in FIG. 12A, across the electrodes for the green color light-modulating unit cell 13G; a voltage of 50 V is applied with the electrode 2B being used as the positive side, and the electrode 4B being used as the negative side, for observing this display device from the second substrate 8 side to confirm that the green particles are moved, and the display layer has white color.

Next, as shown in FIG. 12B, in this state, a voltage of 100 V is applied with the electrode 16 for the display layer being used as the negative side, and the electrode 19 being used as the positive side, which then results in the black-white reversible particles being reversed, and by observing this display device from the second substrate 8 side, the black color is confirmed.

Example 4

Fourth Embodiment

The display device of the fourth embodiment as shown in FIG. 13 is manufactured as follows.

The display layer is manufactured by exactly following the method as described in the example 5 to example 7 in the Published Japanese Translation of PCT International Publication for Patent Application No. 2004-526210 to carry out forming the white fine particles and the black fine particles, microencapsulating of these, and formation on the substrate.

On the other hand, in the same manner as in EXAMPLE 2, on the glass surface side of the glass substrate (the isolation layer) 15 (0.7 mm thick) equipped with an ITO transparent electrode (16), a light-modulating layer in which three colors, RGB, are arranged in parallel is manufactured, and by cementing it onto said display layer, a display device is manufactured.

Using the display device thus manufactured, as shown in FIG. 14C, a voltage of 40 V is applied with the electrode 16 for the display layer being used as the negative side, and the electrode 19 being used as the positive side, and further a voltage of 50 V is applied across the electrodes for the red color light-modulating unit cell 13R and the blue color light-modulating unit cell 13B with the electrode 2B being used as the positive side, and the electrode 4B being used as the negative side, which then results in the red particles and the blue particles being moved to the positive electrode (2B) side, respectively, and by observing this display device from the second substrate 8 side, the green color is confirmed.

Further, as shown in FIG. 14A, across the electrodes for the green color light-modulating unit cell 13G, a voltage of 50 V is applied with the electrode 2B being used as the positive side, and the electrode 4B being used as the negative side, for observing this display device from the second substrate 8 side to confirm that the green particles are moved, and the display layer has white color.

Next, as shown in FIG. 14B, in this state, a voltage of 40 V is applied with the electrode 16 for the display layer being used as the positive side, and the electrode 19 being used as the negative side, which then results in the black fine particles being moved to the electrode 16 side, and by observing this display device from the second substrate 8 side, the black color is confirmed.

Example 5

Fourth Embodiment

The display device of the fourth embodiment as shown in FIG. 13 is manufactured as follows.

First, titania particles (manufactured by ISHIHARA SANGYO KAISHA LTD.) which are surface treated by a titania coupling agent (KR-TTS manufactured by AJINOMOTO Co., Inc.) and an aluminum coupling agent (AL-M manufactured by AJINOMOTO Co., Inc.) are dispersed into dodecylbenzene (manufactured by Kanto Chemical Co., Inc.), and further an anthraquinone dyestuff (manufactured by CHUO SYNTHETIC CHEMICAL CO., LTD.) is added to be dispersed. This dispersion is dropped into a solution in which gum arabic and gelatine are dissolved, and the solution is stirred at a rotational speed of 1,300 rpm. Next, with acetic acid, the pH value of the solution is adjusted to 3.7, and then ice-cooled to cause capsules to be precipitated. Further, formaldehyde is added to form a crosslink structure in the capsules. Thereafter, stirring is continued whole day and night, which is then followed by classification to manufacture microcapsules having a particle diameter of 50 to 60 µm.

The manufactured microcapsule, an aqueous emulsion type binder material (Polon manufactured by Shin-Etsu Chemical Co., Ltd.), and water are mixed to prepare a microcapsule dispersion in which the microcapsules and the binder material are dispersed in water. At this time, the concentration of the binder material in the microcapsule dispersion is set at 5% by mass.

By coating the microcapsule dispersion thus manufactured on the glass substrate 20 (0.7 mm thick) equipped with an ITO transparent electrode (19) by the doctor blade method, a display layer having a thickness of 60 µm (approximately the same thickness as the average particle diameter of the microcapsules) is formed.

On the other hand, in the same manner as in EXAMPLE 2, on the glass surface side of the glass substrate 15 (0.7 mm thick) equipped with an ITO transparent electrode (16), a light-modulating layer in which three colors, RGB, are arranged in parallel is manufactured, and by cementing it onto said display layer, a display device is manufactured.

Using the display device thus manufactured, as shown in FIG. 14C, a voltage of 40 V is applied with the electrode 16 for the display layer being used as the negative side, and the electrode 19 being used as the positive side, and further a voltage of 50 V is applied across the electrodes for the red color light-modulating unit cell 13R and the blue color light-modulating unit cell 13B with the electrode 2B being used as the positive side, and the electrode 4B being used as the negative side, which then results in the red particles and the blue particles being moved to the positive electrode (2B) side, respectively, and by observing this display device from the second substrate 8 side, the green color is confirmed.

Further, as shown in FIG. 14A, across the electrodes for the green color light-modulating unit cell 13G; a voltage of 50 V is applied with the electrode 2B being used as the positive side, and the electrode 4B being used as the negative side, for observing this display device from the second substrate 8 side to confirm that the green particles are moved, and the display layer has white color.

Next, as shown in FIG. 14B, in this state, a voltage of 40 V is applied with the electrode 16 for the display layer being used as the positive side, and the electrode 19 being used as the negative side, which then results in the black fine particles being moved to the electrode 16 side, and by observing this display device from the second substrate 8 side, the black color is confirmed.

Example 6

Fifth Embodiment

The display device of the fifth embodiment as shown in FIG. 15 is manufactured as follows.

First, iron pentacarbonyl (U.S. Pat. No. 4,803,143) is spray-dried at 250 deg C. to prepare iron powder having a particle diameter of 4 µm. Next, 0.3 g of an antioxidant and 30 g of an ethylene-vinyl acetate copolymer resin are dissolved into 500 g of THF; and into the solution, 12 g of titanium oxide, 18 g of copper phthalocyanine, and 90 g of the above-mentioned iron powder are dispersed; then by spray drying this dispersion at 50 deg C., blue magnetic particles (the magnetic mobile fine particles 24) having a particle diameter of 10 µm are obtained.

On the glass substrate having a thickness of 0.7 mm, a layer for partition wall is coated, using a photosensitive polyimide varnish, and then by carrying out exposure and wet etching, the partition walls 6 having a height of 300 µm and a width of 200 µm are formed. After the thermally fusible bonding layer 7 being provided on the junction surfaces of the partition walls 6 and the second substrate 8, an isoparaffin solvent (the solvent 25) in which the above-mentioned blue magnetic particles are dispersed is filled in the partition walls 6, and the second transparent substrate 8 made up of glass is butted against the bonding layer 7, which is then followed by applying heat for cementing to form a light-modulating layer.

Then, by cementing the obtained light-modulating layer onto the display layer which is previously manufactured in the same manner as in EXAMPLE 1, a display device is manufactured.

Using the display device thus manufactured, a voltage of 400 V is applied with the electrode 16 for the display layer being used as the positive side, and the electrode 19 being used as the negative side, which then results in the white particles in the display layer being moved to the light-modulating layer side, and by observing this display device from the second substrate 8 side, the blue color is confirmed.

Further, the magnet 26 is brought close to one end of the light-modulating layer from the outside, which then results in the magnetic mobile fine particles 24 being influenced by the magnetic field from the magnet 26 to be moved toward the magnet 26, and by observing the display device from the second substrate 8 side, the white color is confirmed.

Next, by bringing the magnet 26 away from the display device to eliminate the influence of the magnetic field, the magnetic mobile fine particles 24 in the light-modulating layer again form a dispersion state, and the blue color is observed.

Example 7

Sixth Embodiment

The display device of the sixth embodiment as shown in FIG. 17 is manufactured as follows.

On the glass substrate 20 having a thickness of 0.7 mm, an ITO film is formed to a thickness of 100 nm by the sputtering method for formation of the first electrode 19 for the display layer.

2 parts by mass of AgI, and 3 parts by mass of NaI are dissolved into 20 parts by mass of dimethylsulfoxide, and further 25 parts by mass of a polyethyleneoxide having a molecular weight of 200,000, and 7.5 parts by mass of a UV initiator are dissolved to prepare a macromolecular solid electrolyte. Then, a liquid obtained by adding 35 parts by mass of titanium dioxide having an average particle diameter of 0.25 µm, and uniformly dispersing by use of a bead mill is coated on the above-mentioned ITO electrode 19 using a doctor blade (to a thickness of 100 µm) to form the electrolyte layer 27.

On the other hand, on one surface of the glass substrate (the isolation layer) 15 having a thickness of 0.7 mm, the first electrode 16 for the display layer that is made up of a paradion film having a thickness of 300 nm is formed by the sputtering method. Then, on the other surface of the glass substrate 15, an ITO film is formed to a thickness of 80 nm by the sputtering method, and line-patterned by the photolithography method and the dry etching method to form the electrode 2A, 4A. The ITO line width is 100 µm.

Then, on the surface on which the electrode 2A, 4A is provided, a layer for partition wall is coated, using a photosensitive polyimide varnish, and then by carrying out exposure and wet etching, the partition walls 6 having a height of 50 µm and a width of 50 µm are formed.

The glass substrate 15 which is thus provided with the electrode 2A, 4A, the partition walls 6, and the first electrode 16 for the display layer is cemented such that the above-mentioned electrolyte layer 27 and the first electrode 16 for the display layer are butted against each other.

Thereafter, the thermally fusible bonding layer 7 is formed on the junction surfaces of said partition walls 6 and the glass substrate 8, and then, in the cell surrounded by the partition walls 6, the water 9 including the gold colloidal particles (red) 10 (Fine Sphere Gold manufactured by NIPPON PAINT Co., Ltd., with a volumetric average particle diameter of 20 nm) is filled, which is then followed by applying heat to the glass substrate 8 having a thickness of 0.7 mm for cementing to manufacture a display device.

The charged mobile fine particles 10 in the display device thus manufactured are in the dispersed state, showing red color, thus when observed from the glass substrate 8 side, the red color is confirmed.

Next, when a voltage of 40 V is applied with the electrode 2A being used as the positive side, and the electrode 4A being used as the negative side, the charged mobile fine particles 10, which are negatively charged, are moved to the electrode 2A side. Thereby, when the display device is observed from the glass substrate 8 side, the color of the white pigment in the display layer, which provides the back surface, is observed. When the degree of whiteness for this white color is evaluated as the reflectivity by means of a McBeth densitometer, a value as good as 65% is indicated.

Thereafter, in this state, when a voltage of 5 V is applied with the electrode 16 being used as the negative side, and the electrode 19 being used as the positive side, the silver ions which have been dissolved is precipitated on the surface of the electrode 16 to form the silver film 28. Thereby, when the display device is observed from the glass substrate 8 side, the color of the silver, i.e., the black color is confirmed.

Example 8

Seventh Embodiment

The display device of the seventh embodiment as shown in FIG. 19 is manufactured as follows.

By performing the processes to that of coating the high-polymer solid electrolyte with a doctor blade in EXAMPLE 7, the same electrolyte layer 27 as that in EXAMPLE 7 is formed.

Then, on one surface of the glass substrate (the isolation layer) 15 having a thickness of 0.7 mm, the first electrode 16 for the display layer that is made up of a paradion film having a thickness of 300 nm is formed by the sputtering method. Then, on the other surface of the glass substrate 15, an ITO film is formed to a thickness of 80 nm by the sputtering method, and line-patterned by the photolithography method and the dry etching method to form the electrode 2A, 4A. The distance between the electrodes is 1 mm, and the ITO line width is 100 µm.

Then, on the surface on which the electrode 2A, 4A is provided, a layer for partition wall is coated, using a photosensitive polyimide varnish, and then by carrying out exposure and wet etching, the partition walls 6 having a height of 50 µm and a width of 50 µm are formed.

The glass substrate 15 (the isolation layer) which is thus provided with the electrode 2A, 4A, the partition walls 6, and the first electrode 16 for the display layer is cemented such that the above-mentioned electrolyte layer 27 and the first electrode 16 for the display layer are butted against each other.

Thereafter, the thermally fusible adhesive 7 is applied to the junction surfaces of said partition walls 6 and the second substrate 8R, and then, in the cell surrounded by the partition walls 6, the water 9 including the gold colloidal particles (red) 10 (Fine Sphere Gold manufactured by NIPPON PAINT Co., Ltd., with a volumetric average particle diameter of 20 nm) is filled, which is then followed by applying heat to the glass substrate 8R on one side of which an ITO film with a thickness of 80 nm is formed, for cementing to manufacture a red light-modulating unit cell in which gold colloidal particles (red) are dispersed.

Next, on said second substrate 8R, green color and blue color light-modulating unit cells are manufactured as follows.

Namely, by carrying out the same operation as that for manufacture of said red color light-modulating unit cell except that, in "the processes from the ITO patterning to the second substrate cementing" in manufacture of said red color light-modulating unit cell, the gold colloidal particles (green, with a volumetric average particle diameter of 30 nm) are used instead of using the gold colloidal particles (red), a green color light-modulating unit cell is manufactured on the second substrate 8R of said red color light-modulating unit cell.

Further, by carrying out the same operation as that for manufacture of said red color light-modulating unit cell except that, in "the processes from the partition wall forming to the second substrate cementing" in manufacture of said red color light-modulating unit cell, the second substrate 8B on which no ITO film is formed is used instead of using the second substrate 8R which has a formed ITO film, and further, the gold colloidal particles (blue, with a volumetric average particle diameter of 50 nm) are used instead of using the gold colloidal particles (red), a blue color light-modulating unit cell is manufactured.

Using the display device thus manufactured, a voltage of 40 V is applied with the electrodes 2A for the light-modulating unit cells 13R, 13G and 13B being used as the positive side, and the electrodes 4A being used as the negative side, for observing the display device from the second substrate 8B side to confirm that the red color (R) charged mobile fine particles 10, the green color (G) charged mobile fine particles 11, and the blue color (B) charged mobile fine particles 12 are all moved to the positive electrode side (the electrode 2A), and the display layer has white color. When the degree of whiteness at this time is measured as the reflectivity by means of a McBeth densitometer, a value as good as 62% is indicated.

Next, an AC voltage of plus or minus 50V is applied only across the electrodes 2A, 4A for the green color light-modulating unit cell 13G, and thereafter the voltage to the green light-modulating unit cell 13G is turned OFF, which then results in only the green color light-modulating unit cell 13G being brought into the state in which the green particles are dispersed, and by observing this display device from the second substrate 8B side, the green color is confirmed.

Further, a voltage of 40 V is applied across the electrodes 2A, 4A for the green color light-modulating unit cell 13G with the electrode 2A being used as the positive side, and the electrode 4A being used as the negative side, and a voltage of 5 V is applied with the electrode 16 for the display layer being used as the negative side, and the electrode 19 being used as the positive side, which then results in the silver ions which have been dissolved being precipitated on the surface of the electrode 16 to form the silver film 28. Thereby, when the display device is observed from the second substrate 8B side, the color of the silver, i.e., the black color is confirmed.

Example 9

Eighth Embodiment

The display device of the eighth embodiment as shown in FIG. 21 is manufactured as follows.

By performing the processes to that of coating the macromolecular solid electrolyte with a doctor blade in EXAMPLE 7, the same electrolyte layer 27 as that in EXAMPLE 7 is formed.

Then, on one surface of the glass substrate (the isolation layer) 15 having a thickness of 0.7 mm, the first electrode 16 for the display layer that is made up of a paradion film having a thickness of 300 nm is formed by the sputtering method. Then, on the other surface of the glass substrate 15, a layer for partition wall is coated, using a photosensitive polyimide varnish, and then by exposure and wet etching, the two isolation walls 14 having a height of 50 μm, a width of 20 μm, and a spacing of 1 mm are formed.

Thereafter, in the places other than the isolation walls 14 on the glass substrate 15, an ITO film is formed to a thickness of 50 nm by the sputtering method, and line-patterned by the photolithography method and the dry etching method to form the electrode 2B, 4B which is adjacent to the side of the isolation wall 14. The ITO line width is 100 μm.

The glass substrate 15 which is thus provided with the electrode 2B, 4B, and the first electrode 16 for the display layer is cemented such that the above-mentioned electrolyte layer 27 and the first electrode 16 for the display layer are butted against each other.

Thereafter, the thermally fusible adhesive (not shown) is applied to the junction surfaces of said isolation walls 14 and the second substrate 8, and then, in the cell surrounded by the isolation walls 14, the water including the gold colloidal particles (red) 10 (Fine Sphere Gold manufactured by NIPPON PAINT Co., Ltd., with a volumetric average particle diameter of 20 nm), the gold colloidal particles 11 (green, with a volumetric average particle diameter of 30 nm), the gold colloidal particles 12 (blue, with a volumetric average particle diameter of 50 nm) is filled as shown in FIG. 21, which is then followed by applying heat to the glass substrate (the second transparent substrate) 8 for cementing to manufacture a light-modulating layer in which three colors, RGB, are arranged in parallel.

Using the display device thus manufactured, a voltage of 40 V is applied with the electrodes 2B for the light-modulating unit cells 13R, 13G; and 13B being used as the positive side, and the electrodes 4B being used as the negative side, for observing the display device from the glass substrate 8 side to confirm that the red color (R) charged mobile fine particles 10, the green color (G) charged mobile fine particles 11, and the blue color (B) charged mobile fine particles 12 are all moved to the positive electrode side (the electrode 2B), and the display layer has white color. When the degree of whiteness at this time is measured as the reflectivity by means of a McBeth densitometer, a value as good as 65% is indicated.

Next, an AC voltage of plus or minus 50V is applied only across the electrodes 2B, 4B for the blue color light-modulating unit cell 13B, and thereafter the voltage to the blue light-modulating unit cell 13B is turned OFF, which then results in only the blue color light-modulating unit cell 13B being brought into the state in which the blue particles are dispersed, and by observing this display device from the second substrate 8B side, the blue color is confirmed.

Further, a voltage of 40 V is applied across the electrodes 2B, 4B for the blue color light-modulating unit cell 13B with the electrode 2B being used as the positive side, and the electrode 4B being used as the negative side, and a voltage of 5 V is applied with the electrode 16 for the display layer being used as the negative side, and the electrode 19 being used as the positive side, which then results in the silver ions which have been dissolved being precipitated on the surface of the electrode 16 to form the silver film 28. Thereby, when the display device is observed from the second substrate 8B side, the color of the silver, i.e., the black color is confirmed.

What is claimed is:

1. A display medium comprising a display layer which selectively displays white or black color, and a light-modulating layer provided on the display layer, the light-modulating layer including mobile fine particles which show coloration in a dispersed state;
wherein the display layer includes an electrochromic layer containing a white pigment.

2. The display medium of claim 1, wherein the light-modulating layer is made up of a plurality of light-modulating unit cells, and the plurality of light-modulating unit cells are layered on the display layer.

3. The display medium of claim 1, wherein the light-modulating layer is made up of a plurality of light-modulating unit cells, and the plurality of light-modulating unit cells are disposed in parallel on the display layer.

4. The display medium of claim 2, wherein the plurality of light-modulating unit cells include a light-modulating unit cell showing red color, a light-modulating unit cell showing green color, and a light-modulating unit cell showing blue color.

5. The display medium of claim 3, wherein the plurality of light-modulating unit cells include a light-modulating unit cell showing red color, a light-modulating unit cell showing green color, and a light-modulating unit cell showing blue color.

6. The display medium of claim 1, wherein the mobile fine particles are charged mobile fine particles.

7. The display medium of claim 6, wherein the charged mobile fine particles are metallic colloidal particles having the color strength due to the surface plasmon resonance.

8. The display medium of claim 7, wherein a metal constituting the metallic colloidal particles is gold or silver.

9. The display medium of claim 6, wherein the charged mobile fine particles have a volumetric average particle diameter of approximately 1 to 100 nm.

10. The display medium of claim 1, wherein the display layer comprises white particles and black particles between a pair of substrates.

11. The display medium of claim 1, wherein the display layer comprises particles having a white portion and a black portion between a pair of substrates.

12. The display medium of claim 1, wherein the display layer comprises microcapsules holding white fine particles and black fine particles between a pair of substrates.

13. The display medium of claim 1, wherein the electrochromic layer contains metallic ions and an electrolyte.

14. The display medium of claim 13, wherein the metallic ions are silver ions.

15. A display device comprising a display layer which selectively displays white or black color; a light-modulating layer provided on the display layer, the light-modulating layer including mobile fine particles which show coloration in a dispersed state; a pair of electrodes which connects to the display layer; and fine particles moving part which is provided close to the light-modulating layer;
wherein the display layer includes an electrochromic layer containing a white pigment.

16. The display device of claim 15, wherein the fine particles moving part is a pair of electrodes which connects to the light-modulating layer.

17. The display device of claim 15, wherein at least one of the electrodes connecting to the light-modulating layer is provided at a part of the peripheral end of the light-modulating layer.

18. The display device of claim 15, wherein the light-modulating layer is made up of a plurality of light-modulating unit cells, and the plurality of light-modulating unit cells are layered on the display layer.

19. The display device of claim 15, wherein the light-modulating layer is made up of a plurality of light-modulating unit cells, and the plurality of light-modulating unit cells are disposed in parallel on the display layer.

20. The display device of claim 18, wherein the plurality of light-modulating unit cells include a light-modulating unit cell showing red color, a light-modulating unit cell showing green color, and a light-modulating unit cell showing blue color.

21. The display device of claim 19, wherein the plurality of light-modulating unit cells include a light-modulating unit cell showing red color, a light-modulating unit cell showing green color, and a light-modulating unit cell showing blue color.

22. The display device of claim 15, wherein the mobile fine particles are charged mobile fine particles.

23. The display device of claim 22, wherein the charged mobile fine particles are metallic colloidal particles having the color strength due to the surface plasmon resonance.

24. The display device of claim 23, wherein a metal constituting the metallic colloidal particles is gold or silver.

25. The display device of claim 22, wherein the charged mobile fine particles have a volumetric average particle diameter of approximately 1 to 100 nm.

26. The display device of claim 15, wherein the display layer comprises white particles and black particles between a pair of substrates.

27. The display device of claim 15, wherein the display layer comprises particles having a white portion and a black portion between a pair of substrates.

28. The display device of claim 15, wherein the display layer comprises microcapsules holding white fine particles and black fine particles between a pair of substrates.

29. The display device of claim 15, wherein the electrochromic layer contains metallic ions and an electrolyte.

30. The display device of claim 29, wherein the metallic ions are silver ions.

31. A display method using a display medium comprising a display layer which selectively displays white or black color, and a light-modulating layer provided on the display layer, the method comprising at least one step selected from:
displaying white color by displaying white color in the displaying layer and non-dispersing mobile fine particles in the light-modulating layer;
displaying black color by displaying black color in the displaying layer and non-dispersing the mobile fine particles in the light-modulating layer; and
showing coloration by displaying white color in the display layer and dispersing the mobile fine particles in the light-modulating layer;
wherein an electrochromic layer containing a white pigment is disposed as the display layer, and the display layer displays white color by the white pigment in the electrochromic layer, or displays black color by electrodepositing metals in the display layer containing metallic ions.

32. The display method of claim 31, wherein white particles and black particles between the pair of substrates are disposed as the display layer, and the display layer displays white color by moving only the white particles to the light-modulating layer side in the display layer, or displays black color by moving only the black particles to the light-modulating layer side in the display layer.

33. The display method of claim 31, wherein the metallic ions are silver ions.

* * * * *